US012032212B2

(12) United States Patent
Mathews et al.

(10) Patent No.: US 12,032,212 B2
(45) Date of Patent: Jul. 9, 2024

(54) FERRULES, ALIGNMENT FRAMES AND CONNECTORS

(71) Applicant: 3M INNOVATIVE PROPERTIES COMPANY, St. Paul, MN (US)

(72) Inventors: Alexander A. Mathews, Austin, TX (US); Terry L Smith, Roseville, MN (US); Michael A. Haase, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/466,303

(22) Filed: Sep. 3, 2021

(65) Prior Publication Data

US 2021/0396937 A1 Dec. 23, 2021

Related U.S. Application Data

(62) Division of application No. 15/754,024, filed as application No. PCT/US2016/054665 on Sep. 30, 2016, now Pat. No. 11,137,551.

(Continued)

(51) Int. Cl.
*G02B 6/38* (2006.01)
*G02B 6/30* (2006.01)
(Continued)

(52) U.S. Cl.
CPC .............. *G02B 6/383* (2013.01); *G02B 6/30* (2013.01); *G02B 6/3636* (2013.01);
(Continued)

(58) Field of Classification Search
CPC .. G02B 6/3825; G02B 6/3885; G02B 6/3826; G02B 6/3817
See application file for complete search history.

(56) References Cited

U.S. PATENT DOCUMENTS 6,095,695 A 8/2000 Ohtsuka
6,624,512 B2 9/2003 Kurusu
(Continued)

FOREIGN PATENT DOCUMENTS

WO WO 2014-055226 4/2014
WO WO 2017-066135 4/2017

OTHER PUBLICATIONS

International Search Report for PCT International Application No. PCT/US2016/054665, mailed on May 26, 2017, 7pgs.

*Primary Examiner* — Sung H Pak
*Assistant Examiner* — Hoang Q Tran
(74) *Attorney, Agent, or Firm* — Jonathan L. Tolstedt

(57) ABSTRACT

Ferrules, alignment frames and connectors having at least one flexing element are provided. A ferrule or an alignment frame may include a body and first and second flexible arms, and a connector may include the ferrule or the alignment frame. A ferrule may have a first flexible arm that has a first fixed end attached to a first side of the body of the ferrule and an opposite first free end, and may have a second flexible arm having a second fixed end attached to a second side of the body, opposite the first side, and an opposite second free end. When the ferrule is mated with a mating ferrule, the first and second flexible arms are flexed away from the respective first and second sides of the body, and the first and second free ends contact the mating ferrule.

6 Claims, 23 Drawing Sheets

Related U.S. Application Data

(60) Provisional application No. 62/240,066, filed on Oct. 12, 2015.

(51) Int. Cl.
    *G02B 6/36*        (2006.01)
    *G02B 6/40*        (2006.01)

(52) U.S. Cl.
    CPC ......... *G02B 6/3825* (2013.01); *G02B 6/3882* (2013.01); *G02B 6/403* (2013.01); *G02B 6/3817* (2013.01); *G02B 6/3826* (2013.01); *G02B 6/3885* (2013.01)

(56) References Cited

U.S. PATENT DOCUMENTS

| | | |
|---|---|---|
| 7,454,105 B2 | 11/2008 | Yi |
| 7,764,853 B2 | 7/2010 | Yi |
| 2008/0193086 A1 | 8/2008 | Howard |
| 2011/0229083 A1 | 9/2011 | Dainese, Jr. |
| 2013/0170797 A1 | 7/2013 | Ott |
| 2014/0161398 A1* | 6/2014 | Yi ........................ G02B 6/4292 385/92 |
| 2014/0234126 A1* | 8/2014 | Wu ........................ E21B 43/126 417/56 |
| 2015/0110443 A1 | 4/2015 | Huang |
| 2015/0219863 A1 | 8/2015 | Haase et al. |
| 2015/0234126 A1* | 8/2015 | Haase .................... G02B 6/40 385/59 |

* cited by examiner

FERRULES, ALIGNMENT FRAMES AND CONNECTORS

BACKGROUND

Alignment of electrical or optical components can be achieved by using pin and sleeve connectors, for example. The accuracy of the alignment of the two components is typically limited to the accumulated tolerances of all the alignment features on both components. Tight tolerances are typically required in conventional connectors in order to achieve satisfactory alignment accuracy.

Optical connectors can include optical ferrules that include elements for receiving and securing optical waveguides, elements for affecting light from the optical waveguides, and features for aligning the optical ferrule to a mating ferrule.

SUMMARY

In some aspects of the present description, an optical ferrule including a body; a first flexible arm having a first fixed end attached to a first side of the body and an opposite first free end; and a second flexible arm, opposite the first flexible arm, having a second fixed end attached to a second side of the body, opposite the first side, and an opposite second free end is provided. The body includes an optically transparent portion for propagating an optical signal therein. When the optical ferrule is mated with a mating ferrule, the first and second flexible arms are flexed away from the respective first and second sides of the body, and the first and second free ends contact the mating ferrule.

In some aspects of the present an optical connector including a housing; one or more alignment features attached to the housing for engaging a corresponding one or more alignment features attached to a housing of a mating connector; and a unitary optical ferrule at least partially disposed within the housing is provided. The unitary optical ferrule includes an optical waveguide alignment member for receiving, aligning and permanently attaching to a plurality of optical waveguides; a light redirecting member for changing a direction of light propagating within the optical ferrule; and first and second flexible alignment features on opposite sides of the optical ferrule, such that when the connector mates with a mating connector including a mating optical ferrule, the first and second flexible alignment features flex away from one another and engage the mating optical ferrule at respective first and second contact points.

In some aspects of the present description, an optical ferrule including a body and opposing arms on opposite sides of, and spaced apart from, the body is provided. Each arm has a fixed end attached to the body and an opposite free end. When the optical ferrule is mated with a mating ferrule, at least one of the arms is flexed away from the body, and both free ends contact the mating ferrule.

In some aspects of the present description, an optical ferrule including a body and a first flexible arm is provided. The first flexible arm has a first fixed end attached to the body and an opposite first free end adjacent to and spaced apart from the body. When the optical ferrule is mated with a mating ferrule, the first flexible arm is flexed away from the body, and the first free end contacts the mating ferrule. The optical ferrule is adapted to receive and transmit light.

In some aspects of the present description, an optical connector adapted to mate with a mating connector along a mating direction in a mating plane is provided. The optical connector has at least one flexing element such that when the optical connector is mated with the mating connector, the at least one flexing element is flexed and makes contact with the mating connector, and the optical connector and the mating connector are adapted to slide relative to each other in the mating plane.

In some aspects of the present description, an alignment frame for facilitating a mating of a first ferrule to a second ferrule along a mating direction is provided. The alignment frame includes a base; opposing first and second arms extending forwardly from opposing ends of the base; spaced apart first and second flexible features disposed on an inner surface of the first arm and facing the second arm; and spaced apart third and fourth flexible features disposed on an inner surface of the second arm and facing the first arm. When the alignment frame facilitates a mating of a first ferrule to a second ferrule resulting in the first ferrule being mated to the second ferrule, the opposing first and third flexible features are flexed and in contact with the first ferrule, and the opposing second and fourth flexible features are flexed and in contact with the second ferrule.

In some aspects of the present description, an optical ferrule including first and second alignment features for mating with corresponding alignment features of a mating optical ferrule is provided. One of the first and second alignment features is compressible or expandable and the optical ferrule is adapted to receive and transmit light.

In some aspects of the present description, an optical ferrule including a first feature having a size and a shape, and a second feature defining an expandable opening is provided. The expandable opening has an unexpanded state and an expanded state, such that inserting an object having the size and the shape of the first feature into the expandable opening expands the opening from the unexpanded state to the expanded state. The optical ferrule is adapted to receive and transmit light.

In some aspects of the present description, an optical ferrule including a first feature defining an opening, and a compressible second feature is provided. The opening has a size and a shape and the compressible second feature has an uncompressed state and a compressed state. Inserting the compressible second feature into an opening of an object, the opening of the object having the size and shape of the opening of the first feature, compresses the second feature from the uncompressed state to the compressed state. The optical ferrule is adapted to receive and transmit light.

In some aspects of the present description, an optical ferrule adapted to receive and transmit light and adapted to mate with a mating optical ferrule along a ferrule mating direction is provided. The optical ferrule includes a first alignment feature for engaging a corresponding first alignment feature of a mating optical ferrule, and a second alignment feature for engaging a corresponding second alignment feature of the mating optical ferrule. The first alignment feature is located at a first location along the ferrule mating direction, and the second alignment feature is located at a substantially different second location along the ferrule mating direction. When the optical ferrule is mated with the mating optical ferrule along the ferrule mating direction, the first and second alignment features substantially simultaneously engage the corresponding first and second alignment features of the mating optical ferrule.

In some aspects of the present description, an optical ferrule adapted to mate with a mating optical ferrule along a length direction of the optical ferrule is provided. The optical ferrule has a thickness along a thickness direction of the optical ferrule; a first alignment feature for contacting a corresponding first alignment feature of a mating optical ferrule at a first contact region of the first alignment feature; and a second alignment feature for contacting a corresponding second alignment feature of the mating optical ferrule at a second contact region of the second alignment feature. The first and second contact regions are offset relative to one another along at least the length and thickness directions of the optical ferrule.

In some aspects of the present description, an optical ferrule including first and second alignment features for engaging corresponding alignment features of a mating optical ferrule is provided. The optical ferrule is adapted to mate with the mating optical ferrule along each of two orthogonal dimensions of the optical ferrule.

In some aspects of the present description, an optical ferrule including first and second alignment features for engaging corresponding alignment features of a mating optical ferrule is provided. When the optical ferrule is mated with the mating optical ferrule, the optical ferrule is adapted to unmate from the mating optical ferrule via movement of the optical ferrule relative to the mating optical ferrule along a first dimension of the optical ferrule; and when the optical ferrule is mated with the mating ferrule, the optical ferrule is adapted to unmate from the mating ferrule via movement of the optical ferrule relative to the mating ferrule along a second dimension of the optical ferrule orthogonal to the first dimension.

In some aspects of the present description, an optical ferrule including a first alignment feature having a size and a shape; and a second alignment feature defining an opening is provided. The second alignment feature includes a first compliant feature having a first state and a second state different from the first state. Inserting an object having the size and the shape of the first alignment feature into the opening changes the first compliant feature from the first state to the second state. The optical ferrule is adapted to receive and transmit light.

In some aspects of the present description, an optical ferrule including a first alignment feature defining an opening, and a second alignment feature is provided. The opening has a size and a shape, and the first compliant feature has a first state and a second state different from the first state. Inserting the second alignment feature into an opening of an object, the opening of the object having the size and shape of the opening of the first alignment feature, changes the first compliant feature from the first state to the second state. The optical ferrule is adapted to receive and transmit light.

DETAILED DESCRIPTION

Figure 1A:
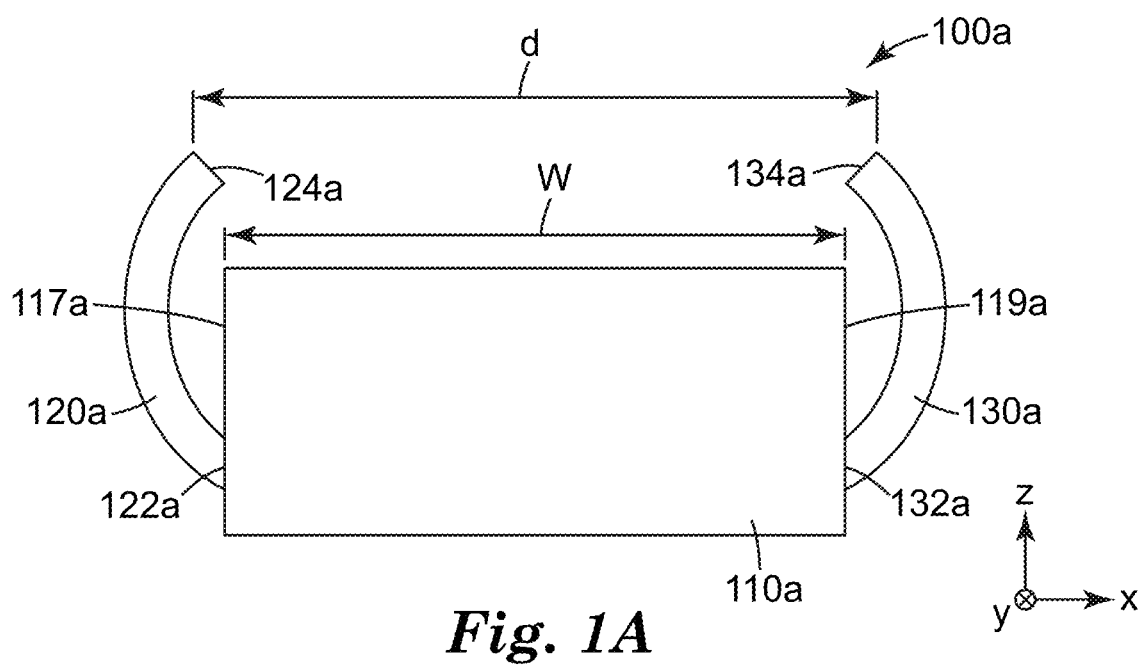
FIG. 1A is a schematic plan view of a ferrule.

In the following description, reference is made to the accompanying drawings that forms a part hereof and in which are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

In some embodiments of the present description, connectors or connector components such as ferrules or alignment frames allow for accurate alignment by utilizing compliant features. In some embodiments, these compliant features allow greater tolerances for manufacturing variations, such as shrinkage of an injection molded polymer ferrule. For example, a ferrule may include one or more flexible arms that guide or help guide the ferrule and a mating ferrule into alignment when the two ferrules are mated. In some embodiments, first and second arms may have the same flexing properties (e.g., the same modulus and the same geometry). In some cases, symmetric flexing properties may be reliably obtained by utilizing an injection molding process, for example, to form a unitary ferrule. A unitary ferrule is a single piece structure (as opposed to a ferrule that includes pieces formed separately and adhered or otherwise fastened together). The ferrule be made from any suitable materials including polymers or ceramics.

In some embodiments, the ferrule may have a geometric design that allows accurate alignment even when the first and second flexible arms have different flexing properties. Accurate alignment can be obtained if the first flexible arm is more flexible than the second flexible arm, for example, because the ferrule and a mating ferrule may be mated to form a ferrule assembly with the first flexible arms of each ferrule on a same first side of the ferrule assembly and the second flexible arms of each ferrule on an opposite second side of the ferrule assembly. As described further elsewhere herein, such arrangements allow for balanced forces on the ferrules when correctly aligned even if the first and second flexible arms have differing flexing properties. The ferrules, alignment frames and connectors described herein may allow for improved alignment accuracy and/or may allow accurate alignment without the tight mechanical tolerance requirements of conventional connectors.

The ferrules described herein may be hermaphroditic ferrules and may be unitary ferrules. The ferrules described herein may be optical, electrical, or hybrid ferrules having features for both optical and electrical connections. An optical ferrule may be described as a hybrid ferrule if the optical ferrule is adapted to transmit and/or receive light and is further adapted to receive and/or transmit an electrical signal. A hybrid ferrule may be both an electrical ferrule and an optical ferrule and may be adapted to provide both electrical and optical signals to a mating ferrule. In some cases, a hybrid ferrule may include an optoelectronic transducer and may be adapted to receive an optical signal and transmit an electrical signal or receive an electrical signal and transmit an optical signal. The connectors described herein may be optical, electrical, or hybrid connectors and may include one or more ferrules and may include one or more alignment frames.

FIG. 1A is a schematic plan view of first ferrule 100a including a body 110a having a width W, a first flexible arm 120a and a second flexible arm 130a opposite the first flexible arm 120a. Body 110a includes a first side 117a and a second side 119a opposite the first side 117a. First flexible arm 120a has a first fixed end 122a attached to the first side 117a and an opposite first free end 124a. Second flexible arm 130a has a second fixed end 132a attached to the second side 119a and an opposite second free end 134a.

In some embodiments, the first and second flexible arms 120a and 130a are symmetrically disposed on the first and second sides 117a and 119a of the body 110a. In some embodiments, the first and second flexible arms 120a and 130a have the same flexing properties. In other embodiments, the first and second flexible arms 120a and 130a may have different flexing properties. For example, one or the other of the first and second flexible arms may be more rigid by being formed of a higher modulus material or by being thicker, for example. This can be either intentional or accidental, e.g. via a molding process or material non-uniformity. In some embodiments, one of the first and second flexible arms is more flexible than the other one of the first and second flexible arms. In some embodiments, one, but not the other one, of the first and second flexible arms is substantially rigid.

An x-y-z-coordinate system is illustrated in FIG. 1A. The first and second flexible arms 120a and 130a extend in the z-direction, which is a mating direction of the ferrule 100a, and the first and second flexible arms 120a and 130a are separated from each other in the x-direction. The first and second arms 120a and 130a may be said to generally define a plane (the x-z plane or a plane parallel to the x-z plane). In some embodiments, the plane may contain or substantially contain the first and second arms 120a and 130a. In some embodiments, the first and second free ends 124a and 134a are separated by a distance d when the ferrule is unmated from a mating ferrule, and are separated by a distance W, which may be greater than d and may be a width of a body of the mating ferrule, when the ferrule is mated to the mating ferrule.

A mating direction of a ferrule refers to a direction along which a ferrule is adapted to be moved in order to mate with a mating ferrule. If a ferrule and a mating ferrule are misaligned so that fine tuning of the relative positions are needed before the ferrules mate, then the orientations of the ferrule and the mating ferrule may be described as not initially aligned along a mating direction. In some embodiments, the ferrule may have a single mating direction; i.e., there may be a single direction along which the ferrule is adapted to be moved relative to a mating ferrule in order to mate with the mating ferrule. As described further elsewhere herein, in some embodiments, a ferrule may have more than one mating direction. For example, in some embodiments the ferrule may be adapted to be moved along a first mating direction, or along a second orthogonal mating direction, or along a vector sum of the first and second mating directions relative to a mating ferrule in order to mate with the mating ferrule.

Figure 1B:
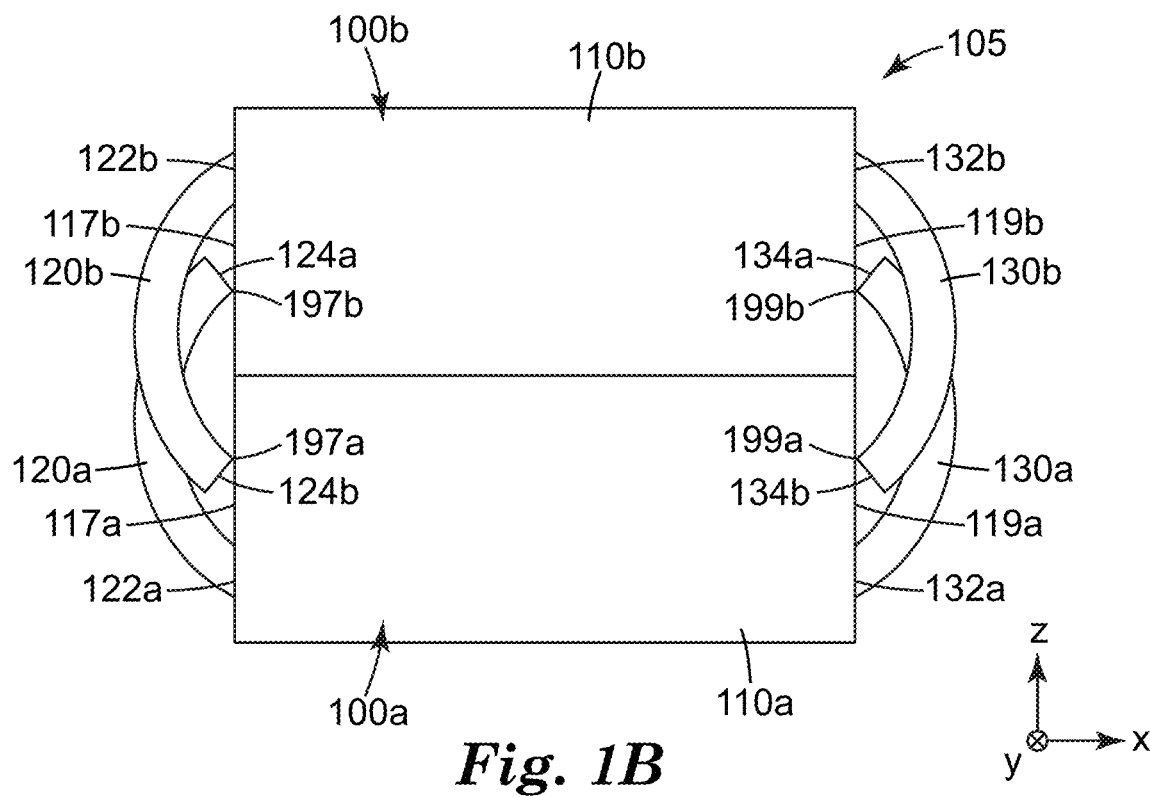
FIG. 1B is a schematic plan view of a ferrule assembly including two mated ferrules.
Figure 1C:
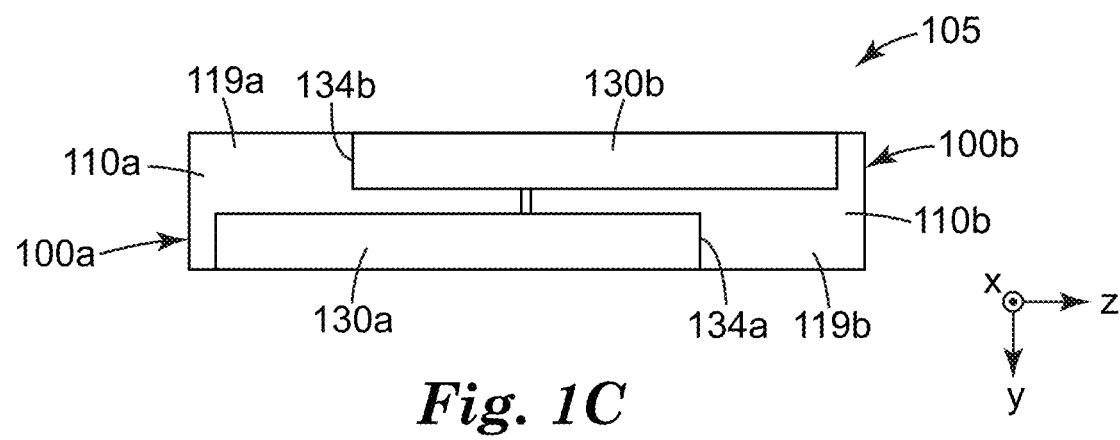
FIG. 1C is a schematic side view of the ferrule assembly of FIG. 1B.

FIGS. 1B and 1C are a schematic plan view and a schematic side view, respectively, of ferrule assembly 105 including first ferrule 100a of FIG. 1A and a second ferrule 100b mated with first ferrule 100a. Second ferrule 100b includes a body 110b, a first flexible arm 120b and a second flexible arm 130b opposite the first flexible arm 120b. Body 110b includes a first side 117b and a second side 119b opposite the first side 117b. First flexible arm 120b has a first fixed end 122b attached to the first side 117b and an opposite first free end 124b. Second flexible arm 130b has a second fixed end 132b attached to the second side 119b and an opposite second free end 134b. The first and second free ends 124a and 134a of the first ferrule contact the corresponding opposing first and second sides 117b and 119b of the second ferrule 100b. First free end 124a contacts body 110b at contact point 197b, first free end 124b contacts body 110a at contact point 197a, second free end 134a contacts body 110b at contact point 199b, and second free end 134b contacts body 110a at contact point 199a. First and second ferrules 100a and 100b may be electrical, optical or hybrid ferrules and ferrule assembly 105 may be an electrical, an optical, or a hybrid ferrule assembly. First and second sides 117a and 119a, and/or first and second sides 117b and 119b, may be substantially inflexible or may include substantially inflexible features at the contact points 197a and 199a, and/or at the contact points 197b and 199b, respectively. In other embodiments, a ferrule assembly may include a first ferrule of the present description mated with a second ferrule which does not include a compliant feature such as a flexible arm.

In FIG. 1B, the first and second free ends 124a and 134a of the first and second arms 120a and 130a are separated by the width of body 110b, which may be substantially equal to the width W of body 110a, and may be greater that the distance d when the ferrules 100a and 100b are unmated (see FIG. 1A). Similarly, the first and second ends 124b and 134b of the first and second arms 120b and 130b are separated by the width W of body 110a and may be greater that a distance between the first and second ends 124b and 134b when the ferrules 100a and 100b are unmated.

At least one of the first and second ferrules 100a and 100b may have first and second arms (120a and 130a or 120b and 130b) that have the same or different flexing properties. Such flexing properties may include the Young's modulus of the arms or the force required to deflect the arms by a given amount (which may depend on the Young's modulus and geometric factors such as a diameter or a lateral dimension of the arms). In some embodiments, the first flexing arms (first arms 120a and 120b) of the first and second ferrules 100a and 100b have same first flexing properties, and the second flexing arms (second arms 130a and 130b) of the first and second ferrules have same second flexing properties different than the first flexing properties. In some embodiments, for at least one of the first and second ferrules 100a or 100b, one of the first and second flexible arms is more flexible than the other one of the first and second flexible arms.

In the embodiment illustrated in FIG. 1A, the first and second arms 120a and 130a of first ferrule 100a are symmetrically disposed about body 110a and when first ferrule 100a is mated with second ferrule 100b, the first and second arms 120a and 130a are flexed away from their corresponding side (first side 117a and second side 119a, respectively) of the body 110a by substantially equal amounts. In other embodiments, the first and second arms may not be disposed symmetrically about the body of the ferrule. In some embodiments, for at least one of the first and second ferrules, one of the first and second flexible arms is flexed away more from its corresponding side of the body and the other one of the first and second flexible arms is flexed away less from its corresponding side of the body.

The bodies 110a and 110b can be properly aligned even if the first flexible arms 120a and 120b and the second flexible arms 130a and 130b have different flexing properties. For example, in some embodiments, first flexible arms 120a and 120b have same first flexing properties and second flexible arms 130a and 130b have same second flexing properties, with the first flexible arms 120a and 120b more flexible than the second flexible arms 130a and 130b. The forces on bodies 110a and 110b may balance in this case with the bodies aligned as in FIG. 1B.

The second ferrule 100b may be described as a mating ferrule for the first ferrule 100a (or vice versa). The z-direction may be described as a mating direction for the ferrules. In some embodiments, when a ferrule (e.g., first ferrule 100a) is mated with a mating ferrule (e.g., second ferrule 100b) along a mating direction (e.g., the z-direction), the ferrule and the mating ferrule are adapted to slide relative to one another along a first direction different from the mating direction. The first direction may be a lateral direction, such as the x-direction. In some embodiments, when a ferrule (e.g., first ferrule 100a) is mated with a mating ferrule (e.g., second ferrule 100b), the ferrule and the mating ferrule are adapted to slide relative to one another in a plane substantially parallel to a plane generally defined by the first and second flexible arms (e.g., first and second flexible arms 120a and 130a). As described elsewhere herein, the first and second arms 120a and 130a generally define a plane parallel to the x-z plane. In some embodiments, the first and second ferrules 100a and 100b may be adapted to slide relative to one another in a plane substantially parallel to the x-z plane. For example, the first and second ferrules 100a and 100b may be adapted to slide relative to each other in the lateral x-direction and/or the z-direction (mating direction).

The first and second flexible arms 120a and 130a of the first ferrule 100a and the first and second flexible arms 120b and 130b of the second ferrule 100b may guide the first and second ferrules 100a and 100b into alignment with one another when the first and second ferrules 100a and 100b are misaligned. In some embodiments, when the first ferrule 100a is mated with a second ferrule 100b along the mating direction (z-direction) and the second ferrule 100b is misaligned relative to the first ferrule 100a along a direction different from the mating direction (e.g., misaligned along the x-direction), the flexed first and second flexible arms 120a and 130a of the first ferrule 100a guide the second ferrule 100b into alignment with the first ferrule 100a. Similarly, when the first and second ferrules 100a and 100b are misaligned, the flexed first and second flexible arms 120b and 130b of the second ferrule 100b may guide the first ferrule 100a into alignment with the second ferrule 100b. In some embodiments, when the first and second ferrules 100a and 100b are misaligned relative to each other, the flexible arms of the ferrules (120a, 130a, 120b, and 130b) cooperatively guide the ferrules into alignment with each other. The first and second flexible arms 120a and 130a may be described as first and second compliant alignment features of first ferrule 100a. Similarly, the first and second flexible arms 120b and 130b may be described as first and second compliant alignment features of second ferrule 100b.

In some embodiments, in plan view, the first flexible arm of the first ferrule at least partially overlaps the first flexible arm of the second ferrule, and the second flexible arm of the first ferrule at least partially overlaps the second flexible arm of the second ferrule. In some embodiments, in plan view, the flexible arms of the first and second ferrules on a same side of the ferrule assembly at least partially overlap each other. For example, as illustrated in FIG. 1B, in plan view, the first flexible arm 120a of the first ferrule 100a and the first flexible arm 120b of the second ferrule 100b partially overlap each other, and the second flexible arm 130a of the first ferrule 100a and the second flexible arm 130b of the second ferrule 100b partially overlap each other.

In some embodiments, in side view, when the ferrules are fully mated the first flexible arms of the first and second ferrules extend beyond each other, and the second flexible arms of the first and second ferrules extend beyond each other. In some embodiments, in side view, the flexible arms of the first and second ferrules on a same side of the ferrule assembly extend beyond each other. In some embodiments, in side view, the first flexible arms of the first and second ferrules are vertically offset relative to each other, and the second flexible arms of the first and second ferrules are vertically offset relative to each other. In some embodiments, in side view, the flexible arms of the first and second ferrules on a same side of the ferrule assembly are vertically offset relative to each other. For example, as illustrated in FIG. 1C, in side view, first flexible arm 130a of first ferrule 100a extends beyond first flexible arm 130b of second ferrule 100b since the free end 134a extends further in the z-direction (mating direction) than the free end 134b. Also, as illustrated in FIG. 1C, the first flexible arm 130a of the first ferrule 100a and the first flexible arm 130b of the second ferrule 100b are vertically (y-direction) offset from each other.

Figure 1D:
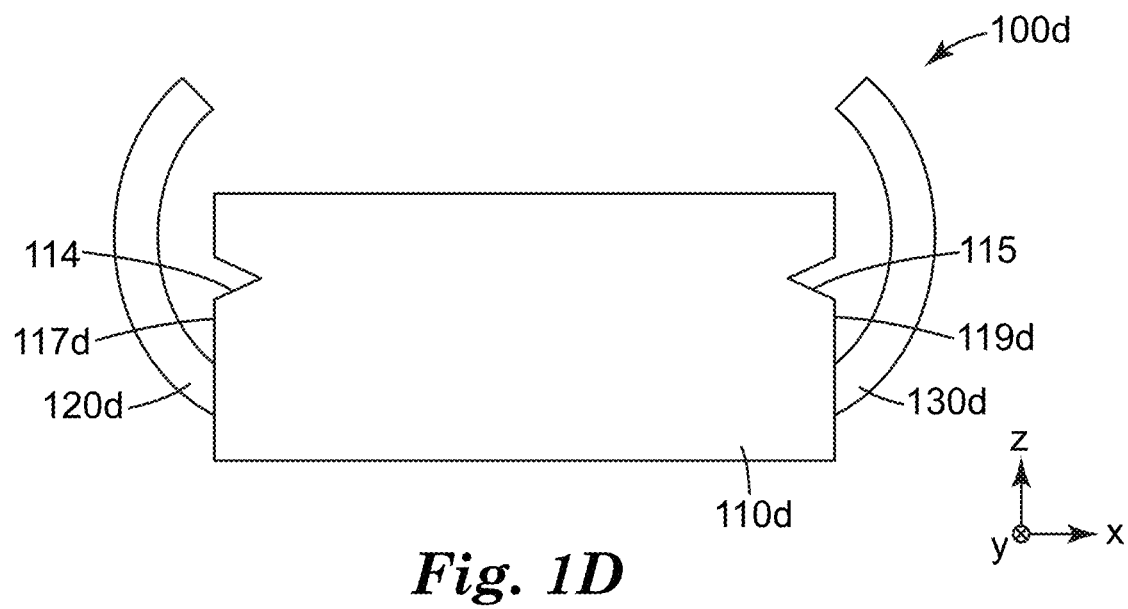
FIG. 1D is a schematic plan view of a ferrule.

In some embodiments, the separation distance between the free ends 124a and 134a of the first ferrule 100a may increase as the first ferrule 100a moves in the mating direction toward the second ferrule 100b and may reach a maximum distance when the first and second ferrules 100a and 100b are fully mated. In other embodiments, the body of the ferrules may include one or more indented features, latching features, divots or other structures which allow the separation between the arms to decrease when the first and second ferrules 100a and 100b are mated relative to a maximum separation that is obtained after the flexible arms of the first ferrule 100a contact the second ferrule 100b but before the first and second ferrules 100a and 100b are fully mated. This is illustrated FIG. 1D which is a schematic plan view of ferrule 100d including a body 110d having a first flexible arm 120d and a second flexible arm 130b opposite the first flexible arm 120d. Body 110d includes a first side 117d and a second side 119d opposite the first side 117d. First side 117d includes a first indented or latching feature 114 and second side 119d includes a second indented or latching feature 115. When ferrule 100d is fully mated with a mating ferrule having first and second flexible arms (e.g., another ferrule 100d), the first and second flexible arms of the mating ferrule contact ferrule 100d at the first and second indented or latching features 114 and 115, respectively. Prior to being fully mated with the mating ferrule, as the ferrule 100d approaches the mating ferrule along the mating direction (z-direction) a separation between the free ends of the arms of the mating ferrule increases as the free ends contact the body 110d, reaches a maximum distance and then decreases when the free ends contact the first and second indented or latching features 114 and 115.

In some embodiments, a connector includes a housing and a ferrule of the present description disposed at least partially inside the housing. The housing can function to prevent dirt from interfering with optical connections, for example. The housing can provide the retention force, e.g., via a spring mechanism, to maintain the ferrules in positive contact, as well as a latching and release mechanism for mating and de-mating the connector. In addition, the housing can protect an optical ferrule from outputting stray light that can be a safety hazard to those nearby. In some embodiments, the housing can have a latching mechanism to prevent its accidental opening. In some embodiments, the housing can have a door mechanism that may be opened by the action of mating two connectors.

Figure 2A:
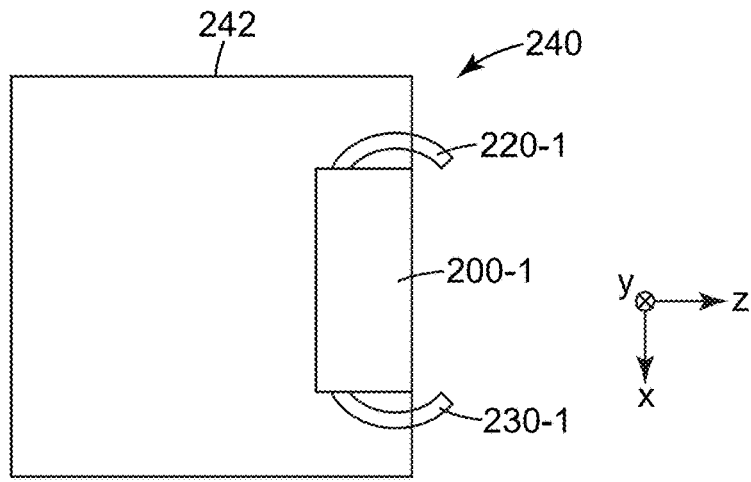
FIG. 2A is a schematic plan view of a connector.
Figure 2B:
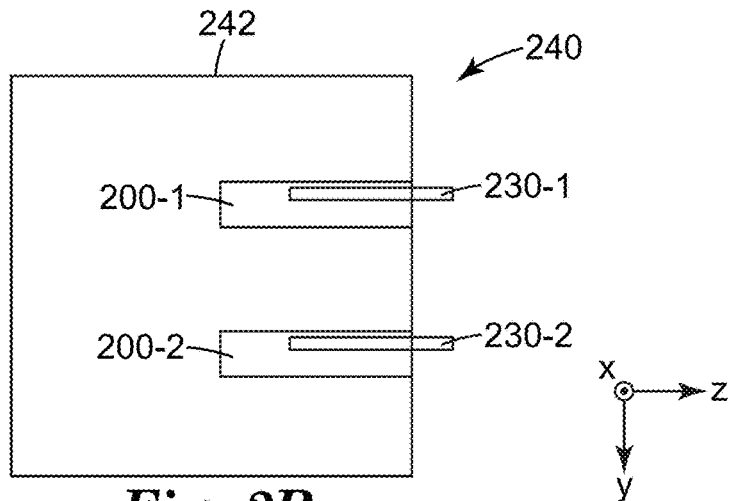
FIG. 2B is a schematic side view of the connector of FIG. 2A.
Figure 2C:
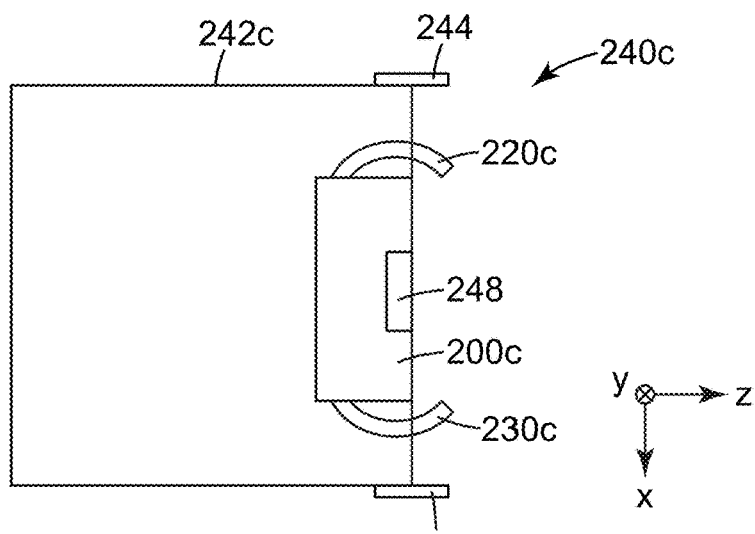
FIG. 2C is a schematic plan view of a connector.

FIGS. 2A and 2B are a schematic plan view and a side cross-sectional view, respectively, of connector 240 including ferrules 200-1 and 200-2 disposed partially within housing 242 (which is shown as transparent in the figures so that the ferrules are visible). In the illustrated embodiment, ferrule 200-1 includes first and second arms 220-1 and 230-1 and ferrule 200-2 includes a first arm (not illustrated) and a second arm 230-2. In other embodiments, ferrules 200-1 and 200-2 may correspond to ferrule 900 (see FIGS. 9A-9B) or ferrule 1500 (see FIGS. 15A-15C), for example, and may each include first and second alignment features with one of the alignment features expandable or compressible as described elsewhere herein. The z-direction is a mating direction for connector 240. In some embodiments, the housing includes a feature defining a mating direction of the connector. This is illustrated in FIG. 2C which is a schematic plan view of connector 240c including ferrule 200c having first and second arms 220c and 230c disposed partially in housing 242c. Housing 242c includes alignment features 244 that are configured to align connector 240c with a mating connector. The alignment features 244 define a mating direction for the connector 240c, which, in the illustrated embodiment, is the z-direction. In some embodiments, the alignment features 244 may mate with corresponding alignment features in a mating connector.

In some embodiments, the ferrules of the present description may be optical ferrules, may be electrical ferrules, or may be hybrid ferrules. In some embodiments, a ferrule of the present description may be an optical ferrule and may include an optically transparent portion for propagating an optical signal therein. In some embodiments, a ferrule of the present description may be an electrical ferrule and may include an electrically conductive portion for propagating an electrical signal therein. For example, ferrule 200c also includes portion 248, which may be an electrically conductive portion (e.g., portion 248 may include electrically conductive elements that may be used to attach wires to the ferrule 200c and/or may include electrically conductive elements configured to electrically connect to corresponding electrically conductive elements of a mating ferrule) or may be an optically transparent portion (e.g., portion 248 may include a light redirecting member for changing a direction of light propagating within the ferrule, as described further elsewhere herein).

In the embodiment illustrated in FIGS. 2A-2B, two ferrules are disposed in housing 242. In other embodiments, fewer or more ferrules may be included in housing 242. For example, a connector may include 1, 2, 3, 4, 5, 6 or more ferrules. In some embodiments, a connector may include 1-20 ferrules, or 1-100 ferrules, or 1-250 ferrules, for example, at least partially disposed within a housing of the connector. In some embodiments, the ferrules may be arranged in the connector in a two-dimensional array which may include two or more rows with each row including two or more stacks of ferrules.

The ferrules may be disposed in a connector housing with a major axis of the ferrule aligned with a major axis of the connector housing. Alternatively, the ferrules may be disposed in a connector housing with a major axis of the ferrule at a skew angle relative to a major axis of the connector housing. In this case, the ferrules may be adapted to rotate relative to the connector housing as the connector approaches and engages with a mating connector.

Figure 3A:
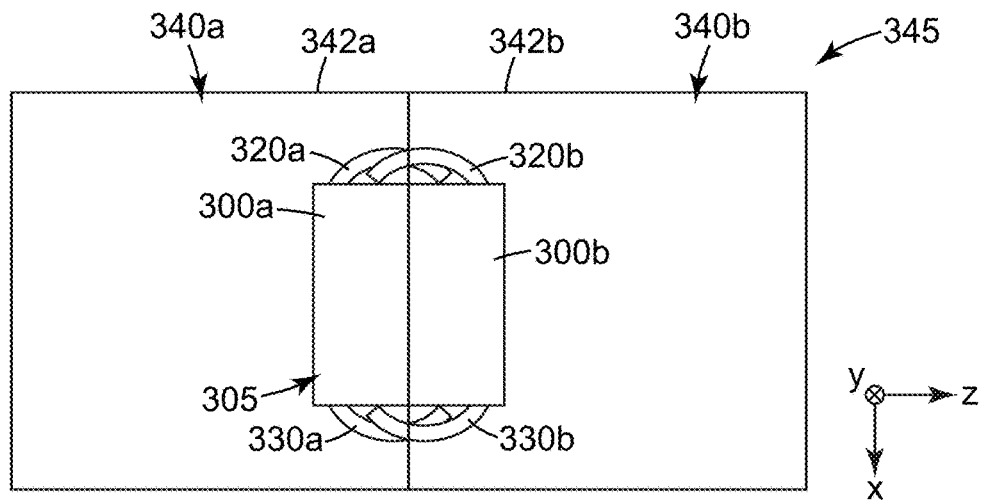
FIG. 3A is a schematic plan view of two mated connectors.
Figure 3B:
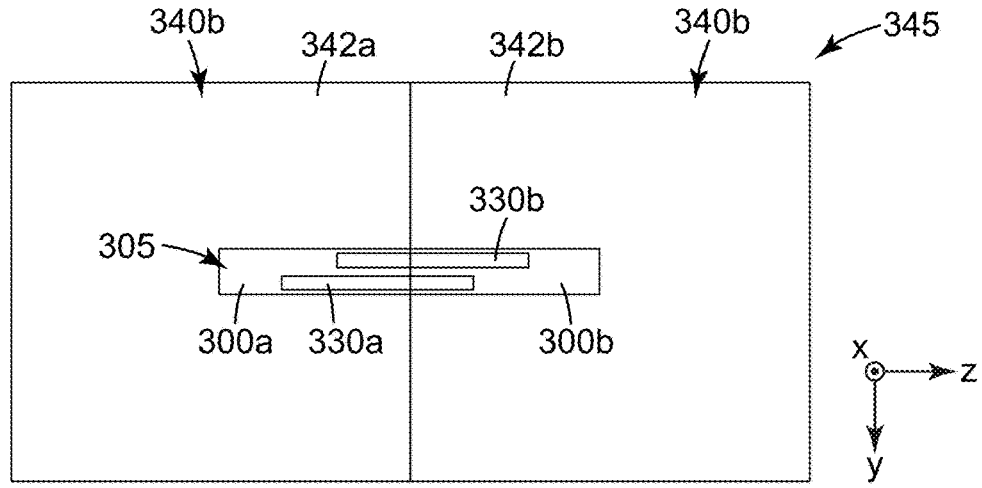
FIG. 3B is a schematic side view of the mated connectors of FIG. 3A.

FIGS. 3A-3B show a schematic plan view and a schematic side cross-sectional view, respectively, of connector assembly 345 including mated first and second connectors 340a and 340b. First connector 340a includes a first housing 342a and a first ferrule 300a disposed at least partially inside the first housing 342a (which is shown as transparent in the figures so that the ferrules are visible). Second connector 340b includes a second housing 342b and a second ferrule 300b disposed at least partially inside the second housing 342b (which is shown as transparent in the figures so that the ferrules are visible). First and second ferrules 300a and 300b may correspond to any of the ferrules of the present description, such as, for example, first and second ferrules 100a and 100b. In the illustrated embodiment, first ferrule 300a includes first and second flexible arms 320a and 330a, and second ferrule 300b includes first and second flexible arms 320b and 330b. In other embodiments, first and second ferrules 300a and 300b may correspond to the ferrules 1000a and 1000b (see FIG. 10) or the ferrules 1600a and 1600b (see FIG. 16), for example, and may each include first and second alignment features with one of the features expandable or compressible as described elsewhere herein. First and second ferrules 300a and 300b are mated together to form ferrule assembly 305. The first and second flexible arms 320a and 330a of the first ferrule 300a are flexed away from the respective first and second sides of the body of the first ferrule 300a, and the first and second free ends of the flexible arms of the first ferrule 300a contact the second ferrule 300b. The first and second flexible arms 320b and 330b of the second ferrule 300b are flexed away from the respective first and second sides of the body of the second ferrule 300b, and the first and second free ends of the flexible arms of the second ferrule 300b contact the first ferrule 300a.

In the embodiment illustrated in FIGS. 3A-3B, a single ferrule is partially disposed in each of the housings 342a and 342b when the connectors are disconnected (when the connectors are connected a portion (the arms) of the ferrule of one connector may be partially disposed in the housing of the other connector). In other embodiments, a plurality of ferrules may be at least partially disposed in each of the housings when the connectors are disconnected.

In some embodiments, ferrule 300a is an optical ferrule adapted to be optically coupled to an optical signal carrier that may include at least one of an optical waveguide, an optoelectronic device, and an optical element. Ferrule 300a may be adapted to transfer an optical signal carried by the optical signal carrier to ferrule 300b, which may be a mating optical ferrule. In some embodiments, ferrule assembly 305 may include a first optical signal carrier including at least one of an optical waveguide, an optoelectronic device, and an optical element coupled to ferrule 300a, and may include a second optical signal carrier including at least one of an optical waveguide, an optoelectronic device, and an optical element coupled to ferrule 300b. In some embodiments, each of the first and second optical signal carriers includes one or more optical waveguides. In some embodiments, the first optical signal carrier is one or more optical waveguides and the second optical signal carrier is an optical detector. In some embodiments, the optical waveguides include one or more optical fibers. Any of the optical fibers may be a single-mode optical fiber at a wavelength in a range from about 1200 nm to about 1700 nm. Any of the optical fibers may be a multi-mode optical fiber at a wavelength in a range from about 600 nm to about 1700 nm. First ferrule 300a may be adapted to be optically coupled to an optical signal carrier and transfer an optical signal carried by the optical signal carrier to second ferrule 300b. First ferrule 300a may also be adapted to be electrically coupled to an electrically conductive element and transfer an electrical signal carried by the electrically conductive element to the second ferrule 300b. In some embodiments, each of first and second ferrules 300a and 300b is adapted to transfer both optical and electrical signals.

Figure 3C:
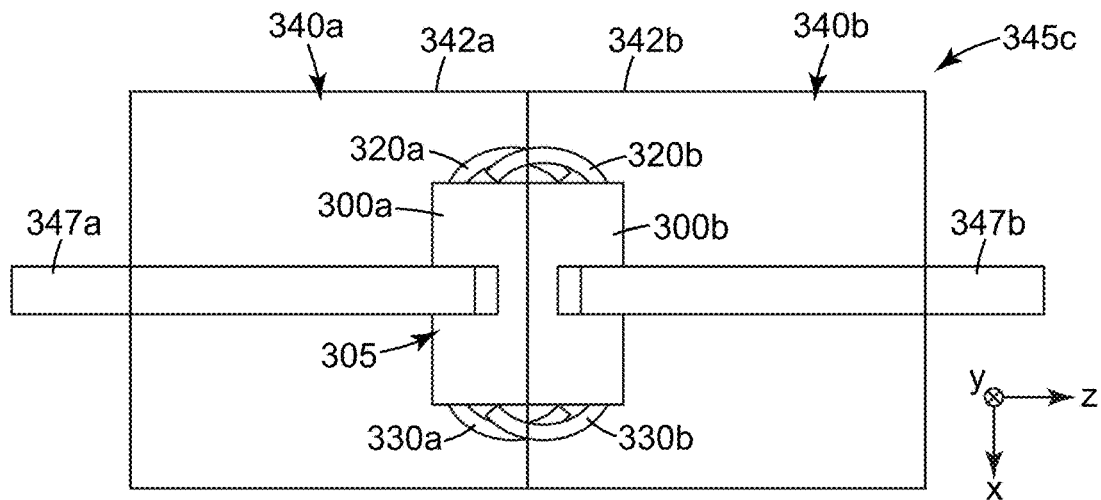
FIG. 3C is a schematic plan view of two mated connectors.

FIG. 3C is a schematic top plan view of connector assembly 345c which includes the connector assembly 345 of FIG. 3A and includes first and second signal carriers 347a and 347b coupled to first and second ferrules 300a and 300b, respectively. First signal carrier 347a includes portion 349a, and second signal carrier 347b includes portion 349b. Each of ferrule 300a and 300b may be an electrical ferrule, or may be optical ferrule, or may be a hybrid ferrule. In some embodiments, one or both of first and second signal carriers 347a and 347b may be electrical signal carriers such as a first and second wire, respectively, or such as a first and second plurality of wires, respectively. One or both of portions 349a and 349b may be electrically conductive elements that may be used to attach the wires to the ferrules. In some embodiments, one or both of first and second signal carriers 347a and 347b may be optical signal carriers such as a first and second optical waveguide, respectively, or such as a first and second plurality of optical waveguides, respectively. Portions 349a and 349b may include one or more lenses, mirrors, prisms or optical filters, for example. In some embodiments, one or both of first and second signal carriers 347a and 347b may be or may include at least one of an optical waveguide, an optoelectronic device, an optical detector, an optical emitter.

In some embodiments, both first and second ferrules 300a and 300b are electrical ferrules, both first and second signal carriers 347a and 347b are electrical signal carriers, and the first and second ferrules 300a and 300b electrically connect the first and second signal carriers 347a and 347b. In some embodiments, both first and second ferrules 300a and 300b are optical ferrules, both first and second signal carriers 347a and 347b are optical signal carriers, and the first and second ferrules 300a and 300b optically connect the first and second signal carriers 347a and 347b. In some embodiments, both first and second ferrules 300a and 300b are hybrid ferrules, both first and second signal carriers 347a and 347b carry optical and electrical signals, and the first and second ferrules 300a and 300b optically and electrically connect the first and second signal carriers 347a and 347b. In some embodiments, first ferrule 300a is a hybrid ferrule, portion 349a includes an optoelectronic device (e.g., an optical detector) that receives an optical signal on the first signal carrier 347a and produces an electrical signal which is transferred to second ferrule 300b and from second ferrule 300b to second signal carrier 347b which may be or may include a wire or a plurality of wires. In some embodiments, first ferrule 300a is a hybrid ferrule, portion 349a includes an optoelectronic device (e.g., an optical emitter) that receives an electrical signal on the first signal carrier 347a and produces an optical signal which is transferred to second ferrule 300b and from second ferrule 300b to second signal carrier 347b which may be or may include an optical fiber or a plurality of optical fibers.

In some embodiments, one or both of first and second signal carriers 347a and 347b include a cable that is attached to the respective housing 342a or 342b. The cable(s) may be flexed within the housing when the connectors 340a and 340b are mated, and compression in the cable(s) may provide a force in the mating direction (z-direction) on the first and second ferrules 300a and 300b which help hold the ferrules in position.

In some embodiments, a connector is adapted to mate with a mating connector along a mating direction in a mating plane where the connector has at least one flexing element such that when the connector is mated with the mating connector, the at least one flexing element makes contact with the mating connector and is flexed. The connector and the mating connector may be adapted to slide relative to each other in the mating plane. In some embodiments, when the connector is mated with the mating connector, and the connector and the mating connector are misaligned relative to each other in the mating plane, the flexed flexing element guides the two connectors into alignment with each other. For example, connector 340a is adapted to mate with connector 340b along a mating direction (the z-direction) in a mating plane (the x-z plane). Connector 340a includes at least one flexing element (first and second flexible arms 320a and 330a) which guides or helps guide the connectors into alignment with each other. As another example, first ferrule 300a may be considered to be a connector adapted to mate with second ferule 300b, which may be considered to be a mating connector. In some embodiments, the housing 342a of the connector 340a and/or the housing 342b of the connector 340b may also include one or more alignment features, such as alignment features 244 (FIG. 2C), for example.

Figure 4A:
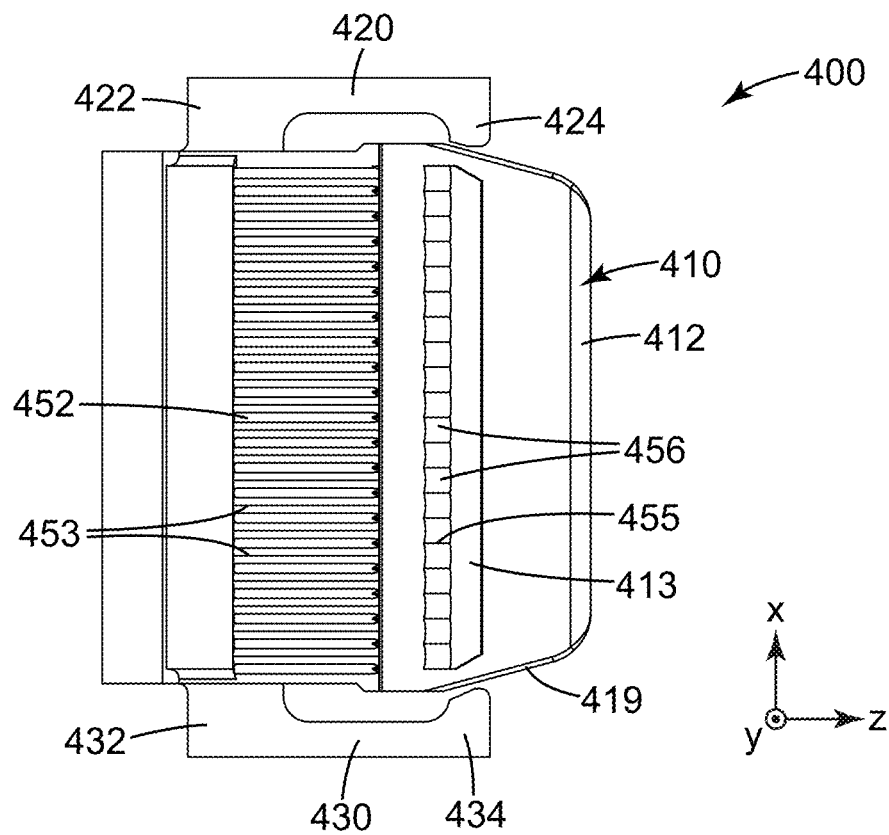
FIG. 4A is a top view of a ferrule.
Figure 4B:
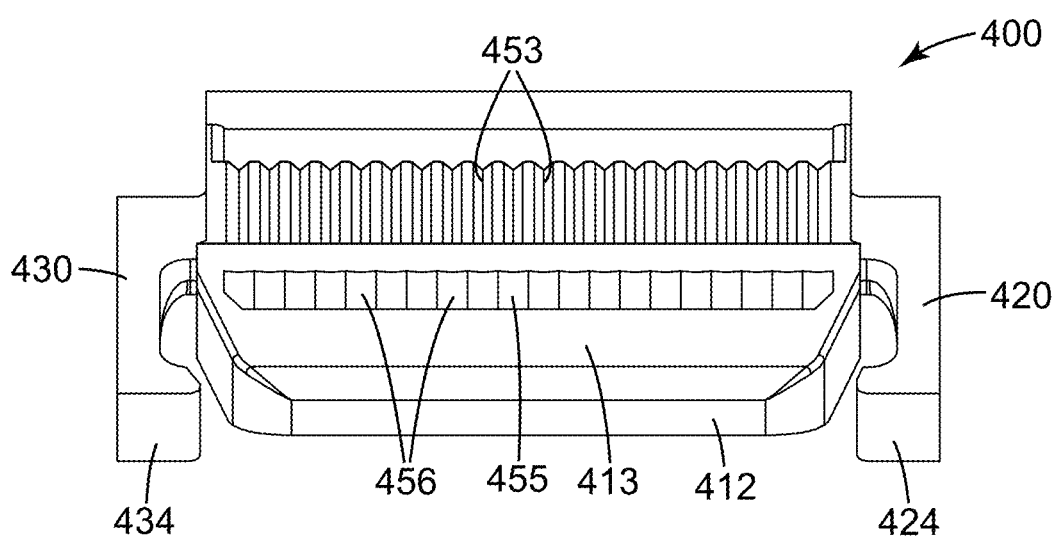
FIG. 4B is a front perspective view of the ferrule of FIG. 4A.
Figure 5A:
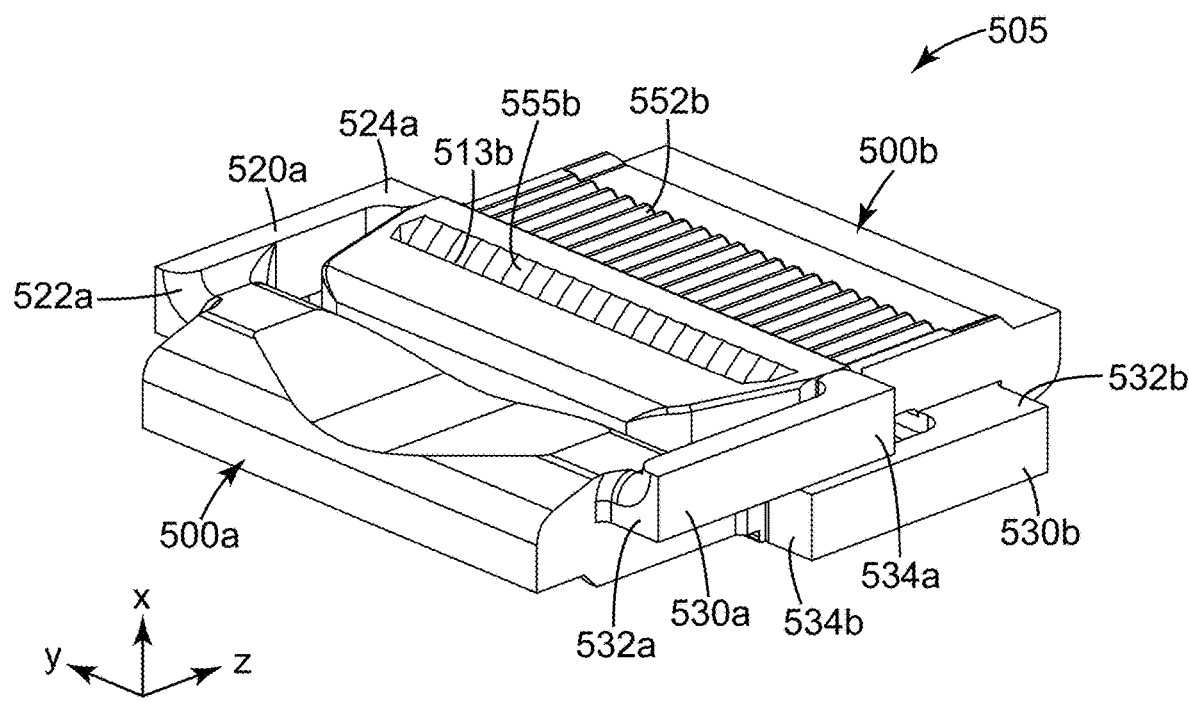
FIG. 5A is a perspective view of a ferrule assembly including two mated ferrules.
Figure 5B:
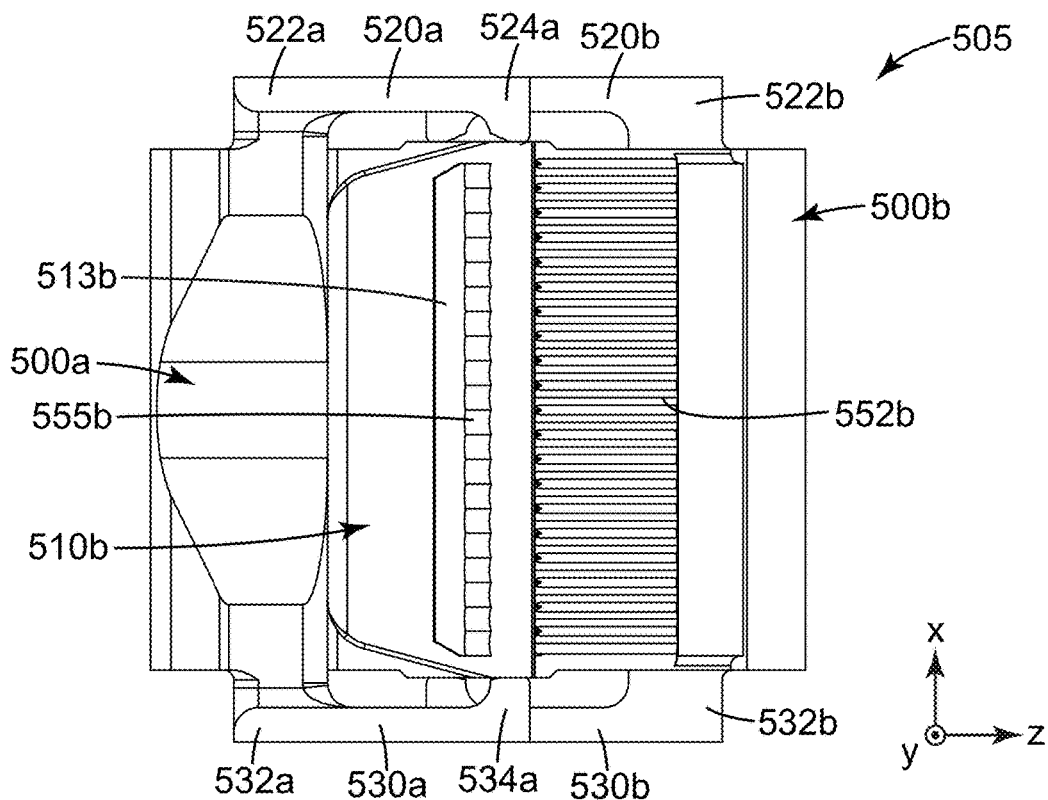
FIG. 5B is a top view of the ferrule assembly of FIG. 5A.
Figure 5C:
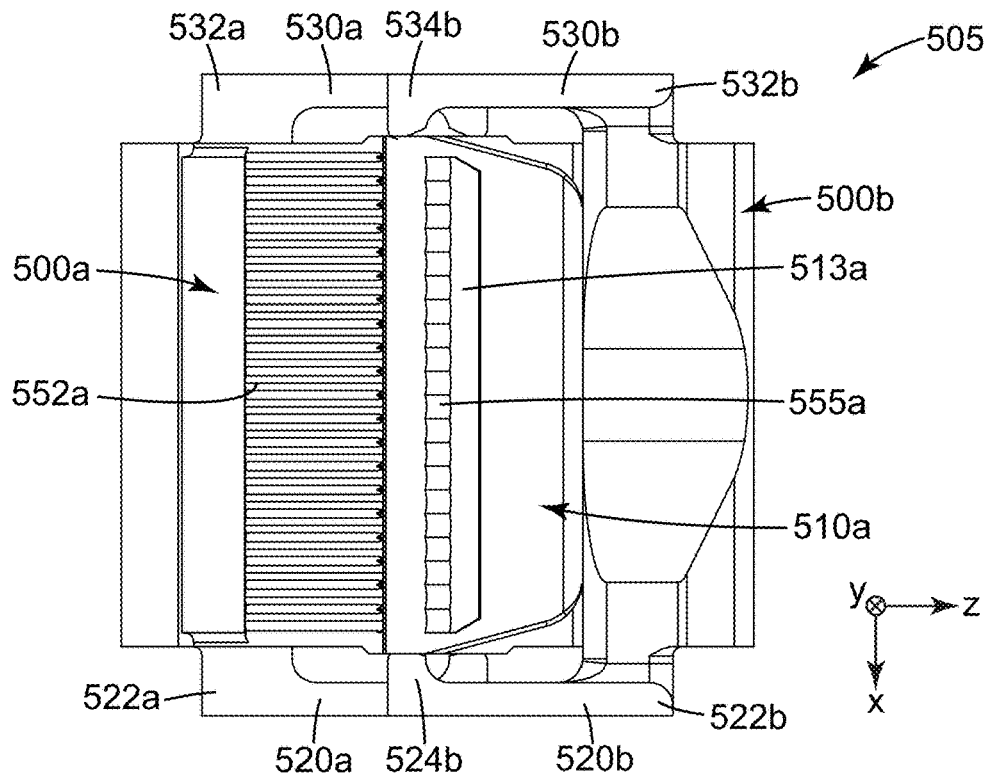
FIG. 5C is a bottom view of the ferrule assembly of FIG. 5A.
Figure 5D:
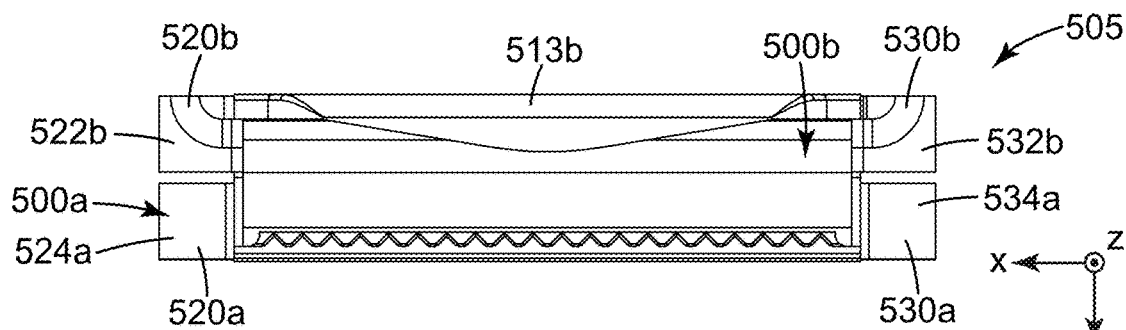
FIG. 5D is a back view of the ferrule assembly of FIG. 5A.
Figure 5E:
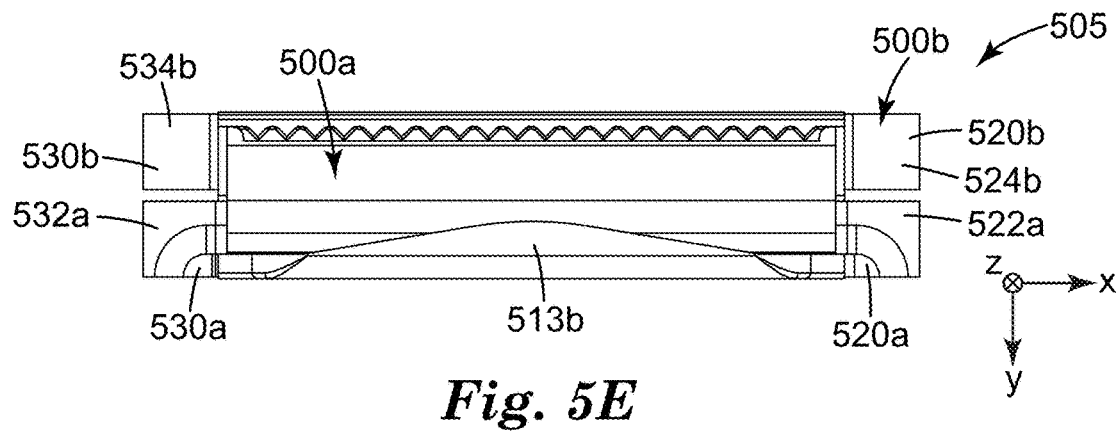
FIG. 5E is a front view of the ferrule assembly of FIG. 5A.

FIGS. 4A and 4B are a top plan view and a perspective front view, respectively, of ferrule 400 including body 410 and opposing first and second flexible arms 420 and 430 on opposite sides of body 410. First and second arms 420 and 430 are spaced apart from body 410. First arm 420 has a first fixed end 422 attached to the body 410 and has an opposite first free end 424. Second arm 430 has a second fixed end 432 attached to the body 410 and has an opposite second free end 434. Ferrule 400 includes a mating portion 413 disposed between the first and second free ends 424 and 434. Ferrule 400 may be a unitary optical ferrule and may be at least partially disposed in a housing of a connector, such as, for example, connector 240 or 240c of FIGS. 2A-2C. Ferrule 400 includes optical waveguide alignment member 452 which may be used for receiving, aligning and attaching a plurality of optical waveguides to the ferrule 400. In some embodiments, the plurality of optical waveguides may be permanently attached (e.g., with adhesive) to ferrule 400 through optical waveguide alignment member 452. Optical waveguide alignment member 452 includes a plurality of groves 453, which may be v-grooves. One or more optical waveguides, such as optical fibers, may be attached to one or more of the groves 453. Ferrule 400 also includes light redirecting member 455 for changing a direction of light propagating within the ferrule 400. In some embodiments, light redirecting member 455 includes a plurality of surfaces 456 which can change the direction of light propagating from an optical fiber disposed in a groove 453 in optical waveguide alignment member 452 via total internal reflection (TIR) from one of the plurality of surfaces 456. The plurality of surfaces 456 may be plurality of curved surfaces designed to nominally collimate the light, for example. In some embodiments, surfaces 456 may include a reflective coating, for example, or otherwise be made reflective. In some embodiments, ferrule 400 includes an optical window, e.g., a recessed optical window, on a side of mating portion 413 opposite the light redirecting member 455. The optical window may be coated with an antireflective coating.

In the embodiment illustrated in FIG. 4A, neither of the first and second flexible arms 420 and 430 extend beyond a front most edge 412 of the body 410. The first free end 424 is adjacent to and faces the first side 417 of the body 410, and the second free end 434 is adjacent to and faces the second side 419 of the body 410.

The first and second arms 420 and 430 are configured such that when the ferrule 400 is mated with a mating ferrule, at least one of the arms is flexed away from the body 410, and both free ends 424 and 434 contact the mating ferrule. In some embodiments, the first and second arms 420 and 430 have the same or about the same flexibility. In some embodiments, one of the arms is substantially more flexible than the other. In some embodiments, one, but not both, of the arms is substantially rigid. In some cases, ferrule 400 may be mated with another ferrule that also includes a mating portion disposed between free ends of two arms. In some embodiments, when the ferrule 400 is mated with another ferrule and the two ferrules are misaligned relative to each other, the opposing arms of the two ferrules cooperatively direct the two mating portions to slide over each other bringing the two ferrules into alignment with each other.

In some embodiments, as ferrule 400 moves along a mating direction toward a mating ferrule, the free ends 424 and 434 of the first and second flexible arms 420 and 430 contact the mating ferrule, and as the ferrule 400 continues to move along the mating direction (the z-direction) toward the mating ferrule, the flexible arms begin to flex away from the body while remaining in contact with the mating ferrule, so that the flexible arms are maximally flexed away from the body when the ferrule is mated with the mating ferrule. The separation distance between the free ends 424 and 434 may increase as the ferrule 400 moves in the mating direction toward the mating ferrule and may reach a maximum distance when the ferrule 400 is mated with the mating ferrule. In other embodiments, the body of the mating ferrule may include divots or other structures which allow the separation between the arms to decrease when the ferrule is mated with the mating ferrule relative to a maximum separation that is obtained after the flexible arms contact the mating ferrule but before the ferrule is mated with the mating ferrule.

FIGS. 5A-5E are perspective, top plan, bottom plan, back view and front view, respectively, of ferrule assembly 505 including mated first and second ferrules 500a and 500b. Each of the first and second ferrules 500a and 500b may correspond to ferrule 400. First ferrule 500a includes body 510a and opposing first and second arms 520a and 530a on opposite sides of body 510a. First and second arms 520a and 530a include first and second free ends 524a and 534a, respectively, and include first and second fixed ends 522a and 532a, respectively. First ferrule 500a includes optical waveguide alignment member 552a and light redirecting member 555a. Second ferrule 500b includes body 510b and opposing first and second arms 520b and 530b on opposite sides of body 510b. First and second arms 520b and 530b include first and second free ends 524b and 534b, respectively, and include first and second fixed ends 522b and 532b, respectively. Second ferrule 500b includes optical waveguide alignment member 552b and light redirecting member 555b. First ferrule 500a includes mating portion 513a and second ferrule 500b includes mating portion 513b. The mating portions 513a and 513b are stacked in a direction (y-direction) perpendicular to the mating direction (z-direction). In some embodiments, the mating portions 513a and 513b are adapted to slide relative to each other.

Figure 6A:
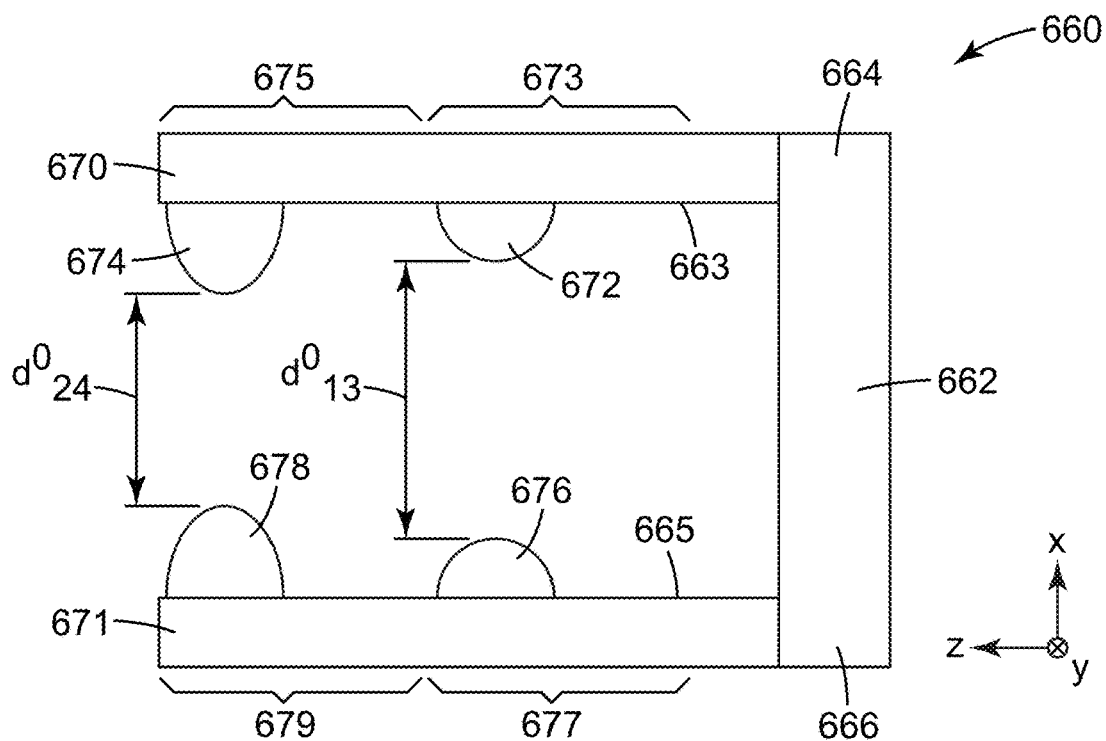
FIGS. 6A-6C are schematic top views of an alignment frame.
Figure 6B:
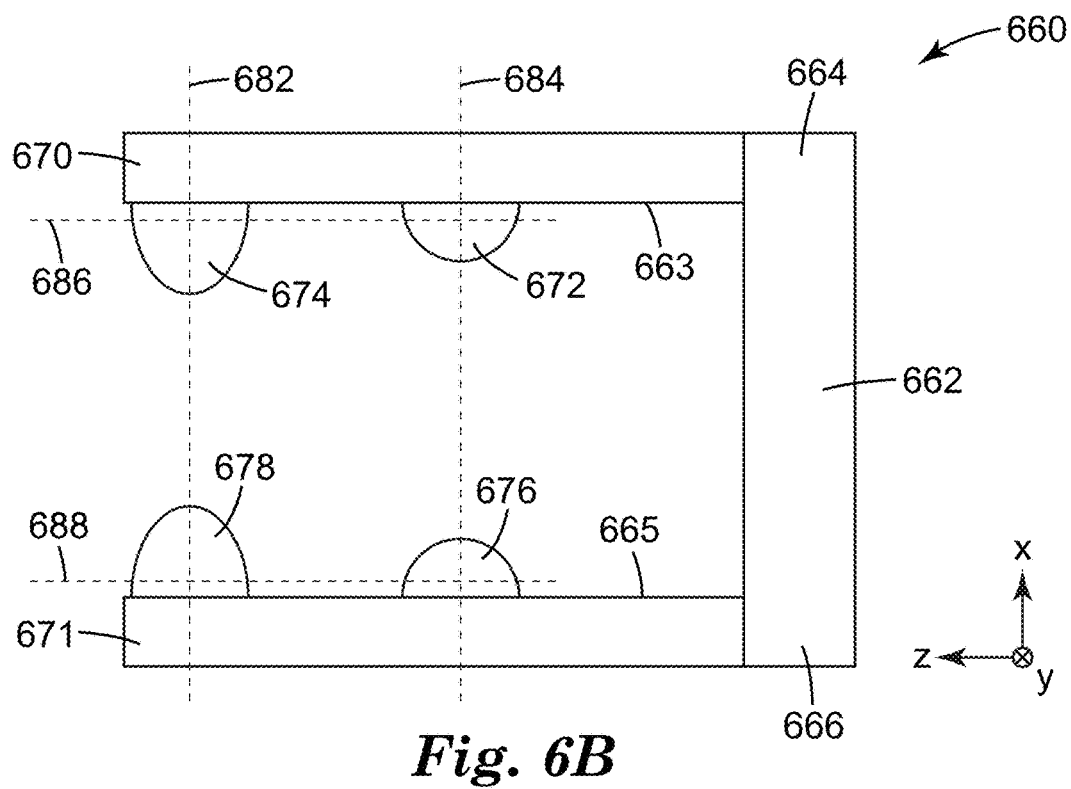
Figure 6C:
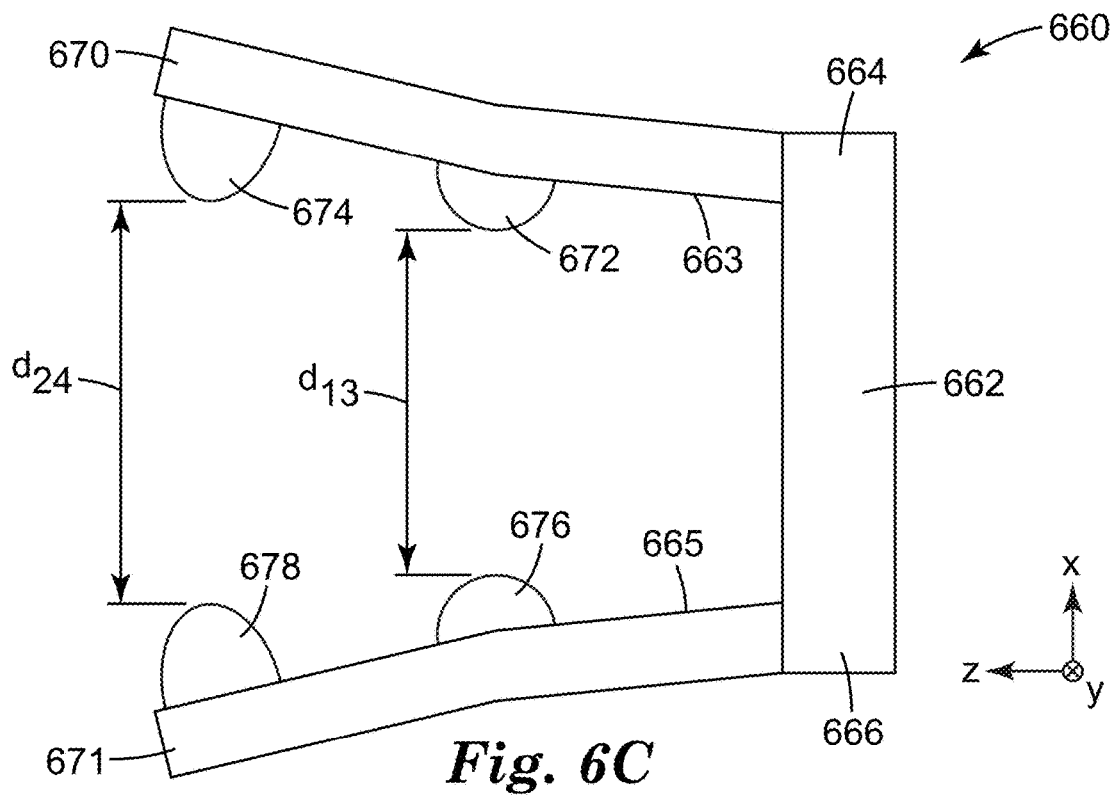

In some embodiments, an alignment frame for facilitating a mating of a first ferrule to a second ferrule along a mating direction is provided. This is illustrated in FIGS. 6A-6C which are schematic top views of alignment frame 660 including base 662 having opposing ends 664 and 666, and first and second arms 670 and 671 extending from opposing ends 664 and 666. Alignment frame 660 can be used with any type of ferrule, for example, electrical ferrules, optical ferrules, or hybrid ferrules. First arm 670 includes spaced apart first and second flexible features 672 and 674 disposed on an inner surface 663 of first arm 670 facing second arm 671, and second arm 671 includes spaced apart third and fourth flexible features 676 and 678 disposed on inner surface 665 of second arm 671 facing first arm 670. First arm 670 includes first and second portions 673 and 675 and second arm 671 includes first and second portions 677 and 679. First portion 673 and first portion 677 are relatively closer to the base 662 and second portion 675 and second portion 679 are relatively farther from the base 662. First flexible feature 672 is disposed on first portion 673 of first arm 670, second flexible feature 674 is disposed on second portion 675 of first arm 670, third flexible feature 676 is disposed on first portion 677 of second arm 671, and fourth flexible feature 678 is disposed on second portion 679 of second arm 671.

As illustrated in FIG. 6B, in some embodiments, the first and second flexible features 672 and 674 lie on a first straight line 686 substantially parallel to the mating direction (the z-direction), and the third and fourth flexible features 676 and 678 lie on a second straight line 688 different than and substantially parallel to the first straight line 686. In some embodiments, the first and third flexible features 672 and 676 lie on a third straight line 684 substantially perpendicular to the mating direction, and the second and fourth flexible features 674 and 678 lie on a fourth straight line 682 different than and substantially parallel to the third straight line 684. In some embodiments, the first, second, third and fourth flexible features 672, 674, 676 and 678 lie substantially in a same plane (e.g., the x-z plane of FIGS. 6A-6C).

First and second flexible features 672 and 674 may be flexible by being made of a flexible (e.g., elastic) material and/or first and second flexible features 672 and 674 may be flexible by virtue of being disposed on first arm 670 which may be flexible. Similarly, third and fourth flexible features 676 and 678 may be flexible by being made of a flexible (e.g., elastic) material and/or third and fourth flexible features 676 and 678 may be flexible by virtue of being disposed on second arm 671 which may be flexible. The first and second flexible features 672 and 674 may have substantially the same or different flexing properties, and the third and fourth flexible features 676 and 678 may have substantially the same or different flexing properties. The first and second portions 673 and 675 of first arm 670 may have substantially the same or different flexing properties and the first and second portions 677 and 679 of second arm 671 may have substantially the same or different flexing properties. The first and third flexible features 672 and 676 may have substantially the same first flexing properties and the second and fourth flexible features 674 and 678 may have substantially the same second flexing properties. The first and second flexing properties may be the substantially the same or may be different. The flexing properties may include an elastic modulus or may include the force required to deflect a flexible feature by a given amount or by a given percentage. Flexing properties can be adjusted by selecting materials to give a desired modulus (e.g., Young's modulus), for example, or by adjusting geometric parameters (e.g., diameters, or lateral dimensions, of the first and second arms or of the first and/or second portions) of the first and second arms 670 and 671 and/or of the flexible features 672, 674, 676 and 678.

When the alignment frame is not engaging a ferrule, the opposing first and third flexible features are separated by a distance $d^0_{13}$ and the opposing second and fourth flexible features 674 and 678 are separated by a distance $d^0_{24}$. In some embodiments, when the alignment frame 660 facilitates a mating of a first ferrule to a second ferrule resulting in the first ferrule being mated to the second ferrule, the first and second flexible features 672 and 674 are flexed in a same first direction (the positive x-direction), and the third and fourth flexible features 676 and 678 are flexed in a same second direction (the negative x-direction) opposite the first direction. In some embodiments, when the alignment frame 660 facilitates a mating of a first ferrule to a second ferrule resulting in the first ferrule being mated to the second ferrule, the opposing first and third flexible features 672 and 676 are each flexed outwardly by the first ferrule a first distance and the opposing second and fourth flexible features 674 and 678 are each flexed outwardly by the second ferrule a second distance greater than the first distance. This is schematically illustrated in FIGS. 6A-C.

FIG. 6A shows the positions of the flexible features and the arms when the alignment frame 600 is not engaging a ferrule. FIG. 6C shows the positions of the flexible features and the arms that could be obtained when the alignment frame 600 facilitates the mating of first and second ferrules (not shown). The first and third flexible features 672 and 676 are separated by a distance $d^0_{13}$ prior to engaging the first and second ferrules and are separated by a distance $d_{13}$ after engaging the first and second ferrules. Similarly, the second and fourth flexible features 674 and 678 are separated by a distance $d^0_{24}$ prior to engaging the first and second ferrules and are separated by a distance $d_{24}$ after engaging the first and second ferrules. The first and second arms 670 and 671 may be curved outward from each other. The difference between $d_{24}$ and $d^0_{24}$ may be greater than the difference between $d_{13}$ and $d^0_{13}$ and may be greater than a distance that would have been obtained if the first and second arms 670 and 671 did not curve outward from one another.

Figure 7A:
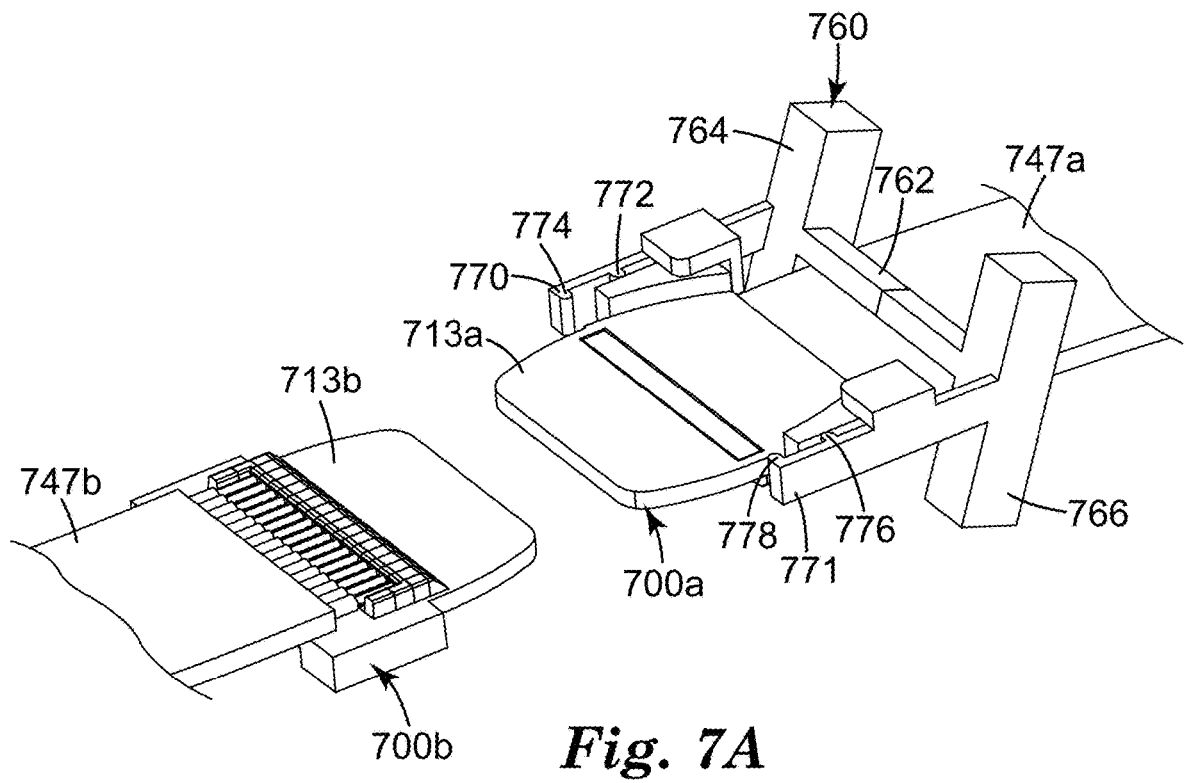
FIG. 7A is a perspective view of an alignment frame configured to facilitate the mating of first and second ferrules.

FIG. 7A is a perspective view of alignment frame 760 configured to facilitate the mating of first and second ferrules 700a and 700b and thereby providing a connection between first and second signal carriers 747a and 747b, which in the illustrated embodiment, are optical fibers in a fiber ribbon. In other embodiments, the first and/or the second signal carriers may be electrical or hybrid signal carriers (e.g., a cable with both optical fibers and copper conductors). First ferrule 700a includes a mating portion 713a and second ferrule 700b includes a corresponding mating portion 713b. Alignment frame 760 includes base 762 having opposing first and second ends 764 and 766, and includes opposing first and second arms 770 and 771 which extend forwardly from the opposing ends 764 and 766 of the base 762. First arm 770 includes spaced apart first and second flexible features 772 and 774 disposed on an inner surface of the first arm 770 and facing the second arm 771, and second arm 771 includes spaced apart first and second features 776 and 778 disposed on an inner surface of the second arm 771 and facing the first arm 770. When the alignment frame 760 facilitates the mating of the first ferrule 700a to the second ferrule 700b resulting in the first ferrule 700a being mated to the second ferrule 700b, the opposing first and third flexible features 772 and 776 are flexed and in contact with the first ferrule 700a, and the opposing second and fourth flexible features 774 and 778 are flexed and in contact with the second ferrule 700b. In some embodiments, when the alignment frame 760 facilitates the mating of the first ferrule 770a to the second ferrule 700b resulting in the first ferrule 700a being mated to the second ferrule 700b, the first and second ferrules 700a and 700b are disposed, at least partially, between the first and second arms 770 and 771.

Figure 7B:
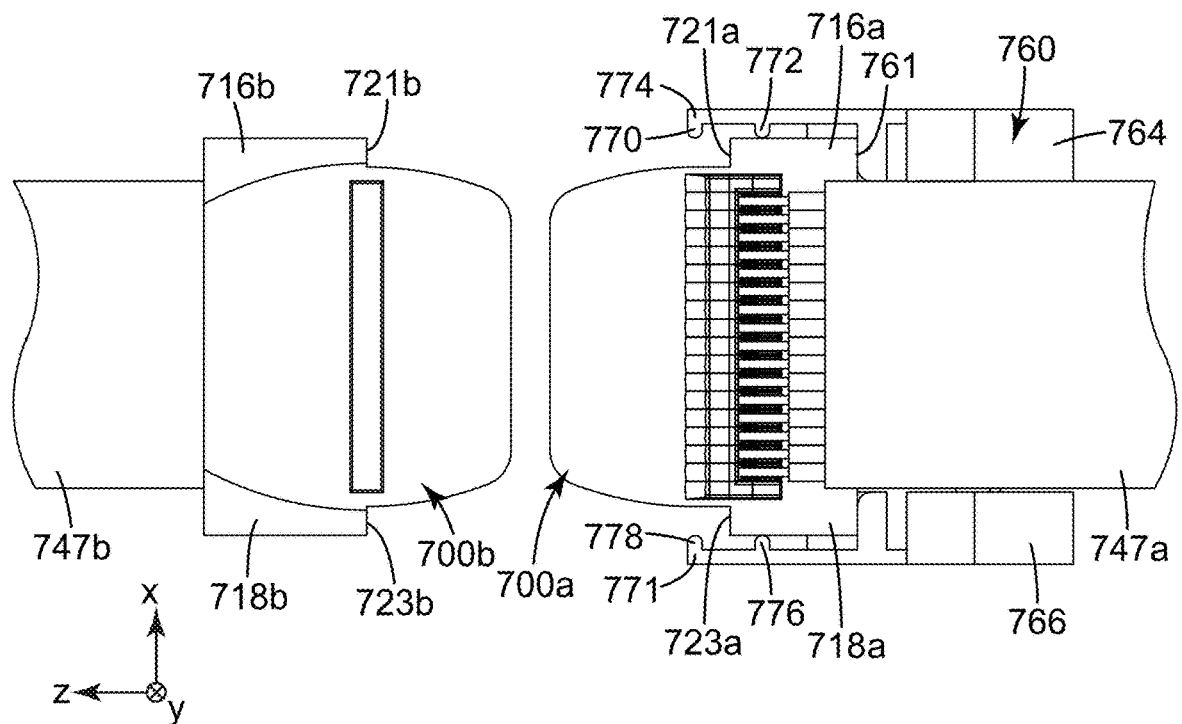
FIG. 7B is a top view of an alignment frame configured to facilitate the mating of first and second ferrules.

FIG. 7B is a top view of first and second ferrules 700a and 700b with alignment frame 760 configured to facilitate the mating of first and second ferrules 700a and 700b. First ferrule 700a include inflexible features 716a and 718a and second ferrule 700b includes inflexible features 716b and 718b. Inflexible features 716a, 718a, 716b, and 718b may provide insertion stops 721a, 723a, 721b, and 723b, respectively, which limit the extent of relative movement of the first and second ferrules 700a and 700b in the mating direction (the z-direction). Alignment frame 760 also includes stop portions 761 which are configured to abut a side of the first ferrule 700a opposite the mating portion 713a.

Figure 7C:
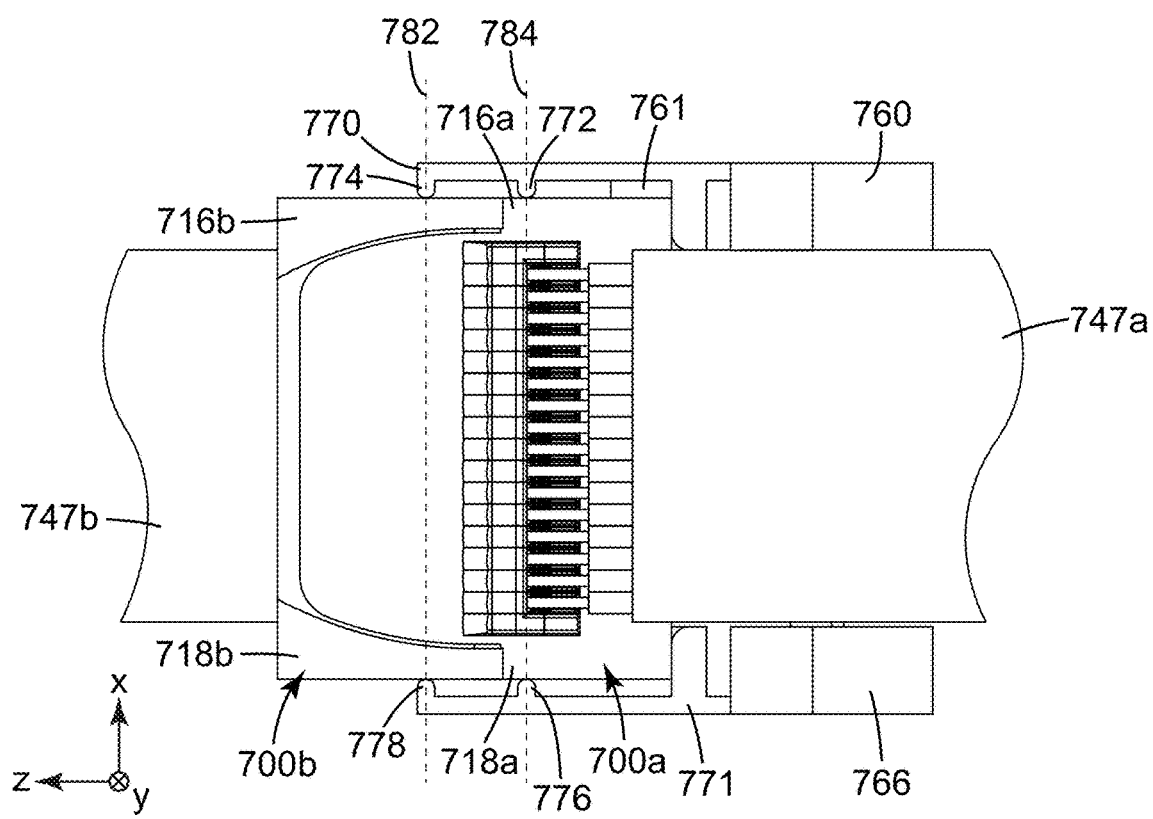
FIG. 7C is a top view of an alignment frame and mated first and second ferrules.

FIG. 7C shows first and second ferrules 700a and 700b mated with alignment frame 760 facilitating the mating. Plane 782 is perpendicular to the mating direction (the z-direction) and parallel to the x-y plane, and connects the second and fourth flexible features 774 and 778. Plane 784 is perpendicular to the mating direction and parallel to the x-y plane, and connects the first and third flexible features 772 and 776. In some embodiments, when the alignment frame 760 facilitates a mating of a first ferrule 700a to a second ferrule 700b along a mating direction (the z-direction) resulting in the first ferrule 700a being mated to the second ferrule 700b, the plane 782, which is perpendicular to the mating direction and connects the second and fourth flexible features 774 and 778, intersects both the first and second ferrules 700a and 700b, and the plane 784, which is perpendicular to the mating direction and connects the first and third flexible features 772 and 776, intersects both the first and second ferrules 700a and 700b. In other embodiments, the first and third flexible features 772 and 776 are disposed closer to the first and second ends 764 and 766 so that the plane 784 connecting the first and third flexible features 772 and 776 intersects only the first ferrule 700a. In some embodiments, alignment frame 760 and first ferrule 700a may be disposed at least partially in a first connector housing and second ferrule 700b may be disposed at least partially in a second connector housing.

The first and second flexible features 772 and 774 may have substantially the same or different flexing properties. The third and fourth flexible features 776 and 778 may have substantially the same or different flexing properties. In some embodiments, the first and third flexible features 772 and 776 have substantially the same first flexing properties, and the second and fourth flexible features 774 and 778 have substantially the same second flexing properties. The second flexing properties may be substantially the same or different from the first flexing properties. In some embodiments, each of the first and second flexible features 772 and 774 is flexible, at least in part, by virtue of the first arm 770 being flexible, and each of the third and fourth flexible features 776 and 778 is flexible, at least in part, by virtue of the second arm 771 being flexible.

In some embodiments, when the alignment frame 760 facilitates a mating of a first ferrule 700a to a second ferrule 700b resulting in the first ferrule 700a being mated to the second ferrule 700b, the opposing first and third flexible features 772 and 776 are flexed and in contact with corresponding inflexible features 716a and 718a, respectively, on the first ferrule 700a, and the opposing second and fourth flexible features 774 and 778 are flexed and in contact with corresponding inflexible features 716b and 718b, respectively, on the second ferrule 700b. In some embodiments, when the alignment frame 760 facilitates a mating of a first ferrule 700a to a second ferrule 700b along a mating direction (the z-direction) in a mating plane (the x-z plane) resulting in the first ferrule 700a being mated to the second ferrule 700b, and the first and second ferrules 700a and 700b are misaligned relative to each other in the mating plane, the first, second, third and fourth flexible features 772, 774, 776 and 778 cooperatively guide the first and second ferrules 700a and 700b into alignment with each other.

Figure 8A:
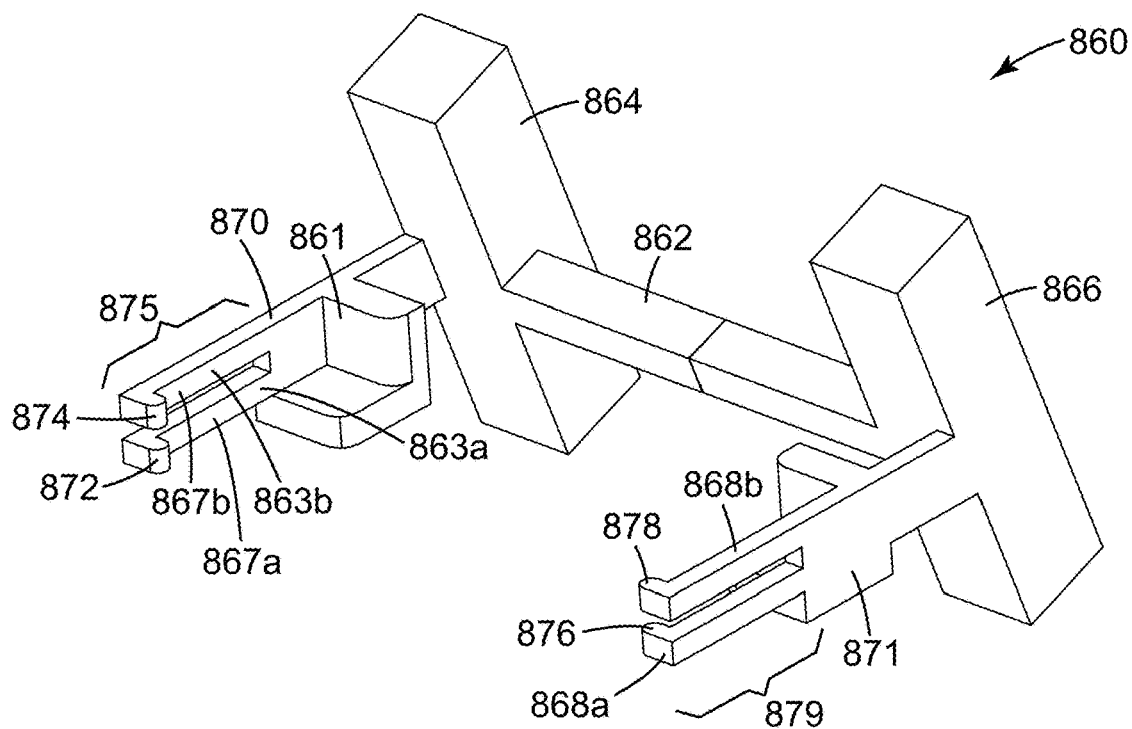
FIG. 8A is a perspective view of an alignment frame.

FIG. 8A is a perspective view of alignment frame 860 including base 862 having opposing ends 864 and 866, and first and second arms 870 and 871 extending from the opposing ends 864 and 866. Alignment frame 860 also includes stop portions 861 which are configured to abut a side of a ferrule opposite a mating portion of the ferrule. A front portion 875 of first arm 870 splits into lower and upper beams 867a and 867b, respectively. First flexible feature 872 is disposed on an inner surface 863a of lower beam 867a and second flexible feature 874 is disposed on an inner surface 863b of upper beam 867b. A front portion 879 of second arm 871 splits into lower and upper beams 868a and 868b. Third flexible feature 876 is disposed on an inner surface (corresponding to inner surface 863a) of lower beam 868a and fourth flexible feature 878 is disposed on an inner surface (corresponding to inner surface 863b) of upper beam 868b.

In some embodiments, each of the first and second flexible features 872 and 874 is flexible, at least in part, by virtue of the upper and lower beams 867b and 867a of the first arm 870 being flexible, and each of the third and fourth flexible features 876 and 878 is flexible, at least in part, by virtue of the upper and lower beams 868b and 868a of the second arm 871 being flexible.

Figure 8B:
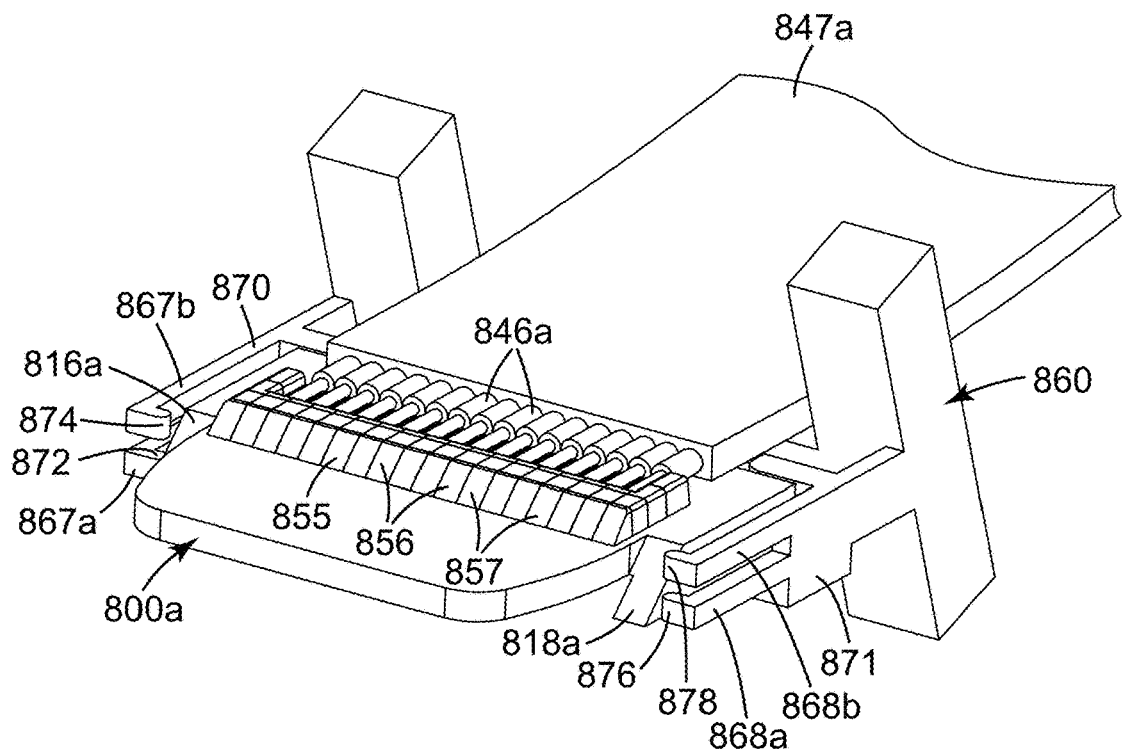
FIG. 8B is a perspective view of a portion of the alignment frame of FIG. 8A engaged with a first ferrule.

FIG. 8B is a perspective view of a portion of the alignment frame 800 engaged with first ferrule 800a. First ferrule 800a includes inflexible features 818a which are in contact with first and third flexible features 872 and 876 on the respective lower beams 867a and 868a. First ferrule 800a includes light redirecting member 855 which includes a plurality of surfaces 856 of a plurality of curved mirrors 857 and which is attached to signal carrier 847a which includes a plurality of optical waveguides 846a. The plurality of optical waveguides 846a may be or may include a plurality of optical fibers. In some embodiments, light redirecting member 855 includes a plurality of surfaces 856 which can change the direction of light propagating from the optical waveguides 846a into light redirecting member 855 via total internal reflection (TIR) from the plurality of surfaces 856. In some embodiments, surfaces 856 may include a reflective coating, for example, or otherwise be made reflective. In some embodiments, first ferrule 800a may include a waveguide alignment member as described elsewhere herein. In some embodiments, first ferrule 800a includes an opposing optical window opposite the light redirecting member. Second ferrule 800b (see FIG. 8C) includes optical window 895 and may include an opposing light redirecting member. The optical window 895 may be coated with an antireflective coating.

Figure 8C:
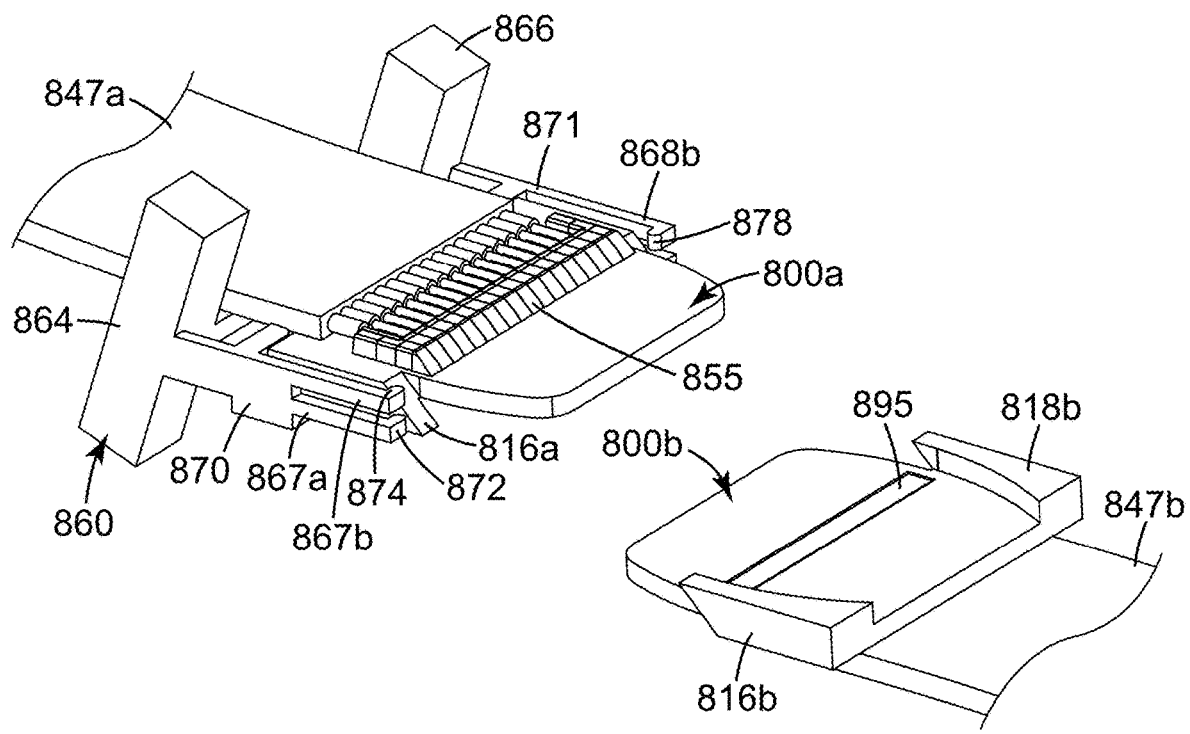
FIG. 8C is a perspective view of the alignment frame of FIG. 8A engaged with a first ferrule and disposed to facilitate a mating of the first ferrule to a second ferrule.

FIG. 8C is a perspective view of the alignment frame 860 engaged with the first ferrule 800a and disposed to facilitate a mating of the first ferrule 800a to a second ferrule 800b. Second ferrule 800b includes inflexible features 816b and 818b. Second ferrule 800b is connected to signal carrier 847b which may include a plurality of optical fibers. First and second ferrules 800a and 800b may be hermaphroditic ferrules and may be unitary ferrules.

In some embodiments, when the alignment frame 860 facilitates a mating of a first ferrule 800a to a second ferrule 800b resulting in the first ferrule 860a being mated to the second ferrule 800b, the lower beams 867a and 868a of the first and second flexible arms 870 and 871 are flexed and in contact with corresponding inflexible features 816a and 818a on the first ferrule 800a, and the upper beams 867b and 868b of the first and second flexible arms 870 and 871 are flexed and in contact with corresponding inflexible features 816b and 818b on the second ferrule 800b. In other embodiments, the inflexible features 816a, 818a, 816b, and 818b may be disposed such that the lower beams 867a and 868a of the first and second flexible arms 870 and 871 are flexed and in contact with corresponding inflexible features 816b and 818b on the second ferrule 800b, and the upper beams 867b and 868b of the first and second flexible arms 870 and 871 are flexed and in contact with corresponding inflexible features 816a and 818a on the first ferrule 800a.

In some embodiments, a ferrule may have first and second alignment features where one of the features is expandable or where one of the features is compressible. A feature may be said to be expandable or compressible if it is substantially more expandable or compressible than a body of the ferrule. An expandable opening can be provided by including compliant features on opposing sides of the opening. The opposing compliant features may be opposing flexible arms or may be layers of an elastomeric material more compliant that the body of the ferrule disposed on opposite sides of the opening, for example. A compressible feature can be provided by including compliant features on opposing sides of the feature. The opposing compliant features may be opposing flexible arms or may be layers of an elastomeric material more compliant that the body of the ferrule disposed on opposite sides of the compressible feature, for example.

Figure 9A:
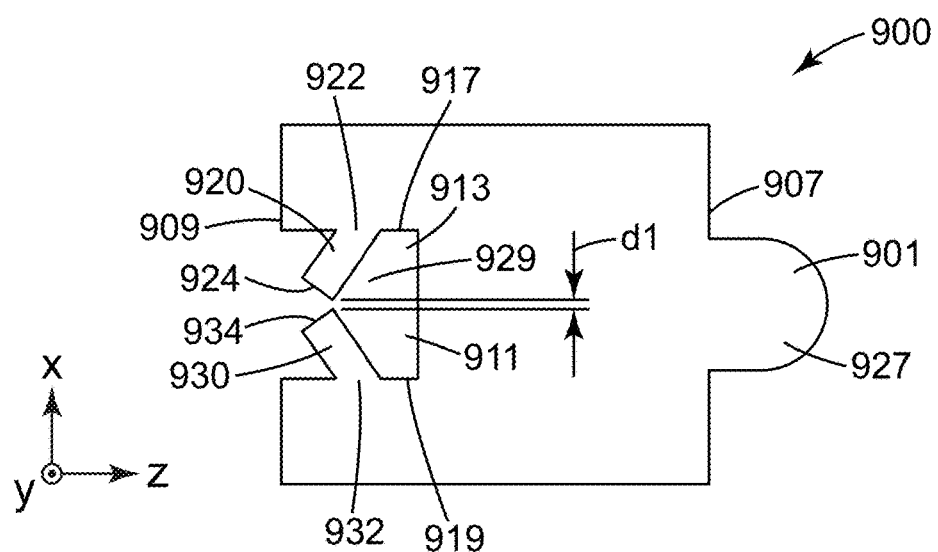
FIGS. 9A-9B are schematic plan views of a ferrule.
Figure 9B:
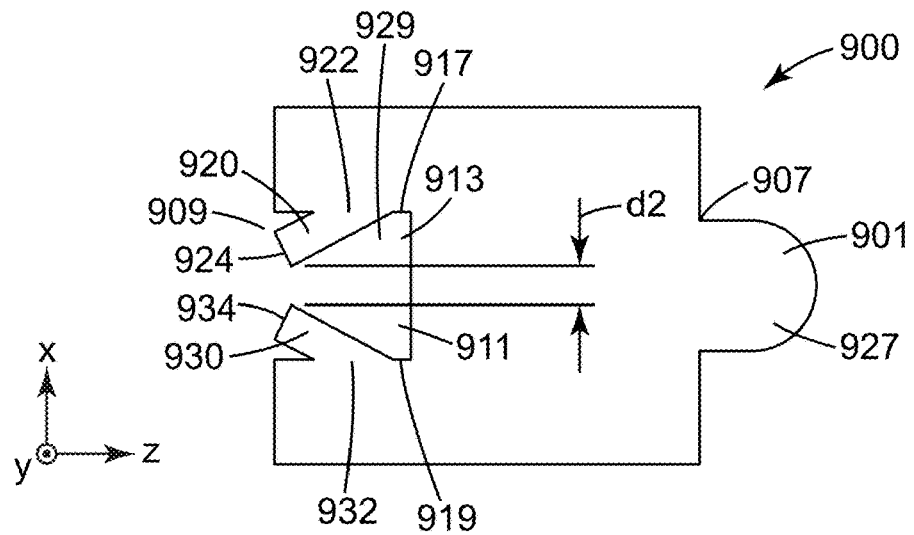

FIGS. 9A-9B are schematic plan views of ferrule 900 having a first feature 901 and second feature 911. The first and second features 901 and 911 are alignment features for mating with corresponding alignment features of a mating ferrule. The second feature 911 is expandable and defines an expandable opening 913 which has an unexpanded state illustrated in FIG. 9A and an expanded state illustrated in FIG. 9B. Inserting an object having the size and the shape of the first feature 901 into the opening 913 expands the opening 913 from the unexpanded state to the expanded state. The second feature 911 includes a first flexible arm 920 having a first fixed end 922 attached to a to a first side 917 of the opening 913 and an opposite first free end 924, and includes a second flexible arm 930 having a second fixed end 932 attached to a second side 919 of the opening 913, opposite the first side 917, and an opposite second free end 934, such that when the opening 913 is in the unexpanded state, the first and second free ends 924 and 934 are separated by a first distance d1 and when the expandable opening is in the expanded state, the first and second free ends 924 and 934 are separated by a second distance d2 greater than the first distance d1. The first and second arms 920 and 930 are opposing first and second compliant features, respectively. In the unexpanded state, the first and second arms 920 and 930 are in an unflexed state and in the expanded state, the first and second arms 920 and 930 are in a flexed state.

The first feature 901 is located at a first location 927 along a ferrule mating direction (z-direction) of the ferrule 900, and the second feature 911 is located at a substantially different second location 929 along the ferrule mating direction. When the ferrule 900 is mated with a mating ferrule along the ferrule mating direction, the first and second features 901 and 911 substantially simultaneously engage corresponding alignment features of the mating optical ferrule. In the illustrated embodiment, the first location 927 is at a front 907 of the ferrule 900 and the second location is at a rear 909 of the optical ferrule. In other embodiments, the first and second locations may be at some skew angle relative to a major axis of the ferrule.

First and second locations 927 and 929 along the ferrule mating direction may be said to be substantially different if there is some non-zero spacing between the closest portions of the first and second alignment features along the mating direction. Alignment features disposed on a same side of a ferrule located in an x-y plane, for example, would not be said to have substantially different locations along the z-axis, for example, since in this case there would be zero spacing between the closest portions of the alignment features along the z-axis.

The first feature 901 of the ferrule 900 may be adapted to contact a corresponding alignment feature (which may have the size and shape of second feature 911) of a mating ferrule. Similarly, the second feature 911 of the ferrule 900 may be adapted to contact a corresponding alignment feature (which may have the size and shape of first feature 901) of a mating ferrule. In some embodiments, ferrule 900 has a length direction (e.g., z-direction) and a thickness direction (e.g., y-direction), and the ferrule 900 may be adapted to mate with a mating ferrule along the length direction of the ferrule. The first feature 901 may be adapted to contact a corresponding feature of the mating ferrule at a first contact region of the first feature 901 (e.g., at a side of first feature 901), and the second feature 911 may be adapted to contact a corresponding alignment feature of the mating ferrule at a second contact region of the second feature 911 (e.g., at an inner side of first and second arms 920 and 930). The first contact region of the first feature 901 may be displaced from the second contact region of the second feature 911 along the thickness direction as well as along the length direction. In some embodiments, the first and second contact regions may also be displaced from each other along a transverse direction (e.g., x-direction).

As described further elsewhere herein, in some embodiments, the ferrule 900 is adapted to mate with a mating ferrule along each of two orthogonal dimensions of the ferrule. The two orthogonal dimensions may be length (along z-direction) and thickness (along y-direction) dimensions of the ferrule 900.

Ferrule 900 may be any type of ferrule, for example, an electrical ferrule, an optical ferrule, or a hybrid ferrule. In some embodiments, ferrule 900 is an optical ferrule adapted to receive and transmit light. In some embodiments, ferrule 900 is adapted to optically couple to an optical signal carrier and transfer an optical signal carried by the optical signal carrier to a mating ferrule. The optical signal carrier may include a portion (corresponding to portions 349a and 349b, for example) that may be or may include at least one of an optical waveguide, an optoelectronic device, an optical detector, an optical emitter, and/or an optical element which may be or may include one or more prisms, or one or more optical filters, or one or more optical waveguides, for example. In some embodiments, ferrule 900 includes at least one light redirecting element for receiving light along a length direction (z-direction) of the ferrule and redirecting the received light along a thickness direction (y-direction) of the ferrule 900. The light redirecting elements may correspond to any of the light redirecting elements described elsewhere herein.

In some embodiments, ferrule 900 is hermaphroditic and in some embodiments, ferrule 900 is unitary. In some embodiments, when ferrule 900 is mated with a mating ferrule, which may have the same size and shape as ferrule 900, the first and second features 901 and 911 of the ferrule 900 and first and second alignment features of the mating ferrule may guide the ferrule 900 and the mating ferrule into alignment with one another when the ferrule 900 and the mating ferrule are misaligned.

In some embodiments, a connector is provided that includes a housing and at least one ferrule 900 disposed at least partially inside the housing. For example, any or all of ferrules 200-1, 200-2, 200-C, or 300a and 300b in FIGS. 2A-3C can be replaced in their respective housings with ferrule 900.

Figure 10:
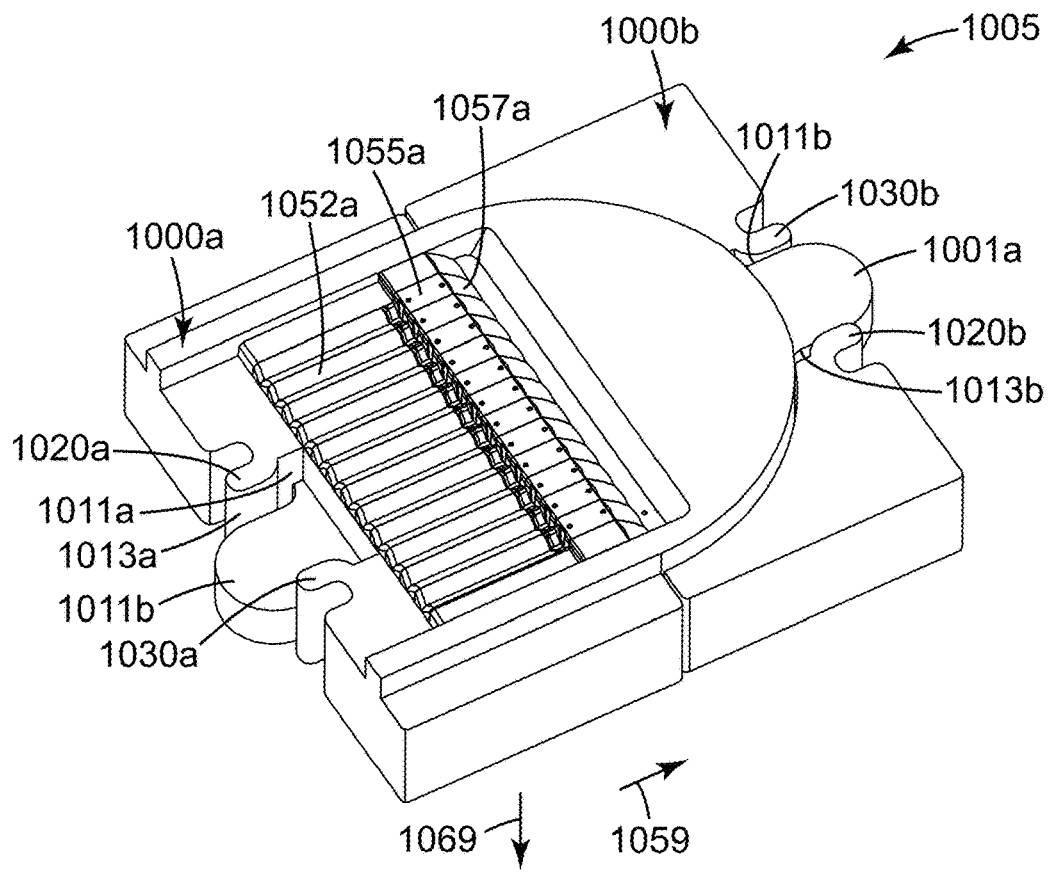
FIG. 10 is a top perspective view of a ferrule assembly including two mated ferrules.

FIG. 10 is a perspective view of ferrule assembly 1005 including optical ferrule 1000a and mating optical ferrule 1000b mated together. Optical ferrule 1000a includes first alignment feature 1001a, second alignment feature 1011a, and opposing first and second compliant features 1020a and 1030a, which, in the illustrated embodiment, comprise first and second flexible arms. Mating optical ferrule 1000b includes second alignment feature 1001b adapted to engage second alignment feature 1011a, and first alignment feature 1011b adapted to engage first alignment feature 1001a. First alignment feature 1011b includes opposing first and second compliant features 1020b and 1030b.

Second alignment feature 1011a of optical ferrule 1000a defines an expandable opening 1013a and first alignment feature 1011b of mating optical ferrule 1000b defines an expandable opening 1013b. First alignment feature 1001a is inserted into expandable opening 1013b which is in an expanded state. Similarly, second alignment feature 1001b is inserted into expandable opening 1013a which is in an expanded state. Optical ferrule 1000a includes waveguide alignment member 1052a and light redirecting member 1055a which may correspond to any waveguide alignment members and light redirecting members, respectively, described elsewhere herein. Light redirecting member 1055a includes a plurality of light redirecting elements 1057a for receiving light along a length direction 1059 and redirecting the received light along a thickness direction 1069 of the optical ferrule. Mating ferrule 1000b may also include a corresponding waveguide alignment member and a corresponding light redirecting member. Optical ferrule 1000a and mating optical ferrule 1000b may each be hermaphroditic and may each be unitary.

In some embodiments, the ferrules of the present description may be adapted to mate with a mating ferrule along each of two orthogonal dimensions of the ferrule, i.e., there may be two orthogonal directions (relative to major axes of the ferrule, for example) along which the ferrule is adapted to be moved relative to a mating ferrule in order to mate with the mating ferrule. Optical ferrule 1000a and mating optical ferrule 1000b are adapted to mate along a length direction 1059 (direction along the length dimension) which is a mating direction of the ferrules. Optical ferrule 1000a and mating optical ferrule 1000b may also be adapted to mate along the orthogonal thickness direction 1069 (direction along the thickness dimension). Optical ferrule 1000a and mating optical ferrule 1000b can approach the mated position shown in FIG. 10 by moving the ferrules together along the thickness direction 1069, or by moving the ferrules together along the length direction 1059, or by moving the ferrules together along a direction intermediate between the thickness direction 1069 and the length direction 1059.

Figure 11A:
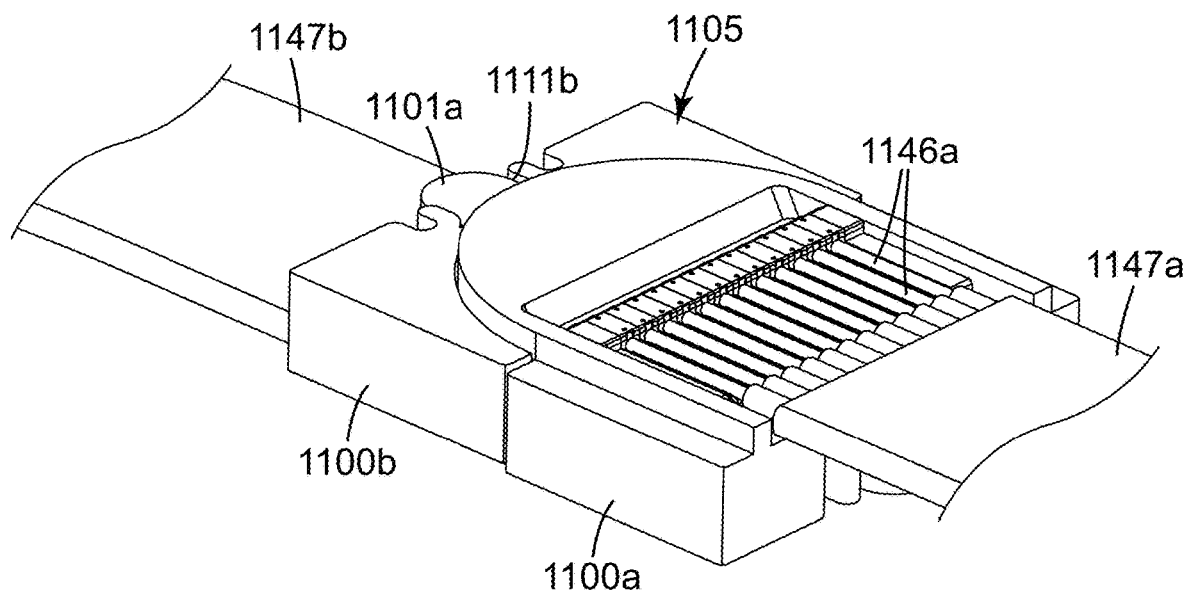
FIG. 11A is a top perspective view of a ferrule assembly including two mated ferrules.
Figure 11B:
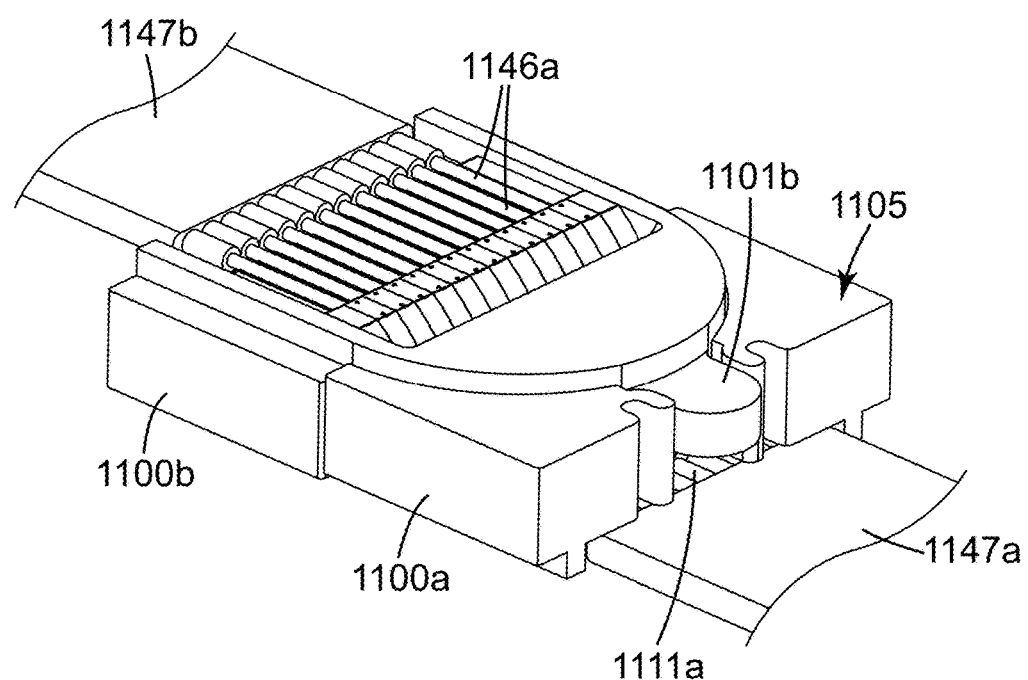
FIG. 11B is a bottom perspective view of the ferrule assembly of FIG. 11A.

FIGS. 11A-11B are top perspective and bottom perspective views, respectively, of ferrule assembly 1105 including optical ferrules 1100a and mating optical ferrule 1100b. Optical ferrule 1100a includes first alignment feature 1101a and a second alignment feature 1111a which defines an expandable opening. Mating optical ferrule 1100b includes second alignment feature 1101b and first alignment feature 1111b which defines an expandable opening. First alignment feature 1111b may be described as a corresponding alignment feature for first alignment feature 1101a since first alignment feature 1111b is adapted to engage first alignment feature 1101a. Similarly, second alignment feature 1101b may be described as a corresponding alignment feature for second alignment feature 1111a since second alignment feature 1111b is adapted to engage second alignment feature 1111a. First alignment feature 1101a is inserted into first alignment feature 1111b which is in an expanded state. Similarly, second alignment feature 1101b is inserted into second alignment feature 1111a which is in an expanded state. Optical ferrule 1100a is attached to signal carrier 1147a which includes a plurality of optical fibers 1146a and mating optical ferrule 1100b is attached to signal carrier 1147b which includes a plurality of optical fibers 1146b.

Any of the ferrules described herein, such as ferrules 1000a, 1000b, 1100a, or 1100b, may be disposed in a connector housing such as any of those illustrated in FIGS. 2A-3C.

In some embodiments, a ferrule includes first and second alignment features having a size and shape such that when the optical ferrule is mated with a corresponding mating optical ferrule along a mating direction, the first and second alignment features are adapted to provide a force along the mating direction directed to hold the ferrules together. When the ferrule and the corresponding second ferrule are moved apart along the mating direction, the first and second alignment features may be adapted to provide a restoring force along the mating direction. Such features may keep the ferrule and the mating ferrule positively registered and are illustrated in FIGS. 12A-14.

Figure 12A:
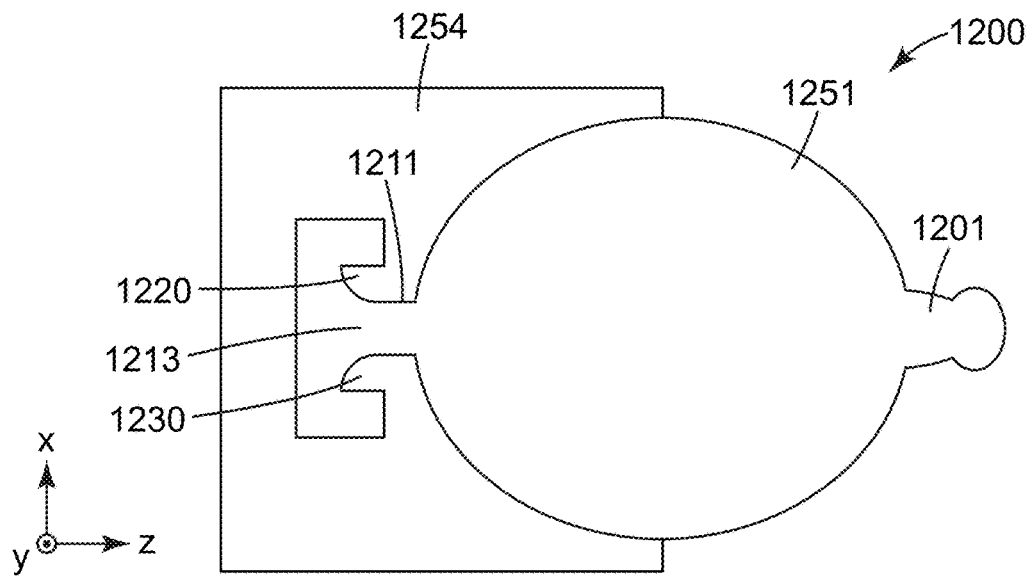
FIG. 12A is a schematic plan view of a ferrule.
Figure 12B:
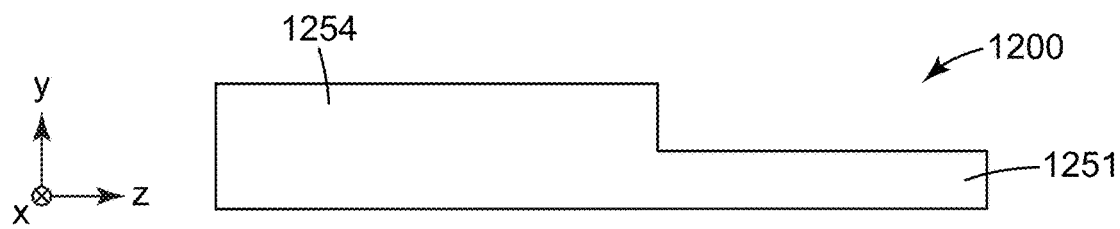
FIG. 12B is a schematic side view of the ferrule of FIG. 12A.

FIGS. 12A-12B are schematic top and side views, respectively of ferrule 1200. Ferrule 1200 includes a lower portion 1251 that includes first alignment feature 1201, and an upper portion 1254 that includes second alignment feature 1211. Second alignment feature 1211 includes opposing first and second compliant features 1220 and 1230 and defines an expandable opening 1213. First alignment feature 1201 and second alignment feature 1211 are offset relative to one another along the length direction (z-direction) and the thickness direction (y-direction).

Figure 13A:
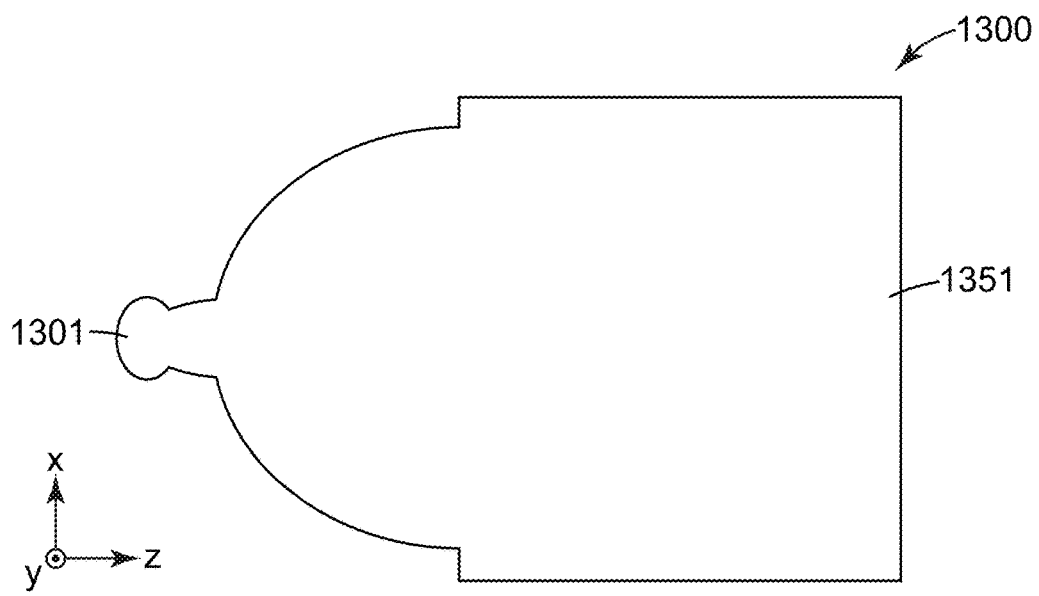
FIG. 13A is a schematic plan view of a ferrule.
Figure 13B:
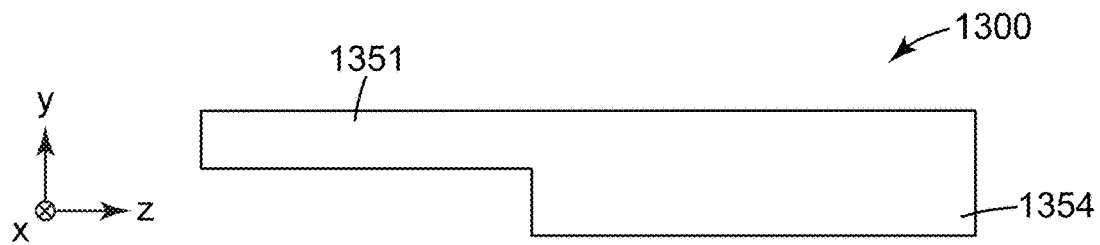
FIG. 13B is a schematic side view of the ferrule of FIG. 13A.

FIGS. 13A-13B are schematic top and side views, respectively of ferrule 1300 corresponding to ferrule 1200. Ferrule 1200 and ferrule 1300 may be hermaphroditic and may have the same size and shapes. Ferrule 1300 includes upper portion 1351, lower portion 1354 (see FIG. 13B) and alignment feature 1301 which has the same size and shape as first alignment feature 1201 and which is adapted to engage second alignment feature 1211. Ferrule 1300 may also include an alignment feature adapted to engage first alignment feature 1201.

Figure 14:
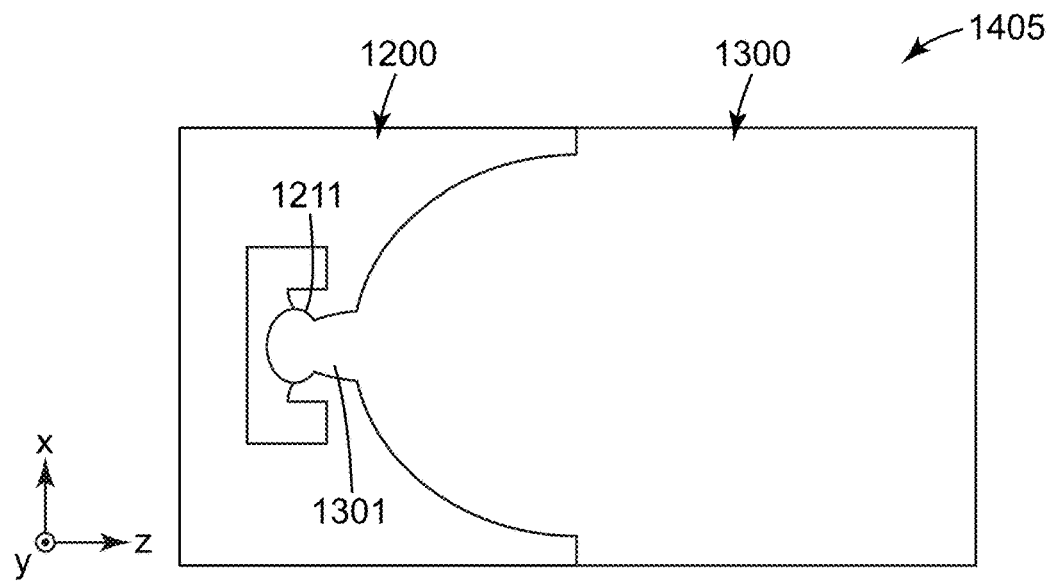
FIG. 14 is a schematic top view of a ferrule assembly.

FIG. 14 is a schematic top view of ferrule assembly 1405 including ferrule 1200 mated with ferrule 1300. Alignment feature 1301 of ferrule 1300 is engaged with second alignment feature 1211 of ferrule 1200 and the first alignment feature 1201 of ferrule 1200 may be engaged with a corresponding alignment feature (not illustrated) of ferrule 1300.

The alignment features 1301 and 1211 have a size and shape such that a force may be present along the z-direction directed to hold the ferrules 1200 and 1300 together. When the ferrules 1200 and 1300 are moved apart along the z-direction, the alignment features 1301 and 1211 may be adapted to provide a restoring force along the z-direction. The geometry of the alignment features may provide a latch and an extra force may be required to mate and un-mate the ferrules compared to other embodiments.

Figure 15A:
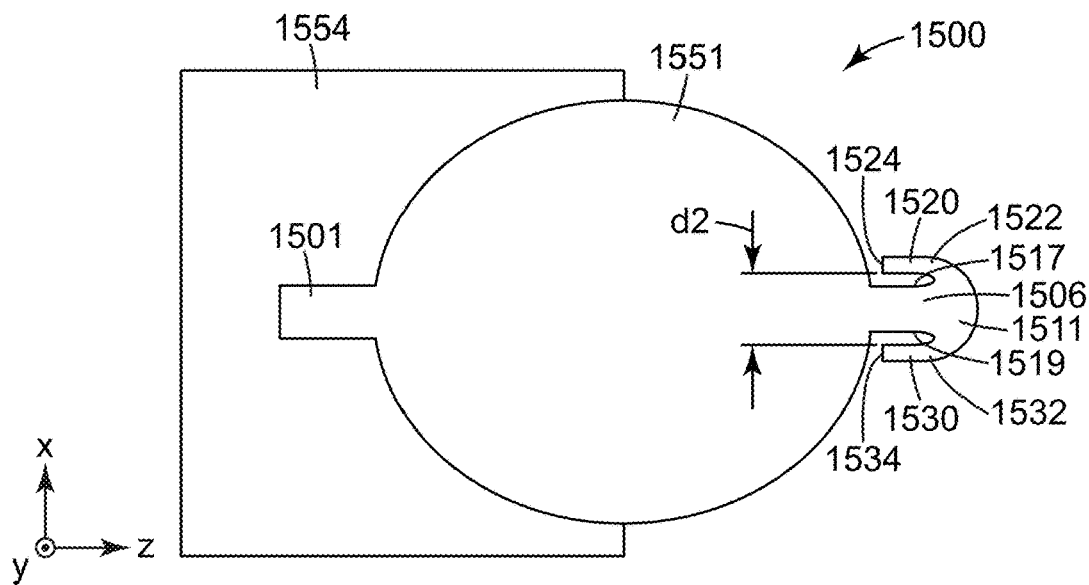
FIGS. 15A-15B are schematic plan views of a ferrule.
Figure 15B:
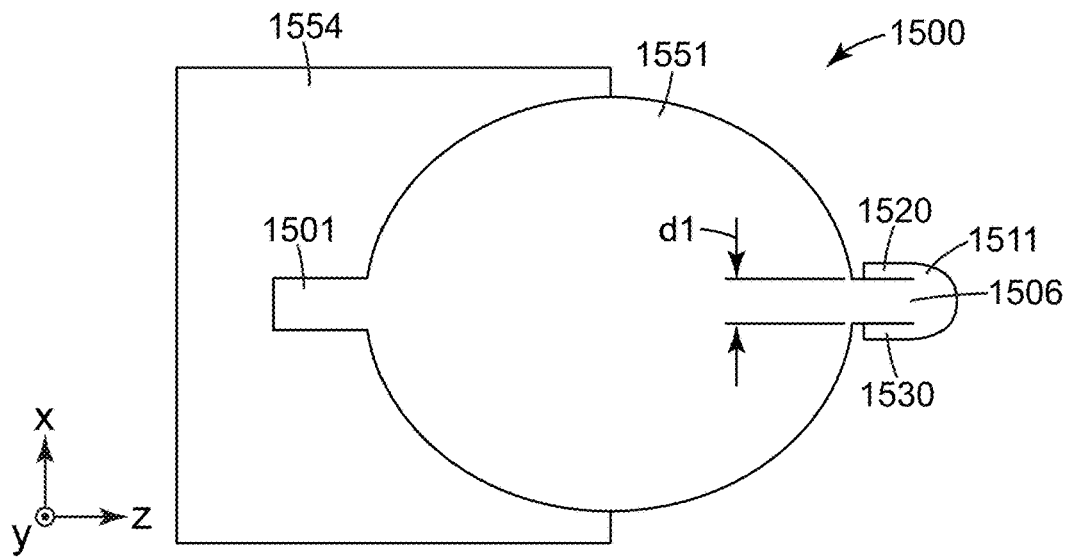
Figure 15C:
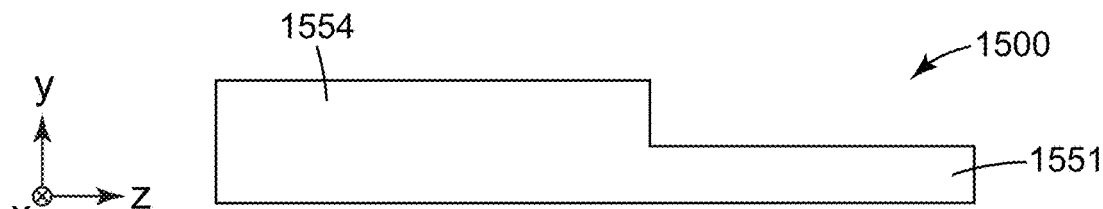
FIG. 15C is a schematic side view of the ferrule of FIGS. 15A-15B.

In some embodiments, a ferrule may have first and second alignment features where one of the alignment features is compressible. FIGS. 15A and 15B are schematic top views of ferrule 1500 including an upper portion 1554 which includes a first feature 1501 and a lower portion 1551 which includes a second feature 1511. FIG. 15C is a schematic side view of ferrule 1500. The first and second features 1501 and 1511 are alignment features for mating with corresponding alignment features of a mating ferrule. In FIG. 15A, second feature 1511 is in an uncompressed state and in FIG. 15B, second feature 1511 is in a compressed state. Inserting the compressible second feature 1511 into an opening of an object where the opening has the size and shape of the first feature 1501, compresses the second feature from the uncompressed state to the compressed state. Second feature 1511 includes a body 1506 with opposing first and second sides 1517 and 1519 and includes first and second compliant features 1520 and 1530 on the opposite sides 1517 and 1519 of the body 1506. In the illustrated embodiment, the first compliant feature 1520 is a first flexible arm having a first fixed end 1522 attached to the first side 1517 of body 1506 and having an opposite first free end 1524. Similarly, in the illustrated embodiment, the second compliant feature 1530 is a second flexible arm having a second fixed end 1532 attached to the second side 1519 of the body 1506 and having an opposite second free end 1534.

When the second feature 1511 is in the compressed state (FIG. 15B), the first and second free ends 1524 and 1534 are separated by a first distance d1 and when the second feature 1511 is in the uncompressed state (FIG. 15A), the first and second free ends 1524 and 1534 are separated by a second distance d2 greater than the first distance d1. In the uncompressed state, the first and second arms 1520 and 1530 are in an unflexed state and in the compressed state, the first and second arms 1520 and 1530 are in a flexed state.

The first feature 1501 of the ferrule 1500 may be adapted to contact a corresponding alignment feature (which may have the size and shape of second feature 1511) of a mating ferrule. Similarly, the second feature 1511 of the ferrule 1500 may be adapted to contact a corresponding alignment feature (which may have the size and shape of first feature 1501) of a mating ferrule. In some embodiments, ferrule 1500 has a length direction (e.g., z-direction) and a thickness direction (e.g., y-direction), and the ferrule 1500 may be adapted to mate with a mating ferrule along the length direction of the ferrule. The first feature 1501 may be adapted to contact a corresponding feature of the mating ferrule at a first contact region of the first feature 1501 (e.g., at opposing sides of first feature 1501), and the second alignment feature 1511 may be adapted to contact a corresponding alignment feature of the mating ferrule at a second contact region of the second alignment feature 1511 (e.g., at an outer side of first and second arms 1520 and 1530). The first contact region of the first feature 1501 may be displaced from the second contact region of the second feature 1511 along the thickness direction as well as along the length direction. In some embodiments, the first and second contact regions may also be displaced from each other along a transverse direction (e.g., x-direction).

As described further elsewhere herein, in some embodiments, the ferrule 1500 is adapted to mate with a mating ferrule along each of two orthogonal dimensions of the ferrule. The two orthogonal dimensions may be length (along z-direction) and thickness (along y-direction) dimensions of the ferrule 1500.

Ferrule 1500 may be any type of ferrule, for example, an electrical ferrule, an optical ferrule, or hybrid ferrule. In some embodiments, ferrule 1500 is an optical ferrule adapted to receive and transmit light. In some embodiments, ferrule 1500 is adapted to optically couple to an optical signal carrier and transfer an optical signal carried by the optical signal carrier to a mating ferrule. The optical signal carrier may include a portion (corresponding to portions 349a and 349b, for example) that may be or may include at least one of an optical waveguide, an optoelectronic device, an optical detector, an optical emitter, and/or an optical element which may be or may include one or more prisms, or one or more optical filters, or one or more optical waveguides, for example. In some embodiments, ferrule 1500 includes at least one light redirecting element for receiving light along a length direction (z-direction) of the ferrule and redirecting the received light along a thickness direction (y-direction) of the ferrule 1500. The light redirecting elements may correspond to any of the light redirecting elements described elsewhere herein.

In some embodiments, ferrule 1500 is hermaphroditic and in some embodiments, ferrule 1500 is unitary. In some embodiments, when ferrule 1500 is mated with a mating ferrule, which may have the same size and shape as ferrule 1500, the first and second features 1501 and 1511 of the ferrule 1500 and first and second features of the mating ferrule may guide the ferrule 1500 and the mating ferrule into alignment with one another when the ferrule 1500 and the mating ferrule are misaligned.

In some embodiments, a connector is provided that includes a housing and at least one ferrule 1500 disposed at least partially inside the housing. For example, any or all of ferrules 200-1, 200-2, 200-C, or 300a and 300b in FIGS. 2A-3C can be replaced in their respective housings with ferrule 1500.

Figure 16:
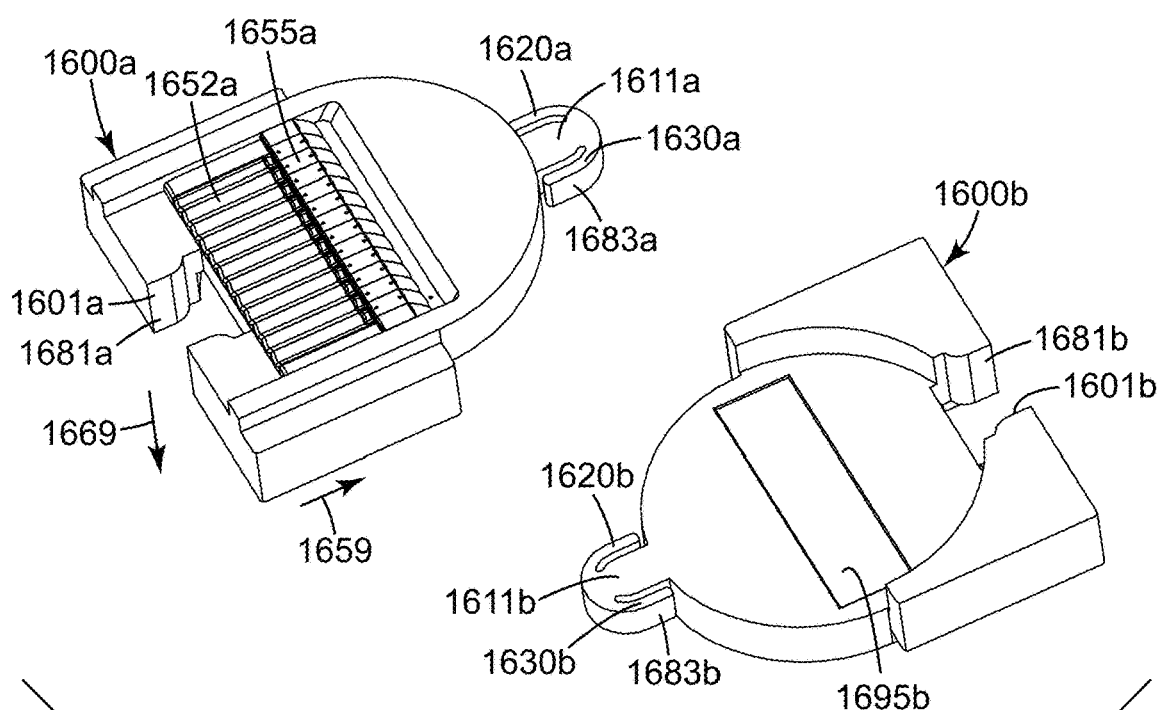
FIG. 16 is a perspective view of first and second ferrules.

FIG. 16 is a perspective view of first and second optical ferrules 1600a and 1600b. First and second optical ferrules 1600a and 1600b may be hermaphroditic, may be unitary, and may have substantially the same size and shape. First optical ferrule 1600a is adapted to mate with second optical ferrule 1600b along a length direction 1659 (direction along the length dimension of first ferrule 1600a), which is a mating direction of the ferrules, and along the orthogonal thickness direction 1669 (direction along the thickness dimension of first ferrule 1600a), which is also a mating direction for the ferrules.

First optical ferrule 1600a includes waveguide alignment member 1652a and light redirecting member 1655a which may correspond to any waveguide alignment members and light redirecting members, respectively, described elsewhere herein. First optical ferrule 1600a may also include an optical window on an opposite side of the first optical ferrule 1600a from the light redirecting member 1655a. Second optical ferrule 1600b includes an optical window 1695b and may also include a light redirecting member on an opposite side of the second optical ferrule 1600b from the optical window 1695b. The optical windows 1695b and/or a corresponding optical window of first optical ferrule 1600a may be coated with an antireflective coating.

The first alignment feature 1601a of the first optical ferrule 1600a is adapted to contact a corresponding alignment feature (second alignment feature 1611b) of the second optical ferrule 1600b at a first contact region 1681a of the first alignment feature 1601a, and the second alignment feature 1611a of the first optical ferrule 1600a is adapted to contact a corresponding alignment feature (first alignment feature 1601b) of the second optical ferrule 1600b at a second contact region 1683a of the second alignment feature 1611a. In some embodiments, the first and second contact regions 1681a and 1683a are offset relative to one another along at least the length and thickness directions 1659 and 1669 of the first optical ferrule 1600a. Similarly, the first alignment feature 1601b of the second optical ferrule 1600b is adapted to contact a corresponding alignment feature (second alignment feature 1611a) of the first optical ferrule 1600a at a first contact region 1681b of the first alignment feature 1601b, and the second alignment feature 1611b of the second optical ferrule 1600b is adapted to contact a corresponding alignment feature (first alignment feature 1601a) of the first optical ferrule 1600a at a second contact region 1683b of the second alignment feature 1611b. In some embodiments, the first and second contact regions 1681b and 1683b are offset relative to one another along at least the length and thickness dimensions of the second optical ferrule 1600b.

Figure 17A:
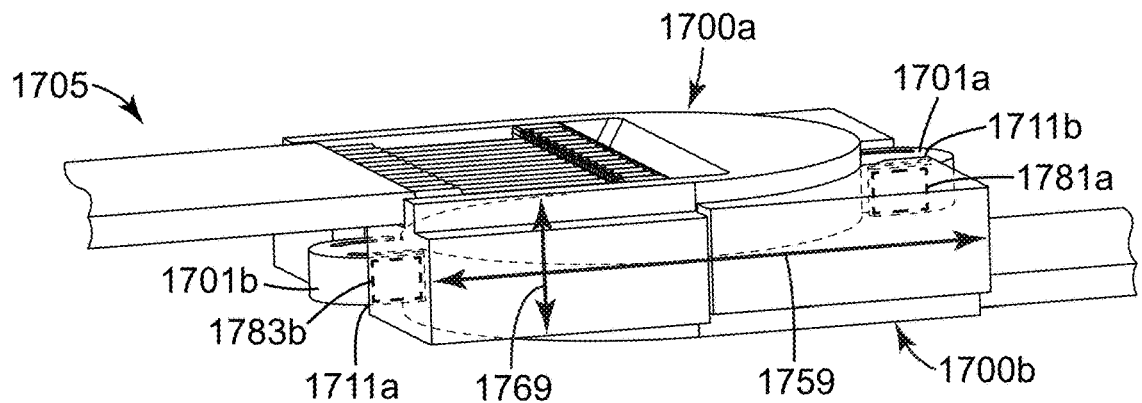
FIG. 17A is a perspective view of a ferrule assembly including two mated ferrules.
Figure 17B:
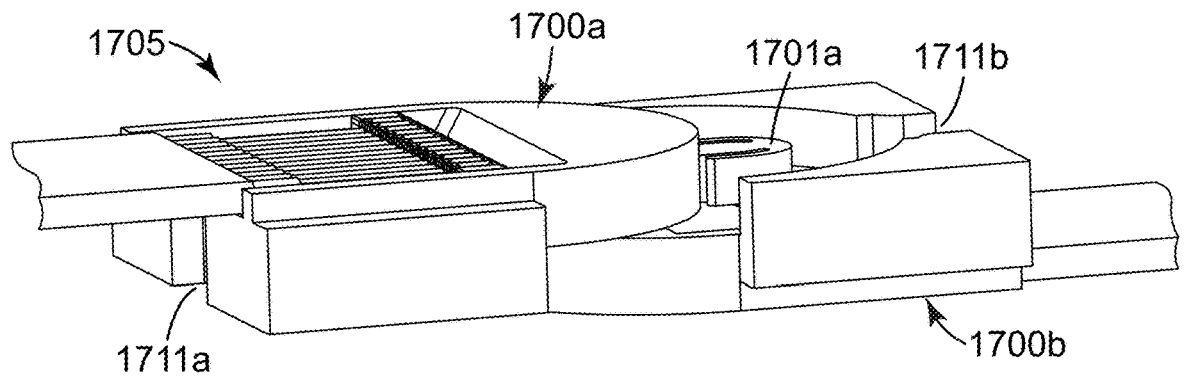
FIGS. 17B-17C are perspective views of two unmated ferrules.
Figure 17C:
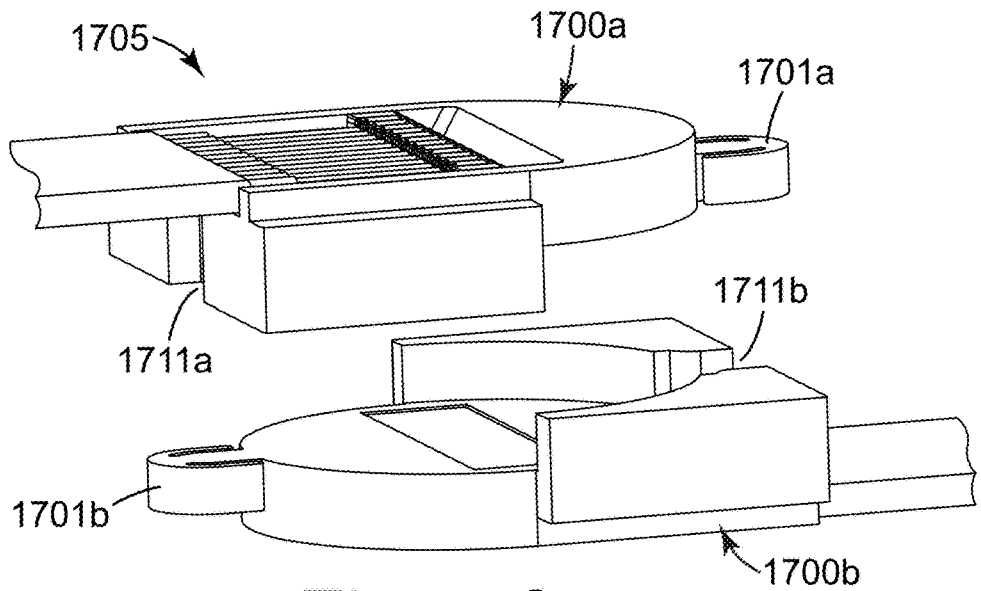

FIG. 17A is a perspective view of ferrule assembly 1705 including first optical ferrule 1700a mated to second optical ferrule 1700b. Second optical ferrule 1700b is shown as semi-transparent for ease of illustration. The first optical ferrule 1700a has length dimension 1759 and an orthogonal thickness dimension 1769 along orthogonal length and thickness directions. Second optical ferrule 1700b similarly has orthogonal length and thickness dimensions. FIG. 17B is a perspective view showing the first and second optical ferrules 1700a and 1700b separated along the length dimension 1759 from the fully mated configuration of FIG. 17A. FIG. 17C is a perspective view showing the first and second optical ferrules 1700a and 1700b separated along the thickness dimension 1769 from the fully mated configuration of FIG. 17A.

In some embodiments, first optical ferrule 1700a is adapted to mate with the second optical ferrule 1700b along each of the length and thickness dimensions 1759 and 1769 of the optical ferrule 1700a. In other words, first and second optical ferrules 1700a and 1700b can approach the mated position shown in FIG. 17A by moving the ferrules together along the thickness dimension 1769 (e.g., moving the optical ferrules 1700a and 1700b from the configuration of FIG. 17C to the configuration shown in FIG. 17A along the thickness dimension 1769) and/or by moving the ferrules together along the length dimension 1759 (e.g., moving the optical ferrules 1700a and 1700b from the configuration of FIG. 17B to the configuration shown in FIG. 17A along the length dimension 1759). The first and second optical ferrules 1700a and 1700b can also approach the mated position shown in FIG. 17A by moving the ferrules together along a direction intermediate between a direction of the thickness dimension 1769 and a direction of the length dimension 1759. When mated, the first optical ferrule 1700a is adapted to unmate from the second optical ferrule 1700b via movement of the first optical ferrule 1700a relative to the second optical ferrule 1700b along orthogonal first and second dimensions. For example, the optical ferrules 1700a and 1700b in the mated configuration shown in FIG. 17A can be separated along the length dimension 1759 resulting in the separated configuration shown in FIG. 17B or the optical ferrules 1700a and 1700b can be separated along the thickness dimension 1769 resulting in the separated configuration shown in FIG. 17C. The first and second optical ferrules 1700a and 1700b can also be separated from the mated position shown in FIG. 17A by moving the ferrules apart along a direction intermediate between a direction along the thickness dimension 1769 and a direction along the length dimension 1759. The first optical ferrule 1700a includes first and second alignment features 1701a and 1711a and the second optical ferrule 1700b includes first and second alignment features 1701b and 1711b. The first alignment feature 1701a of the first optical ferrule 1700a is adapted to contact a corresponding alignment feature (second alignment feature 1711b) of the second optical ferrule 1700b at a first contact region 1781a of the first alignment feature 1701a, and the second alignment feature 1711a of the first optical ferrule 1700a is adapted to contact a corresponding alignment feature (first alignment feature 1701b) of the second optical ferrule 1700b at a second contact region 1783a of the second alignment feature 1711a. In some embodiments, the first and second contact regions 1781a and 1783a are offset relative to one another along at least the length and thickness dimensions 1759 and 1769 of the optical ferrule 1700a.

Figure 18A:
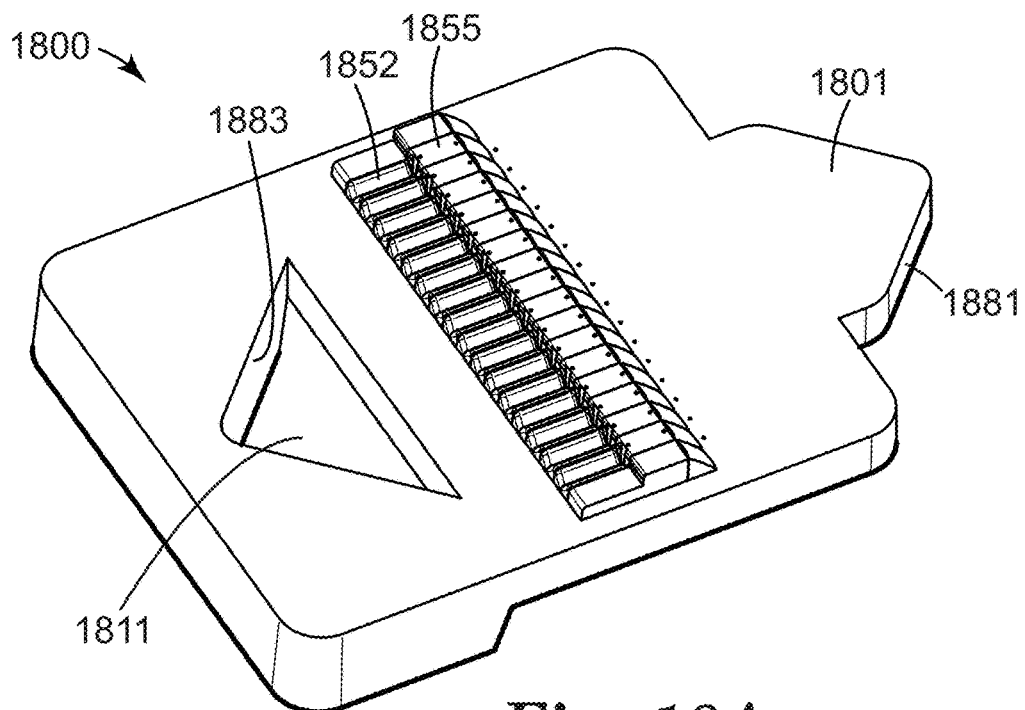
FIG. 18A is a top perspective view of a ferrule.
Figure 18B:
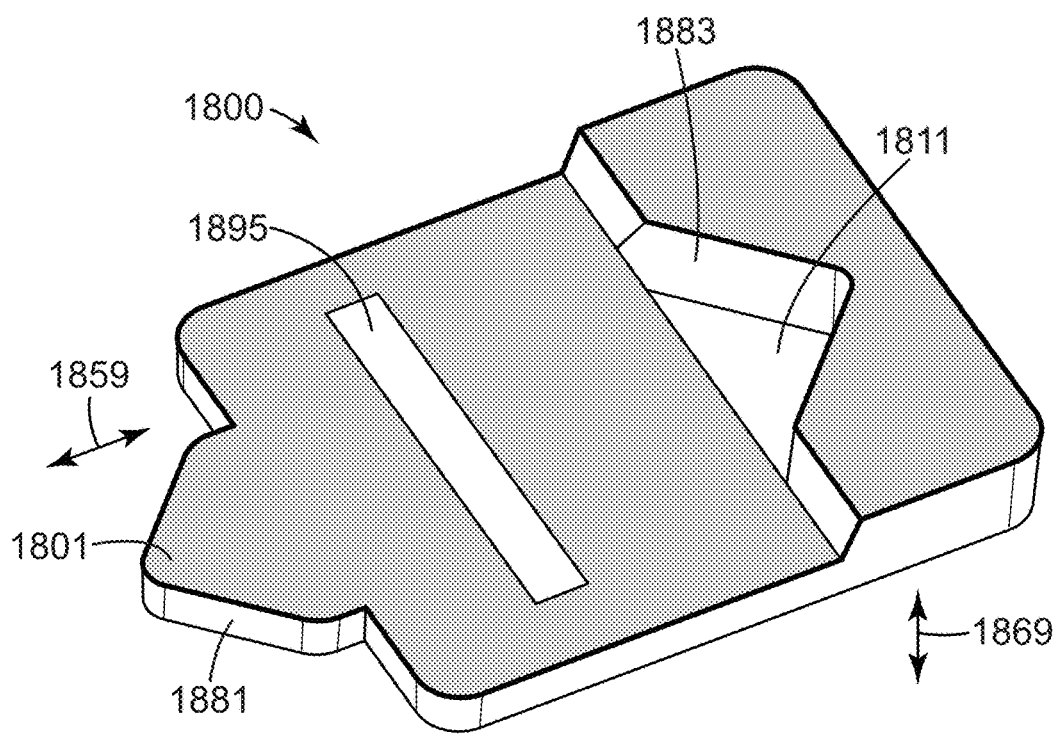
FIG. 18B is a bottom perspective view of the ferrule of FIG. 18A.

FIGS. 18A and 18B are top and bottom perspective views, respectively, of optical ferrule 1800 which includes first and second alignment features 1801 and 1811. Optical ferrule 1800 includes a waveguide alignment member 1852 and light redirecting member 1855 which may correspond to any waveguide alignment members and light redirecting members, respectively, described elsewhere herein. Optical ferrule includes an optical window 1895, e.g., a recessed optical window, opposite the light redirecting member 1855. Optical window 1895 may be coated with an antireflective coating.

The first alignment feature 1801 of the optical ferrule 1800 is adapted to contact a corresponding alignment feature (which may have the size and shape of second alignment feature 1811) of a mating optical ferrule. Similarly, the second alignment feature 1811 of the optical ferrule 1800 is adapted to contact a corresponding alignment feature (which may have the size and shape of first alignment feature 1801) of a mating optical ferrule. First alignment feature 1801 contacts the corresponding alignment feature of the mating optical ferrule at a first contact region 1881, and second alignment feature 1811 contacts the corresponding alignment feature of the mating optical ferrule at a second contact region 1883. The first and second contact regions 1881 and 1883 are offset relative to one another along at least first and second axes 1859 and 1869 which are along a length dimension and a thickness dimension, respectively, of optical ferrule 1800. The first and second alignment features 1801 and 1811 are located at substantially different locations along the length dimension.

Figure 18C:
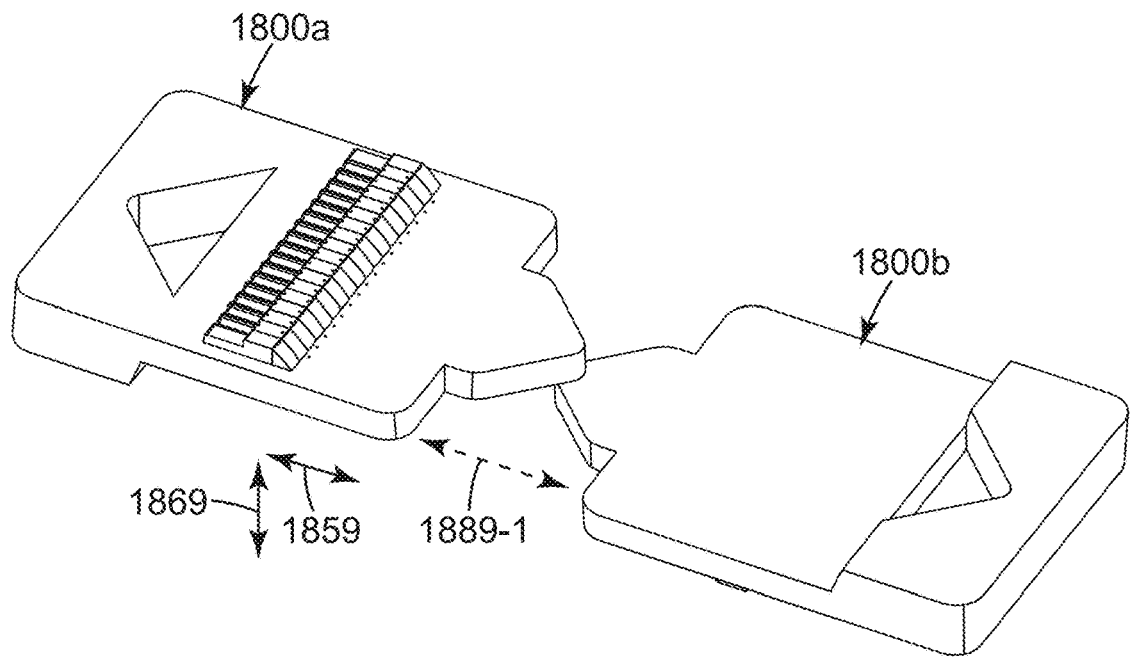
FIGS. 18C-18D are perspective views of two proximate ferrules.
Figure 18D:
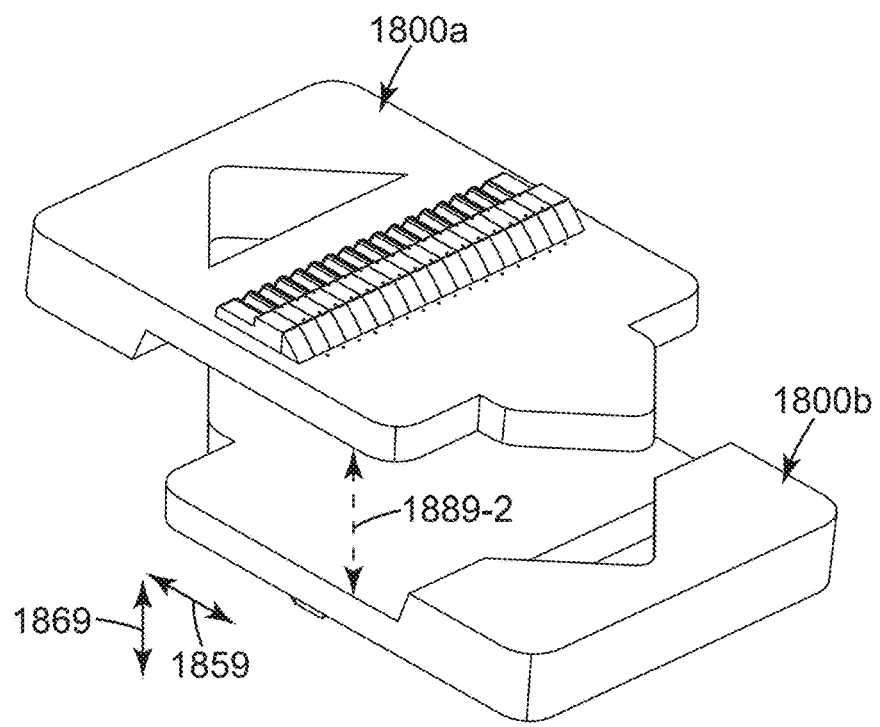

The optical ferrule 1800 may be adapted to mate with a mating optical ferrule along both the length and the thickness dimensions. This is illustrated in FIGS. 18C-18D which are perspective views of optical ferrule 1800a and mating optical ferrule 1800b, each of which may correspond to optical ferrule 1800. In FIG. 18C, the optical ferrule 1800a and the mating optical ferrule 1800b are separated along axis 1859 which is along a length dimension of the optical ferrule 1800a and the mating optical ferrule 1800b. The optical ferrule 1800a and the mating optical ferrule 1800b can be mated along the first mating direction 1889-1, which is parallel to the axis 1859, by movement of the optical ferrule 1800a and the mating optical ferrule 1800b together along the first mating direction 1889-1. In FIG. 18D, the optical ferrule 1800*a* and the mating optical ferrule 1800*b* are separated along axis 1869 which is along a thickness dimension of the optical ferrule 1800*a* and the mating optical ferrule 1800*b*. The optical ferrule 1800*a* and the mating optical ferrule 1800*b* can be mated along the second mating direction 1889-2, which is parallel to the axis 1869, by movement of the optical ferrule 1800*a* and the mating optical ferrule 1800*b* together along the second mating direction 1889-2. Similarly, once the optical ferrule 1800*a* and the mating optical ferrule 1800*b* are mated, the ferrules can be unmated by movement of the ferrules apart from one another along either of the orthogonal first and second mating directions 1889-1 and 1889-2.

Figure 24A:
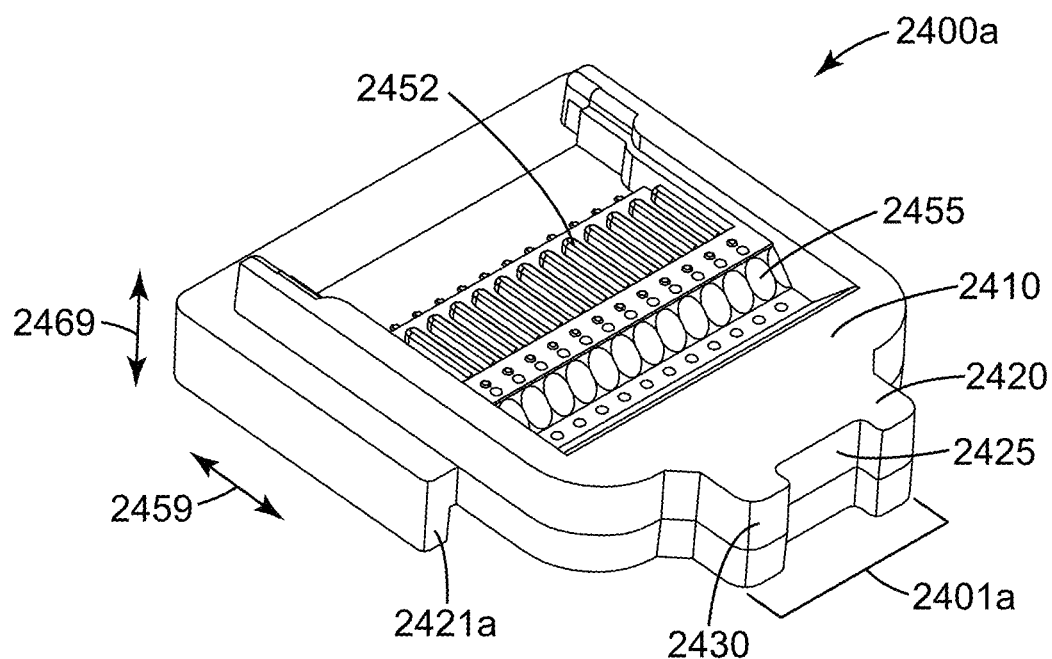
FIG. 24A is a perspective view of an optical ferrule.
Figure 24B:
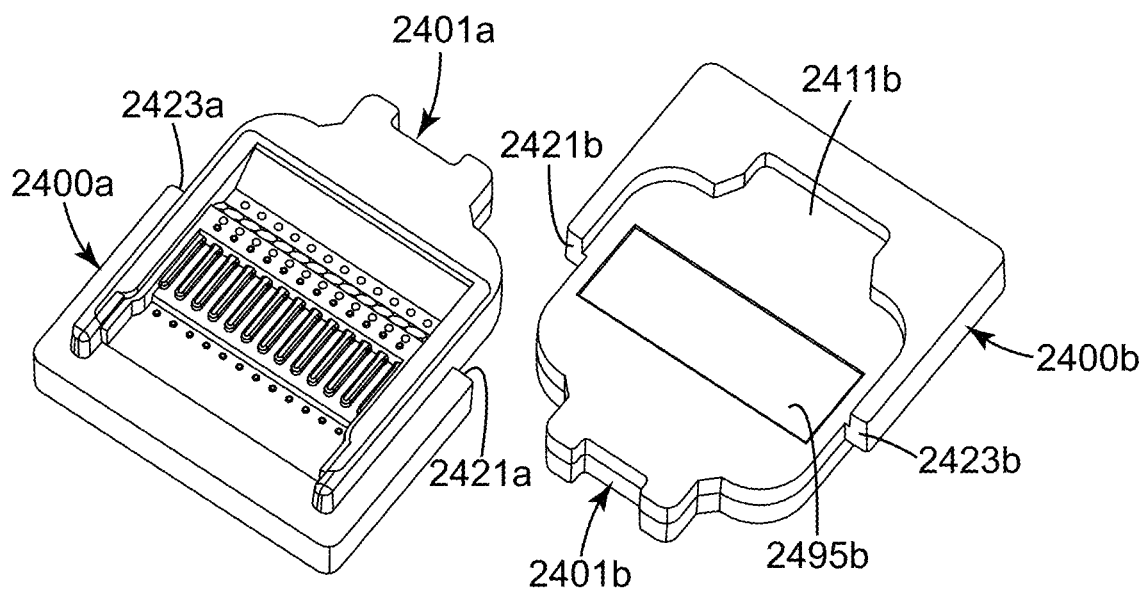
FIG. 24B is a perspective view of two proximate optical ferrules.

FIG. 24A is a top perspective view of first optical ferrule 2400*a*, and FIG. 24B is a perspective view of first and second optical ferrules 2400*a* and 2400*b*, which may be substantially identical hermaphroditic ferrules. Optical ferrule 2400*a* includes body 2410, first alignment feature 2401*a*, forward stops 2421*a* and 2423*a* (see FIG. 24B), waveguide alignment member 2452, light redirecting member 2455, and a second alignment feature (not illustrated). First alignment feature 2401*a* includes spaced apart first and second portions 2420 and 2430 and central portion 2425. First axis 2459 is along a length dimension of the first optical ferrule 2400*a* and second axis 2469 is along a thickness dimension of the first optical ferrule 2400*a*. First and second portions 2420 and 2430 extend further away from the body 2410 of the first optical ferrule 2400*a* along a first mating direction (direction along first axis 2459) than the central portion 2425. Second optical ferrule 2400*b* includes first alignment feature 2401*b*, second alignment feature 2411*b*, forward stops 2421*b* and 2423*b*, and optical window 2495*b*. The first and second alignment features 2401*b* and 2411*b* are located at substantially different locations along the first mating direction.

When the first and second optical ferrules 2400*a* and 2400*b* are mated, the first and second alignment features of each optical ferrule may substantially simultaneously engage corresponding alignment features of the other optical ferrule. In some embodiments, the first and second optical ferrules 2400*a* and 2400*b* are adapted to mate and/or unmate along each of the thickness and length dimensions of the optical ferrules. When the first and second optical ferrules 2400*a* and 2400*b* are mated, the first alignment feature 2401*a* may contact the second alignment feature 2411*b* at a first contact region of the first alignment feature 2401*a*, and the second alignment feature of the first optical ferrule 2400*a* may contact the first alignment feature 2401*b* at a second contact region of the second alignment feature of the first optical ferrule 2401*a*. The first and second contact regions may be offset relative to one another along at least the length and thickness dimensions of the optical ferrules.

In some embodiments, an optical ferrule may include a first alignment feature that is made from a material substantially more elastic than the main body of the optical ferrule so that the first alignment feature is compressible. Alternatively, first alignment feature can be made compressible by including slits or other openings such that the first alignment feature can be compressed. Similarly, an optical ferrule may include a second alignment feature that may be made expandable by utilizing a substantially more elastic (compared to the body of the optical ferrule) material to form the second alignment feature, or the second alignment feature may be made expandable by including slits or openings in regions of the optical ferrule proximate an opening defined by the second alignment feature.

In some embodiments, an optical ferrule may include a first alignment feature having a contact region for contacting an alignment feature of a mating optical ferrule, and the first alignment feature may include one or more elastomeric layers adjacent the contact region that allows the first alignment feature to be compressible. In some embodiments, an optical ferrule may include a second alignment feature having a contact region for contacting an alignment feature of a mating optical ferrule, and the second alignment feature may include one or more elastomeric layers adjacent the contact region that allows the second alignment feature to be expandable. The elastomeric layer(s) may be elastomeric pads or elastomeric coatings and may be, for example, silicone layer(s) and/or porous elastomer layer(s).

Figure 19:
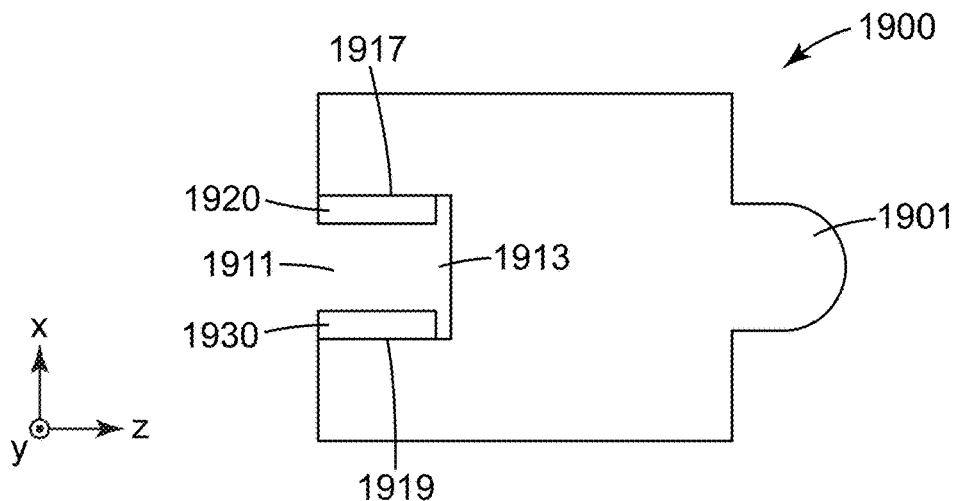
FIGS. 19-22 are schematic top views of ferrules.

FIG. 19 is a schematic top view of ferrule 1900 including first and second alignment features 1901 and 1911. Second alignment feature 1911 includes an expandable opening 1913, a first compliant feature 1920 disposed on a first side 1917 of the expandable opening 1913, and a second compliant feature 1930 disposed on a second side 1919 of the opening 1913. Opening 1913 is expandable, at least in part, due to the first and second compliant features 1920 and 1930. The first and second compliant features 1920 and 1930 may each be an elastomeric layer (e.g., a silicone or other elastomeric layer). When opening 1913 is in an expanded state, the first and second compliant features 1920 and 1930 may be in a compressed state, and when opening 1913 is in an unexpanded state, the first and second compliant features 1920 and 1930 may be in an uncompressed state.

Figure 20:
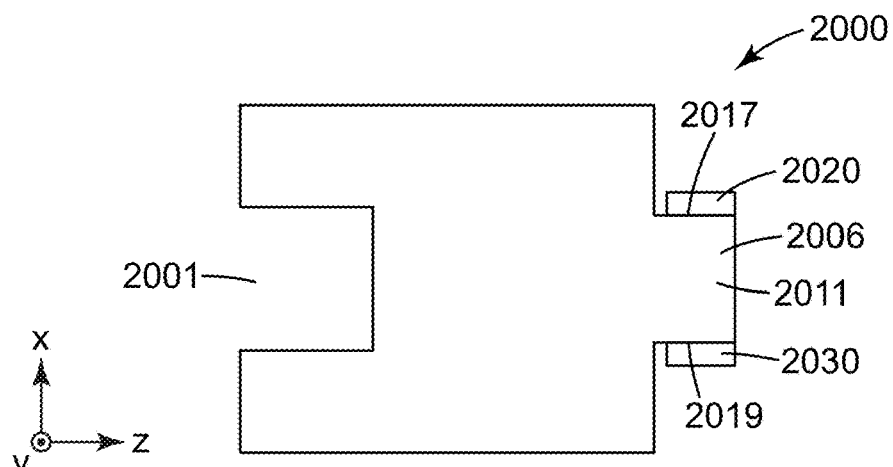

FIG. 20 is a schematic top view of ferrule 2000 including first and second alignment features 2001 and 2011. Second alignment feature 2011 includes a body 2006 having opposing first and second sides 2017 and 2019, first compliant feature 2020 disposed on first side 2017, and second compliant feature 2030 disposed on second side 2030. Second alignment feature 2011 is compressible, at least in part, due to the first and second compliant features 2020 and 2030. The first and second compliant features 2020 and 2030 may each be an elastomeric layer (e.g., a silicone or other elastomeric layer as described elsewhere herein). When the second alignment feature 2011 is in a compressed state, the first and second compliant features 2020 and 2030 may be in a compressed state, and when the second alignment feature 2011 is in an uncompressed state, the first and second compliant features 2020 and 2030 may be in an uncompressed state.

In some embodiments of the present description, a ferrule includes opposing first and second compliant features. In some cases, this may be desired in order to provide a high degree of alignment accuracy. In other embodiments, the second compliant feature may be omitted.

Figure 21:
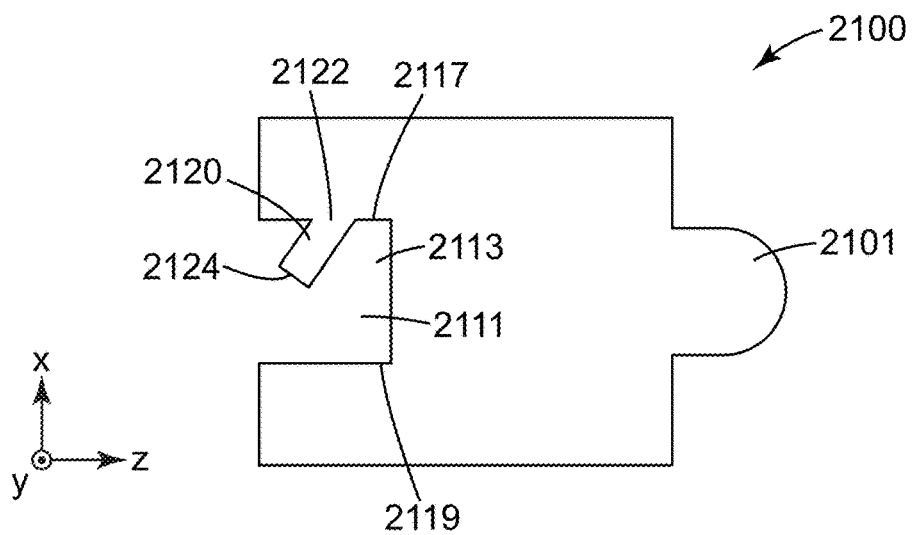

FIG. 21 is a schematic top view of ferrule 2100 include first and second alignment features 2101 and 2111. Second alignment feature 2111 includes opposing first and second sides 2117 and 2119 and defines an opening 2113 which is expandable, at least in part, due to compliant feature 2120. In the illustrated embodiment, compliant feature 2120 is a flexible arm having a fixed end 2122 attached to first side 2117 and an opposite free end 2124. In other embodiments, the compliant feature may be an elastomeric layer disposed on first side 2117. When opening 2113 is in an expanded state, the compliant feature 2120 may be in a flexed state, and when opening 2113 is in an unexpanded state, the compliant feature 2120 may be in an unflexed state.

Figure 22:
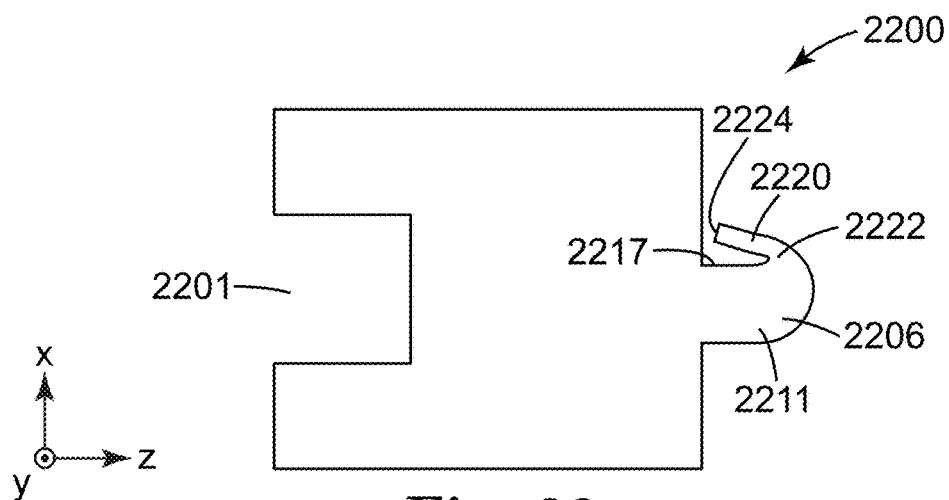

FIG. 22 is a schematic top view of ferrule 2200 include first and second alignment features 2201 and 2211. Second alignment feature 2211 includes a body 2206 and a compliant feature 2220. Second alignment feature 2211 is compressible, at least in part, due to compliant feature 2220. In the illustrated embodiment, compliant feature 2220 is a flexible arm having a fixed end 2222 attached to a side 2117 of the body 2206 and an opposite free end 2224. In other embodiments, the compliant feature may be an elastomeric layer disposed on the side 2117. When the second alignment feature 2211 is in a compressed state, the compliant feature 2220 may be in a flexed state, and when the second alignment feature 2211 is in an uncompressed state, the compliant feature 2220 may be in an unflexed state.

Figure 23:
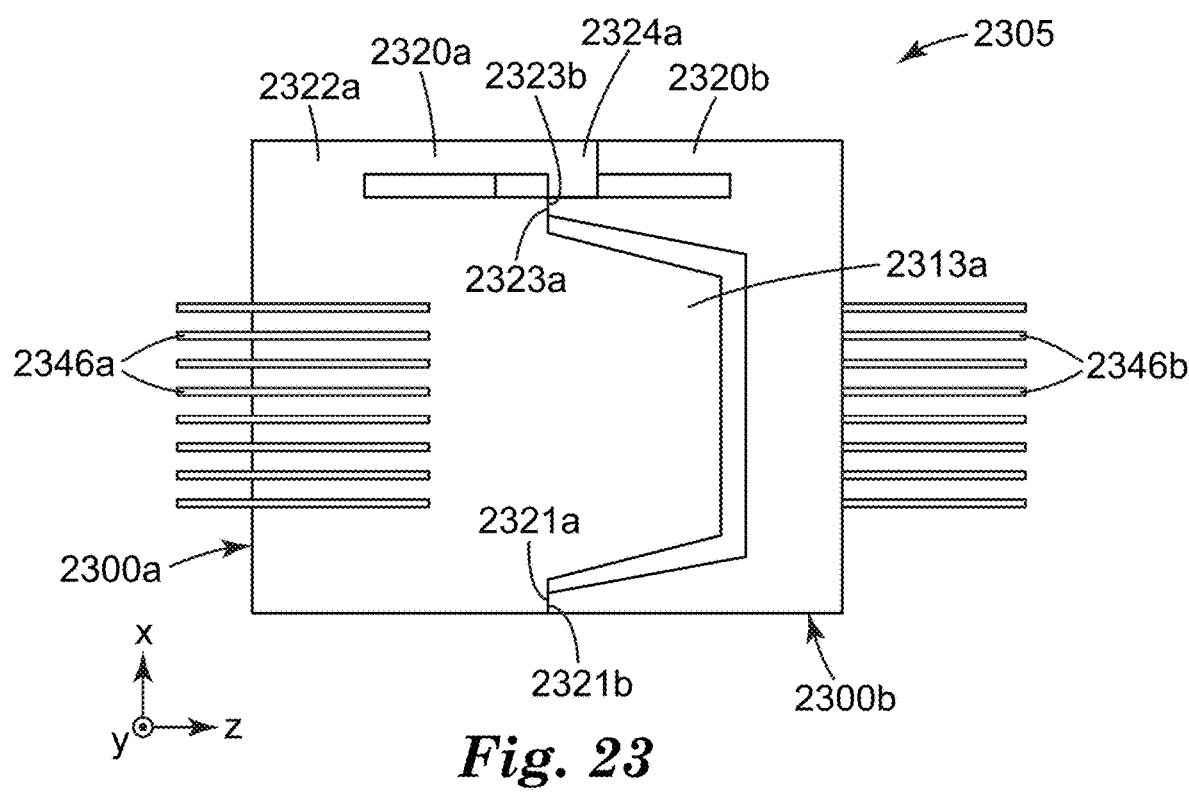
FIG. 23 is a schematic top view of a ferrule assembly including two mated ferrules.

FIG. 23 is a schematic top view of ferrule assembly 2305 including first and second optical ferrules 2300a and 2300b. First optical ferrule 2300a is adapted to receive light from the plurality of optical fibers 2346a and transmit light to the second optical ferrule 2300b which is adapted to receive light from first optical ferrule 2300a and transmit light to the plurality of optical fibers 2346b. The ferrule assembly 2305 may also operate in reverse of this, receiving light from the plurality of optical fibers 2346b and transmitting light to the plurality of optical fibers 2346a. First optical ferrule 2300a includes forward stops 2321a and 2323a, mating portion 2313a, and compliant feature 2320a, which in the illustrated embodiment is a flexible arm, which can flex away from a body of the optical ferrule 2300a during mating and which has a free end 2324a and an opposite fixed end 2322a attached to a side of the body of the optical ferrule 2300a. Similarly, second optical ferrule 2300b includes forward stops 2321b and 2323b and includes compliant feature 2320b, which in the illustrated embodiment is a flexible arm. When the first and second optical ferrules 2300a and 2300b are fully mated, the forward stops 2321a and 2323a contact the forward stops 2321b and 2323b, respectively; the mating portion 2313a is stacked with a corresponding mating portion of the second optical ferrule 2300b in a direction (y-direction) orthogonal to the mating direction; the free end 2324a of the compliant feature 2320a contacts a side of a body of the second optical ferrule 2300b; and a corresponding free end of a compliant feature of the second optical ferrule 2300b contacts a side of a body of the first optical ferrule 2300a. Any of the connector housings, ferrules, alignment frames or other components may be unitary components made by molding. For example, any of ferrule 400, ferrule 500a, ferrule 1000a, ferrule 1600a, ferrule 1800, alignment frames 760 or 860, and/or housing 242 may be unitary components made by injection molding. Accordingly, any of the components may comprise an injection molded polymer. In some embodiments, a connector housing, a ferrule, or an alignment frame may be made by molding two or more parts (e.g., two halves of a connector housing) and assembling the parts with a permanent adhesive, for example.

Methods of molding a unitary optical ferrule, for example, are described in co-pending application entitled "Optical Ferrule and Optical Ferrule Mold" (Provisional Application No. 62/239,996) filed on an even date herewith and hereby incorporated herein to the extent that it does not contradict the present description.

The material forming the compliant features and/or the geometry of the compliant features can be selected to provide a desired alignment force between ferrules. For example, the alignment force provided by the compliant features can be increased or decreased by choosing a material for the compliant features with a higher or lower Young's modulus, respectively. As another example, in embodiments utilizing flexible arms, the alignment force provided by the flexible arms can be increased or decreased by choosing larger or smaller cross-sectional areas, respectively, for the flexible arms. Useful alignment forces can be obtained by choosing an injection moldable polymer for both a body of the ferrule and the compliant features of the ferrule and by choosing a geometry of the compliant features that can be injection molded along with the body of the ferrule. In this way, for example, a unitary ferrule having compliant features that provide a desired alignment force can be made.

The following is a list of exemplary embodiments of the present description.

Embodiment 1 is an optical ferrule comprising:
  a body comprising an optically transparent portion for propagating an optical signal therein;
  a first flexible arm having a first fixed end attached to a first side of the body and an opposite first free end; and
  a second flexible arm, opposite the first flexible arm, having a second fixed end attached to a second side of the body, opposite the first side, and an opposite second free end, such that when the optical ferrule is mated with a mating ferrule, the first and second flexible arms are flexed away from the respective first and second sides of the body, and the first and second free ends contact the mating ferrule.

Embodiment 2 is the optical ferrule of embodiment 1, wherein the first and second flexible arms have same flexing properties.

Embodiment 3 is the optical ferrule of embodiment 1, wherein one of the first and second flexible arms is more flexible than the other one of the first and second flexible arms.

Embodiment 4 is the optical ferrule of embodiment 3, wherein one, but not the other one, of the first and second flexible arms is substantially rigid.

Embodiment 5 is the optical ferrule of embodiment 1, wherein the first and second flexible arms have different flexing properties.

Embodiment 6 is the optical ferrule of embodiment 1, such that when the ferrule is mated with a mating ferrule, the first and second free ends of the ferrule contact corresponding opposing first and second sides of the mating ferrule.

Embodiment 7 is the optical ferrule of embodiment 1, such that when the ferrule is mated with a mating ferrule along a mating direction, the ferrule and the mating ferrule are adapted to slide relative to one another along a first direction different from the mating direction.

Embodiment 8 is the optical ferrule of embodiment 7, wherein the first direction is a lateral direction.

Embodiment 9 is the optical ferrule of embodiment 1, such that when the ferrule is mated with a mating ferrule, the ferrule and the mating ferrule are adapted to slide relative to one another in a plane substantially parallel to a plane generally defined by the first and second flexible arms.

Embodiment 10 is the optical ferrule of embodiment 1, such that when the optical ferrule is mated with a mating ferrule along a mating direction and the mating ferrule is misaligned relative to the ferrule along a direction different from the mating direction, the flexed first and second flexible arms of the optical ferrule guide the mating ferrule into alignment with the optical ferrule.

Embodiment 11 is the optical ferrule of embodiment 1, such that when the optical ferrule is mated with a mating ferrule along a mating direction, the mating ferrule being a second optical ferrule according to embodiment 1, and the mating ferrule is misaligned relative to the optical ferrule along a direction different from the mating direction, the flexed first and second flexible arms of the optical ferrule and the flexed first and second flexible arms of the mating ferrule cooperatively guide the mating ferrule into alignment with the optical ferrule.

Embodiment 12 is the optical ferrule of embodiment 1, such that as the optical ferrule moves along a mating direction toward a mating ferrule, the free ends of the flexible arms contact the mating ferrule, and as the optical ferrule continues to move along the mating direction toward the mating ferrule, the flexible arms begin to flex away from the body while remaining in contact with the mating ferrule, so that the flexible arms are maximally flexed away from the body when the optical ferrule is mated with the mating ferrule.

Embodiment 13 is the optical ferrule of embodiment 1, wherein the body of the optical ferrule comprises one or more indented features, such that when the optical ferrule is mated with a mating ferrule, the mating ferrule being a second optical ferrule according to embodiment 1, the first and second free ends of the first and second arms of the mating ferrule are separated by less than a maximum separation occurring when the optical ferrule and the mating ferrule are partially mated.

Embodiment 14 is the optical ferrule of embodiment 1 adapted to be at least partially disposed in a housing, the housing having a feature defining a mating direction of the ferrule.

Embodiment 15 is a connector comprising:
  a housing; and
  the optical ferrule of embodiment 1 disposed at least partially inside the housing.

Embodiment 16 is the connector of embodiment 15, wherein the housing comprises a feature defining a mating direction of the connector.

Embodiment 17 is a ferrule assembly comprising a first optical ferrule according to embodiment 1 mated with a second ferrule.

Embodiment 18 is the ferrule assembly of embodiment 17, wherein the second ferrule does not have a flexible arm.

Embodiment 19 is the ferrule assembly of embodiment 17, wherein the second ferrule includes one or more flexible arms.

Embodiment 20 is a ferrule assembly comprising a first optical ferrule according to embodiment 1 mated with a second optical ferrule according to embodiment 1.

Embodiment 21 is the ferrule assembly of embodiment 20, wherein for at least one of the first and second optical ferrules, the first and second flexible arms have different flexing properties.

Embodiment 22 is the ferrule assembly of embodiment 20, wherein the first flexing arms of the first and second optical ferrules have same first flexing properties, and the second flexing arms of the first and second optical ferrules have same second flexing properties different than the first flexing properties.

Embodiment 23 is the ferrule assembly of embodiment 20, wherein for the at least one of the first and second optical ferrules, one of the first and second flexible arms is more flexible than the other one of the first and second flexible arms.

Embodiment 24 is the ferrule assembly of embodiment 20, wherein for the at least one of the first and second optical ferrules, one of the first and second flexible arms is flexed away more from its corresponding side of the body and the other one of the first and second flexible arms is flexed away less from its corresponding side of the body.

Embodiment 25 is the ferrule assembly of embodiment 20, wherein one of the first and second optical ferrules is at least partially disposed inside a housing of a connector.

Embodiment 26 is the ferrule assembly of embodiment 20, wherein the first optical ferrule is at least partially disposed inside a housing of a first connector, and the second optical ferrule is at least partially disposed inside a housing of a different second connector.

Embodiment 27 is the ferrule assembly of embodiment 20, wherein, in plan view, the first flexible arm of the first optical ferrule at least partially overlaps the first flexible arm of the second optical ferrule, and the second flexible arm of the first optical ferrule at least partially overlaps the second flexible arm of the second optical ferrule.

Embodiment 28 is the ferrule assembly of embodiment 20, wherein, in plan view, the flexible arms of the first and second optical ferrules on a same side of the ferrule assembly at least partially overlap each other.

Embodiment 29 is the ferrule assembly of embodiment 20, wherein, in side view, the first flexible arms of the first and second optical ferrules extend beyond each other, and the second flexible arms of the first and second ferrules extend beyond each other.

Embodiment 30 is the ferrule assembly of embodiment 20, wherein, in side view, the flexible arms of the first and second optical ferrules on a same side of the ferrule assembly extend beyond each other.

Embodiment 31 is the ferrule assembly of embodiment 20, wherein, in side view, the first flexible arms of the first and second optical ferrules are vertically offset relative to each other, and the second flexible arms of the first and second ferrules are vertically offset relative to each other.

Embodiment 32 is the ferrule assembly of embodiment 20, wherein, in side view, the flexible arms of the first and second optical ferrules on a same side of the ferrule assembly are vertically offset relative to each other.

Embodiment 33 is the ferrule assembly of embodiment 20, wherein the first and second ferrules are adapted to slide relative to one another along a first direction different from a mating direction of the first and second optical ferrules.

Embodiment 34 is the ferrule assembly of embodiment 33, wherein the first direction is a lateral direction.

Embodiment 35 is the ferrule assembly of embodiment 20, wherein the first and second ferrules are adapted to slide relative to one another in a plane substantially parallel to a plane generally defined by the first and second flexible arms of the first or second optical ferrule.

Embodiment 36 is the ferrule assembly of embodiment 20, such that when the first and second optical ferrules are misaligned relative to each other, the flexible arms of the ferrules cooperatively guide the ferrules into alignment with each other.

Embodiment 37 is the optical ferrule of embodiment 1 further comprising a mating portion disposed between the first and second free ends.

Embodiment 38 is a ferrule assembly comprising a first optical ferrule of embodiment 37 mated with a second optical ferrule of embodiment 37 along a mating direction, wherein the mating portions of the first and second optical ferrules are stacked in a direction perpendicular to the mating direction.

Embodiment 39 is the ferrule assembly of embodiment 38, wherein the mating portions of the first and second optical ferrules are adapted to slide relative to each other.

Embodiment 40 is a connector assembly comprising:
  a first connector comprising:
  a first housing; and
  a first optical ferrule according to embodiment 1 disposed at least partially inside the first housing; and a second connector mated with the first connector and comprising:
a second housing; and
a second optical ferrule according to embodiment 1 disposed at least partially inside the second housing and mated with the first ferrule, the first and second flexible arms of the first ferrule flexed away from the respective first and second sides of the body of the first ferrule, and the first and second free ends of the flexible arms of the first ferrule contacting the second ferrule, the first and second flexible arms of the second ferrule flexed away from the respective first and second sides of the body of the second ferrule, and the first and second free ends of the flexible arms of the second ferrule contacting the first ferrule.

Embodiment 41 is the optical ferrule of embodiment 1 mated with a mating ferrule.

Embodiment 42 is the optical ferrule of embodiment 41, wherein the mating ferrule comprises another optical ferrule of embodiment 1.

Embodiment 43 is the optical ferrule of embodiment 1 being adapted to be optically coupled to an optical signal carrier comprising at least one of an optical waveguide, an optoelectronic device, and an optical element, and transfer an optical signal carried by the optical signal carrier to a mating optical ferrule.

Embodiment 44 is an optical ferrule assembly comprising:
a first optical signal carrier comprising at least one of an optical waveguide, an optoelectronic device, and an optical element coupled to a first optical ferrule according to embodiment 43;
a second optical signal carrier comprising at least one of an optical waveguide, an optoelectronic device, and an optical element coupled to a second optical ferrule according to embodiment 43, the first optical ferrule mated to the second optical ferrule.

Embodiment 45 is the optical ferrule assembly of embodiment 44, wherein each of the first and second optical signal carriers comprises a plurality of optical waveguides.

Embodiment 46 is the optical ferrule assembly of embodiment 44, wherein the first optical signal carrier is an optical waveguide and the second optical signal carrier is an optical detector.

Embodiment 47 is the optical ferrule assembly of embodiment 46, wherein the optical waveguide comprises an optical fiber.

Embodiment 48 is the optical ferrule assembly of embodiment 47, wherein the optical fiber is a single-mode optical fiber at a wavelength in a range from about 1200 nm to about 1700 nm.

Embodiment 49 is the optical ferrule assembly of embodiment 44, wherein the first optical signal carrier comprises an optical emitter optically coupled to an optical element and the second optical signal carrier comprises an optical waveguide.

Embodiment 50 is the optical ferrule assembly of embodiment 49, wherein the optical element comprises an optical waveguide.

Embodiment 51 is the optical ferrule assembly of embodiment 49, wherein the optical waveguide is optically coupled to an optical detector.

Embodiment 52 is the optical ferrule assembly of embodiment 44, wherein at least one of the first and second optical signal carriers comprises at least one of a prism and an optical filter.

Embodiment 53 is the optical ferrule of embodiment 1 being hermaphroditic.

Embodiment 54 is the optical ferrule of embodiment 1 being unitary.

Embodiment 55 is the optical ferrule of embodiment 1, neither of the first and second flexible arms extending beyond a front most edge of the body.

Embodiment 56 is the optical ferrule of embodiment 1, wherein, in plan view, the first free end is adjacent to and faces the first side of the body, and the second free end is adjacent to and faces the second side of the body.

Embodiment 57 is the optical ferrule of embodiment 1 having a greater first separation between the first and second free ends when the optical ferrule is mated to a mating ferrule, and a smaller second separation between the first and second free ends when the optical ferrule is unmated from the mating ferrule.

Embodiment 58 is the optical ferrule of embodiment 1, such that as the optical ferrule moves along a mating direction toward a mating ferrule, the free ends of the flexible arms contact the mating ferrule, and as the optical ferrule continues to move along the mating direction toward the mating ferrule, a separation between the free ends increases and reaches a maximum distance when the ferrule is mated with the mating ferrule.

Embodiment 59 is the optical ferrule of embodiment 1, further comprising one or more latching recesses such that as the optical ferrule moves along a mating direction toward a mating ferrule, the mating ferrule another optical ferrule according to embodiment 1, the free ends of the flexible arms of the mating ferrule contact the optical ferrule, and as the optical ferrule continues to move along the mating direction toward the mating ferrule, a separation between the free ends increases, reaches a maximum distance and then decreases.

Embodiment 60 is the optical ferrule of embodiment 1, wherein the first and second flexing arms have different flexing properties.

Embodiment 61 is the optical ferrule of embodiment 60, wherein one of the first and second flexible arms is more flexible than the other one of the first and second flexible arms.

Embodiment 62 is an optical connector comprising:
a housing;
one or more alignment features attached to the housing for engaging a corresponding one or more alignment features attached to a housing of a mating connector; and
a unitary optical ferrule at least partially disposed within the housing and comprising:
an optical waveguide alignment member for receiving, aligning and permanently attaching to a plurality of optical waveguides;
a light redirecting member for changing a direction of light propagating within the optical ferrule; and
first and second flexible alignment features on opposite sides of the optical ferrule, such that when the connector mates with a mating connector comprising a mating optical ferrule, the first and second flexible alignment features flex away from one another and engage the mating optical ferrule at respective first and second contact points.

Embodiment 63 is the optical connector of embodiment 62, wherein the first alignment feature is a first flexible arm having a first fixed end attached to a first side of a body of the optical ferrule and an opposite first free end, and the second alignment feature is a second flexible arm, opposite the first flexible arm, having a second fixed end attached to a second side of the body, opposite the first side, and an opposite second free end.

Embodiment 64 is the optical connector of embodiment 63, wherein the unitary optical ferrule is an optical ferrule according to any of embodiments 1 to 14.

Embodiment 65 is an optical ferrule comprising:
- a body; and
  - opposing arms on opposite sides of, and spaced apart from, the body, each arm having a fixed end attached to the body and an opposite free end, such that when the optical ferrule is mated with a mating ferrule, at least one of the arms is flexed away from the body, and both free ends contact the mating ferrule.

Embodiment 66 is the optical ferrule of embodiment 65, wherein one of the arms is substantially more flexible than the other.

Embodiment 67 is the optical ferrule of embodiment 65, wherein one, but not both, of the arms is substantially rigid.

Embodiment 68 is the optical ferrule of embodiment 65, wherein the body comprises a mating portion disposed between the free ends.

Embodiment 69 is the optical ferrule of embodiment 68, such that when the ferrule is mated with another optical ferrule of embodiment 68 and the two optical ferrules are misaligned relative to each other, the opposing arms of the two optical ferrules cooperatively direct the two mating portions to slide over each other bringing the two optical ferrules into alignment with each other.

Embodiment 70 is the optical ferrule of embodiment 65 being unitary.

Embodiment 71 is the optical ferrule of embodiment 65 being hermaphroditic.

Embodiment 72 is an optical ferrule comprising:
- a body; and
- a first flexible arm having a first fixed end attached to the body and an opposite first free end adjacent to and spaced apart from the body, such that when the optical ferrule is mated with a mating ferrule, the first flexible arm is flexed away from the body, and the first free end contacts the mating ferrule, the optical ferrule adapted to receive and transmit light.

Embodiment 73 is the optical ferrule of embodiment 72, further comprising a second flexible arm having a second fixed end attached to the body opposite the first fixed end of the first flexible arm, and an opposite second free end adjacent to and spaced apart from the body such that when the optical ferrule is mated with a mating ferrule, the second flexible arm is flexed away from the body, and the second free end contacts the mating ferrule.

Embodiment 74 is the optical ferrule of embodiment 72, further comprising a mating portion adapted to stack with a corresponding mating portion of a mating ferrule in a direction perpendicular to a mating direction of the optical ferrule, the first free end adjacent to and spaced apart from the mating portion.

Embodiment 75 is the optical ferrule of embodiment 72, further comprising one or more forward stops adapted to contact corresponding forward stops of the mating ferrule when the optical ferrule is mated with the mating ferrule.

Embodiment 76 is the optical ferrule of embodiment 72 being unitary.

Embodiment 77 is the optical ferrule of embodiment 72 being hermaphroditic.

Embodiment 78 is an optical connector adapted to mate with a mating connector along a mating direction in a mating plane, the optical connector having at least one flexing element such that when the optical connector is mated with the mating connector, the at least one flexing element is flexed and makes contact with the mating connector, and the optical connector and the mating connector are adapted to slide relative to each other in the mating plane.

Embodiment 79 is the optical connector of embodiment 78, wherein when the optical connector is mated with the mating connector, and the optical connector and the mating connector are misaligned relative to each other in the mating plane, the flexed flexing element guides the two optical connectors into alignment with each other.

Embodiment 80 is an alignment frame for facilitating a mating of a first ferrule to a second ferrule along a mating direction, comprising:
- a base;
  - opposing first and second arms extending forwardly from opposing ends of the base;
  - spaced apart first and second flexible features disposed on an inner surface of the first arm and facing the second arm; and
  - spaced apart third and fourth flexible features disposed on an inner surface of the second arm and facing the first arm, such that when the alignment frame facilitates a mating of a first ferrule to a second ferrule resulting in the first ferrule being mated to the second ferrule, the opposing first and third flexible features are flexed and in contact with the first ferrule, and the opposing second and fourth flexible features are flexed and in contact with the second ferrule.

Embodiment 81 is the alignment frame of embodiment 80, wherein when the alignment frame facilitates a mating of a first ferrule to a second ferrule resulting in the first ferrule being mated to the second ferrule, the first and second flexible features are flexed in a same first direction, and the second and fourth flexible features are flexed in a same second direction opposite the first direction.

Embodiment 82 is the alignment frame of embodiment 80, wherein when the alignment frame facilitates a mating of a first ferrule to a second ferrule resulting in the first ferrule being mated to the second ferrule, the first and second ferrules are disposed, at least partially, between the first and second arms.

Embodiment 83 is the alignment frame of embodiment 80, such that when the alignment frame facilitates a mating of a first ferrule to a second ferrule resulting in the first ferrule being mated to the second ferrule, the opposing first and third flexible features are each flexed outwardly by the first ferrule a first distance and the opposing second and fourth flexible features are each flexed outwardly by the second ferrule a second distance greater than the first distance.

Embodiment 84 is the alignment frame of embodiment 80, wherein the first, second, third and fourth flexible features lie substantially in a same plane.

Embodiment 85 is the alignment frame of embodiment 80, such that when the alignment frame facilitates a mating of a first ferrule to a second ferrule along a mating direction resulting in the first ferrule being mated to the second ferrule, a plane perpendicular to the mating direction and connecting the second and fourth flexible features intersects both the first and second ferrules, and a plane perpendicular to the mating direction and connecting the first and third flexible features intersects only the first ferrule.

Embodiment 86 is the alignment frame of embodiment 80, wherein the first and second flexible features have different flexing properties.

Embodiment 87 is the alignment frame of embodiment 80, wherein the third and fourth flexible features have different flexing properties.

Embodiment 88 is the alignment frame of embodiment 80, wherein the first flexible feature is disposed on a first portion of the first arm closer to the base and the second flexible feature is disposed on a second portion of the first arm farther from the base, the first and second portions of the first arm having different flexing properties.

Embodiment 89 is the alignment frame of embodiment 80, wherein the third flexible feature is disposed on a first portion of the second arm closer to the base and the fourth flexible feature is disposed on a second portion of the second arm farther from the base, the first and second portions of the second arm having different flexing properties.

Embodiment 90 is the alignment frame of embodiment 80, wherein the first and second flexible features lie on a first straight line substantially parallel to the mating direction, and the third and fourth flexible features lie on a second straight line different than and substantially parallel to the first straight line.

Embodiment 91 is the alignment frame of embodiment 80, wherein the first and third flexible features lie on a first straight line substantially perpendicular to the mating direction, and the second and fourth flexible features lie on a second straight line different than and substantially parallel to the first straight line.

Embodiment 92 is the alignment frame of embodiment 80, wherein the first and third flexible features have substantially same first flexing properties, and the second and fourth flexible features have substantially same second flexing properties.

Embodiment 93 is the alignment frame of embodiment 92, wherein the second flexing properties are different than the first flexing properties.

Embodiment 94 is the alignment frame of embodiment 92, wherein the second flexing properties are substantially the same as the first flexing properties.

Embodiment 95 is the alignment frame of embodiment 80, such that when the alignment frame facilitates a mating of a first ferrule to a second ferrule resulting in the first ferrule being mated to the second ferrule, the opposing first and third flexible features are flexed and in contact with corresponding inflexible features on the first ferrule, and the opposing second and fourth flexible features are flexed and in contact with corresponding inflexible features on the second ferrule.

Embodiment 96 is the alignment frame of embodiment 80, wherein each of the first and second flexible features is flexible, at least in part, by virtue of the first arm being flexible, and each of the third and fourth flexible features is flexible, at least in part, by virtue of the second arm being flexible.

Embodiment 97 is the alignment frame of embodiment 80, wherein a front portion of each arm splits into upper and lower beams, such that each of the first and second flexile features is disposed on an inner surface of a different flexible beam of the first flexible arm, and each of the third and fourth flexile features is disposed on an inner surface of a different flexible beam of the second flexible arm.

Embodiment 98 is the alignment frame of embodiment 97, wherein each of the first and second flexible features is flexible, at least in part, by virtue of the upper and lower beams of the first arm being flexible, and each of the third and fourth flexible features is flexible, at least in part, by virtue of the upper and lower beams of the second arm being flexible.

Embodiment 99 is the alignment frame of embodiment 98, such that when the alignment frame facilitates a mating of a first ferrule to a second ferrule resulting in the first ferrule being mated to the second ferrule, the upper beams of the first and second flexible arms are flexed and in contact with corresponding inflexible features on the first ferrule, and the lower beams of the first and second flexible arms are flexed and in contact with corresponding inflexible features on the second ferrule.

Embodiment 100 is the alignment frame of embodiment 80, wherein when the alignment frame facilitates a mating of a first ferrule to a second ferrule along a mating direction in a mating plane resulting in the first ferrule being mated to the second ferrule, and the first and second ferrules are misaligned relative to each other in the mating plane, the first, second, third and fourth flexible features cooperatively guide the first and second ferrules into alignment with each other.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical connector comprising:
    a housing;
    one or more alignment features attached to the housing for engaging a corresponding one or more alignment features attached to a housing of a mating connector; and
    a unitary optical ferrule at least partially disposed within the housing and comprising:
        an optical waveguide alignment member for receiving, aligning and permanently attaching to a plurality of optical waveguides;
        a light redirecting member for changing a direction of light propagating within the optical ferrule; and
        first and second flexible alignment features on opposite sides of the optical ferrule, such that when the connector mates with a mating connector comprising a mating optical ferrule, the first and second flexible alignment features flex away from one another and engage the mating optical ferrule at respective first and second contact points, wherein the first and second flexible alignment features are maximally flexed away from the sides of the optical ferrule when the optical ferrule is mated with the mating connector.

2. The optical connector of claim 1, wherein the first alignment feature is a first flexible arm having a first fixed end attached to a first side of a body of the optical ferrule and an opposite first free end, and the second alignment feature is a second flexible arm, opposite the first flexible arm, having a second fixed end attached to a second side of the body, opposite the first side, and an opposite second free end.

3. An optical ferrule comprising:
    a body; and
    a first flexible arm having a first fixed end attached to the body and an opposite first free end adjacent to and spaced apart from the body, such that when the optical ferrule is mated with a mating ferrule, the first flexible arm is flexed away from the body, the first flexible arm is maximally flexed away from the body, and the first free end contacts the mating ferrule, the optical ferrule adapted to receive and transmit light.

4. The optical ferrule of claim 3, further comprising a second flexible arm having a second fixed end attached to the body opposite the first fixed end of the first flexible arm, and an opposite second free end adjacent to and spaced apart from the body such that when the optical ferrule is mated with a mating ferrule, the second flexible arm is flexed away from the body, and the second free end contacts the mating ferrule.

5. An optical connector adapted to mate with a mating connector along a mating direction in a mating plane, the optical connector having at least one flexing element such that when the optical connector is mated with the mating connector, the at least one flexing element is flexed and makes contact with the mating connector, the at least one flexing element is maximally flexed away from a body of the optical connector when fully mated with the mating connector, and the optical connector and the mating connector are adapted to slide relative to each other in the mating plane.

6. The optical connector of claim 5, wherein when the optical connector is mated with the mating connector, and the optical connector and the mating connector are misaligned relative to each other in the mating plane, the flexed flexing element guides the two optical connectors into alignment with each other.

* * * * *